United States Patent [19]
Cain et al.

[11] Patent Number: 6,014,138
[45] Date of Patent: Jan. 11, 2000

[54] DEVELOPMENT SYSTEM WITH METHODS FOR IMPROVED VISUAL PROGRAMMING WITH HIERARCHICAL OBJECT EXPLORER

[75] Inventors: Ronald Allen Cain, Scotts Valley; Elliot Omiya, Aptos; David Phipps, Santa Cruz, all of Calif.

[73] Assignee: Inprise Corporation, Scotts Valley, Calif.

[21] Appl. No.: 08/699,009

[22] Filed: Aug. 16, 1996

Related U.S. Application Data

[63] Continuation-in-part of application No. 08/584,626, Jan. 9, 1996, Pat. No. 5,651,108, which is a continuation of application No. 08/184,611, Jan. 21, 1994, Pat. No. 5,487,141.

[51] Int. Cl.[7] ................................................ G06T 1/00
[52] U.S. Cl. ................................ 345/335; 345/356
[58] Field of Search .................................... 345/333, 335, 345/339, 340, 348, 352, 356, 326; 395/701, 702, 703

[56] References Cited

U.S. PATENT DOCUMENTS

| | | | |
|---|---|---|---|
| 5,206,950 | 4/1993 | Geary et al. | 395/600 |
| 5,339,433 | 8/1994 | Frid-Nielsen | 395/700 |
| 5,487,141 | 1/1996 | Cain et al. | 395/135 |
| 5,502,805 | 3/1996 | Anderson et al. | 395/148 |
| 5,513,305 | 4/1996 | Maghbouleh | 395/145 |
| 5,537,630 | 7/1996 | Berry et al. | 395/155 |
| 5,673,401 | 9/1997 | Volk et al. | 395/327 |
| 5,680,619 | 10/1997 | Gudmundson et al. | 395/701 |
| 5,727,175 | 3/1998 | Malone et al. | 395/356 |
| 5,754,178 | 5/1998 | Johnston, Jr. et al. | 345/343 |
| 5,802,334 | 9/1998 | Nickolas et al. | 395/357 |
| 5,802,514 | 9/1998 | Huber | 707/4 |
| 5,870,088 | 2/1999 | Washington et al. | 345/326 |

OTHER PUBLICATIONS

*Microsoft Visual Basic Version 3.0 Programmer's Guide*, Chapter 2: Your First Visual Basic Application, Microsoft Corp., 1993, pp. 15–30.

*Primary Examiner*—Joseph H. Feild
*Attorney, Agent, or Firm*—John A. Smart

[57] ABSTRACT

A system of the present invention includes a relational database management system (RDBMS), having an object-based, interactive visual-programming language providing programming by "visual inheritance." A user places screen objects (e.g., boxes, screen buttons, table objects, and the like) on an on-screen window or "form," visually attaches selected "properties" and "methods" to the screen objects, and then establishes an containership-based event model that dictates how and when these properties and methods will be invoked. An object inherits (derives) properties and methods from other (parent) objects via its visual containership. In this manner, the task of creating and maintaining application programs is greatly simplified. An alternative embodiment providing an "Object Explorer" is also described. The Explorer collapses object inspector and object tree functionality into a single UI (user interface) element. This allows the user to avoid switching back and forth between an inspector/property sheet user interface element on the one hand and an object tree user interface element on the other. Additionally, the imporved interface consumes less screen surface area.

45 Claims, 50 Drawing Sheets

DEVELOPMENT SYSTEM WITH METHODS FOR IMPROVED VISUAL PROGRAMMING WITH HIERARCHICAL OBJECT EXPLORER

The present application is a continuation-in-part of application Ser. No. 08/584,626, Jan. 9, 1996, now U.S. Pat. No. 5,651,108, which is a continuation application of application Ser. No. 08/184,611, filed Jan. 21, 1994, now U.S. Pat. No. 5,487,141; the disclosures of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly to creating programs for the storing, retrieving, and presenting information in a data processing system, such as a Database Management System.

Computers are a powerful tool for the acquisition and processing of information. Computerized databases can be regarded as a kind of electronic filing cabinet or repository for collecting computerized data files; they are particularly adept at processing vast amounts of information quickly. As such, these systems serve to maintain information in database files or tables and make that information available on demand. Of these systems, ones which are of particular interest to the present invention are Relational Database Management Systems (RDBMSs).

The concept of relational databases is perhaps best introduced by reviewing the problems surrounding traditional or non-relational systems. In a traditional database system, the task of retrieving information of interest (i.e., answering a "database query") is left to the user; that is, the user must give detailed instructions to the system on exactly how the desired result is to be obtained.

Consider the example of a simple query: "Who are the teachers of student John Smith?" In a traditional system, several explicit instructions are required before the query can be answered. One instruction, for instance, is typically to instruct the system to allocate sections in memory for data to be read from a storage disk. Another command may tell the system which disk files to open and read into the allocated memory for processing. Still other commands may specify particular search strategies, such as use of specific indexes, for speeding up the result of the query. And still even further commands may be needed for specifying explicit links between two or more files so that their data may be combined. Thus, instead of just telling the system "what" is desired (i.e., the desired data result as expressed in a query expression), one must specify internal procedures (i.e., the "how") for obtaining the data. Even for a simple query, such as that above, the task is complex, tedious, and error-prone.

From the user's perspective, such details—ones directed to the physical implementation—are completely irrelevant; the user is interested only in the result. Thus, the lack of separation of logical operations from the physical representation of the data (i.e., how it is internally stored and accessed by the system) in traditional systems burdens users with unnecessary complexity. Moreover, as traditional database products employ proprietary data access procedures, knowledge of one product is not necessarily helpful in use of another. And where database systems differ, their practitioners cannot effectively communicate with one another.

In 1970, Dr. E. F. Codd invented the "relational model", a prescription for how a DBMS should operate. The relational model provides a foundation for representing and manipulating data, that is, a way of looking at data. The model includes three basic components: structure, integrity, and manipulation. Each will be described in turn.

The first of these, structure, is how data should be presented to users. A database management system is defined as "relational" when it is able to support a relational view of data. This means that data which a user can access and the operators which the user can use to operate upon that data are themselves relational. Data are organized as relations in a mathematical sense, with operators existing to accept relations as input and produce relations as output. Relations are perhaps best interpreted by users as tables, composed of rows (tuples) and columns (attributes).

Ideally, data in a relational system is perceived by users as tables and nothing but tables. This precludes the user from seeing explicit connections or links between tables, or having to traverse between tables on the basis of such links. It also precludes user-visible indexes on fields and, in fact, precludes users from seeing anything that smacks of the physical storage implementation. Thus, tables are a logical abstraction of what is physically stored.

The integrity aspect, on the other hand, dictates that every relation (i.e., table) should have a unique, primary key to identify table entries or rows. The integrity of the data for the user is of course crucial. If accuracy and consistency of the data cannot be achieved, then the data may not be relied upon for decision-making purposes.

Data manipulation, the last component, may be thought of as cut-and-paste operators for tables. Data manipulation is of course the purpose for which databases exist in the first place. The superiority of manipulating tables relationally (i.e., as a whole, or sets of rows) is substantial. Users can combine data in various tables logically by matching values in common columns, without having to specify any internal details or the order in which tables are accessed; this provides users with a conceptual view of the database that is removed from the hardware level. Non-relational DBMSs, in contrast, require complex programming skills that form an inherently unreliable means to interact with databases.

The general construction and operation of a database management system is known in the art. See e.g., Date, C., *An Introduction to Database Systems,* Volumes I and II, Addison Wesley, 1990; the disclosures of which are hereby incorporated by reference.

Today, relational systems are everywhere—commonly seen operating in corporate, government, academic settings, and other shared environments. However, the programming effort required to build and maintain RDBMS applications has proved to be a major stumbling block to the industry, especially as the need for GUIs (graphical user interfaces) has grown. GUIs are essentially "user-centered," meaning that the user, not the program, "directs the action" and establishes an appropriate data-model and event-model for his or her needs. GUIs demand an event-driven paradigm whereby programs respond to asynchronous user actions, rather than having the user react sequentially to choices offered by the program.

Traditional RDBMS programming methods have followed the program-driven (procedural) paradigm, presenting the user with a linear hierarchy of pre-determined menus. Thus, prior-art approaches to programming relational database applications include diverse procedural languages, such as dBASE III®, whereby separate programs are written for linear, step-by-step solutions to particular data-retrieval and manipulation problems. The user can custom-design tables and reports but is forced to follow the sequential event-model imposed by the application.

Another problem posed by traditional RDBMS programming languages is the difficulty of reusing existing code for similar applications. The elements in the code that define data structures and those that manipulate the data are often spread arbitrarily throughout the program. This makes it difficult both to maintain programs and to isolate code segments that might prove reusable elsewhere.

SUMMARY OF THE INVENTION

A system of the present invention includes a relational database management system (RDBMS), where information is maintained in one or more database tables for easy, efficient storage and retrieval. The system provides an object-based, interactive visual-programming language accessible via a graphical user interface (GUI).

The system provides "visual inheritance" methods for simplifying programming tasks. Specifically, the user places screen objects (e.g., boxes, screen buttons, tables objects, and the like) on an on-screen window or "form," visually attaches selected "properties" and "methods" to the screen objects, and then establishes an "event model" that dictates how and when these properties and methods will be invoked. An object inherits (derives) properties and methods from other (parent) objects via visual "containership." A screen object visually constructed inside another object, such as a button drawn within a box, automatically inherits (i.e., has access to) the methods associated with the containing box. In turn, the box may be contained in some larger object (a window, say), and so on, until the outermost containing form is reached. Thus, each object in the containership hierarchy inherits progressively from the containing environment. If desired, the programmer has the option to "override" an inherited property or method for any particular object. In this manner, the writing of large, linear, procedural programs is replaced by object-based visual programming which is more interactive and intuitive.

To further simplify a user's task of developing an application, the system provides objects with appropriate built-in "default" properties and methods; explicit programming is needed only when an object is desired to be further customized. For example, button objects "know" that a "mouse click" event, by default, should call for the on-screen appearance of the button to temporarily change—to appear as if the button is being depressed. In many situations, the default (built-in) behavior of an object will satisfy the needs of the application with little or no customization.

The system also provides an object-based visual programming language which simplifies event-driven programming by non-experts via direct manipulation of visual objects on the screen. For instance, additional application-dependent actions may be added to an application by "attaching" custom code to desired objects. The object-based visual programming language includes a syntax optimized for interacting with the properties and methods of system objects.

Further, the present invention offers special windows that display, on demand, all or part of an application's containership hierarchy. Specifically, a family tree or "object tree" of selected objects is provided as a readily understandable diagram: named boxes that are connected like the corporative organization charts familiar to the user. The programmer can "browse" through these tree charts by selecting boxes of interest to invoke lists of their properties and methods.

As another aspect of the present invention, the system increases code reusability by providing a facility for cutting and pasting objects while preserving any attached properties and methods. Form design and similar objects are "bound" to their properties and methods as well as to other objects (including other forms, perhaps) that they contain. A screen button, for instance, not only comprises the on-screen appearance of a button but also encapsulates various properties and methods attached to the button. This "encapsulation" allows the entire functionality and appearance of an object (or a group of objects) to be quickly transferred or "cloned" (e.g., to another application) using common clipboard techniques, such as cut, copy, and paste—techniques usually associated with cutting and pasting data, not live objects. Having copied an object, the user can edit its properties and/or methods to fit the needs of its new destination. Or the pasted object may simply inherit new behavior by virtue of its new containership context. In this manner, a collection of reusable objects or "clip objects" may be readily constructed for use in a variety of target applications.

In an alternative embodiment of the present invention, the object inspector and object tree hierarchy are collapsed into a single UI (user interface) element—an "Object Explorer" of the present invention. The Object Explorer avoids a disadvantage of first embodiment where a user is required to switch back and forth between an inspector/property sheet user interface element and an object tree user interface element. Additionally, the Object Explorer consumes less screen "real estate" or surface area.

BRIEF DESCRIPTION OF THE DRAWINGS

FIGS. 3C–E are bitmap screenshots illustrating use of the Desktop's client area for displaying and manipulating major objects of the system, including table objects, form objects, report objects, and the like.

Figure 1A:
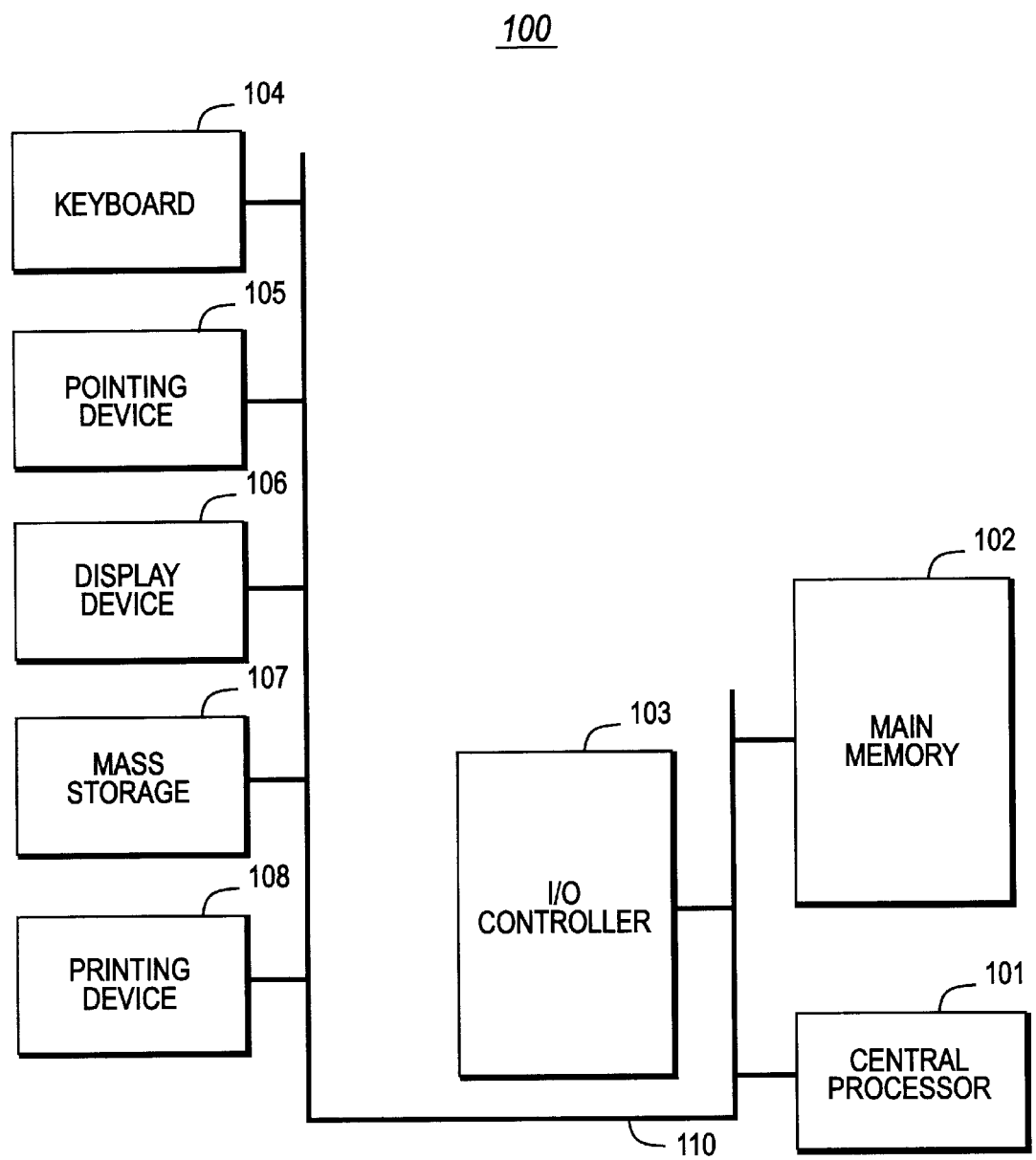
FIG. 1A is a block diagram of a computer system in which the present invention may be embodied.

GLOSSARY active: An ObjectPAL variable that represents the object that has focus.

application: An ObjectPAL type that provides a handle to the Desktop. Also a group of forms, methods, queries, and procedures forming a single unit, where users can enter, view, maintain, and report on their data.

argument: Information passed to a method or procedure.

blank: A field or variable that has no value.

bubbling: A process by which events pass from the target object up through the containership hierarchy.

built-in method: Pre-defined code that comes with every object a user can place in a form. Built-in methods define an object's default response to events.

clip object: An object that can be cloned by copy and paste operations via interprocess communication (e.g., Windows Clipboard). Both the methods and properties of the object are replicated, allowing for easy reusability.

clipboard: An interprocess communication facility available in Windows which employs a reserved area of memory to which data can be copied and from which previously copied data can be pasted to other applications.

compound (composite) object: An object made up of two or more other objects. For example, a table frame is a compound object made of field objects and record objects.

containership: One object contains another object if the other object is completely within the borders of the first object. Containership affects the availability (scope) of variables, methods, and procedures.

Database: An object type that contains information about relationships between tables.

data type: The type of data that a field or variable contains. The data type specifies the legal range of values that can be stored in the field of variable.

Desktop: The main window in the system.

dot notation: The use of a "." (dot) to qualify the name of an object's property or method.
Thus, MyButton.pushButton and YourButton.pushButton distinguishes the pushButton methods attached to MyButton and YourButton.

drag: Moving a screen object by holding down a mouse button while moving the mouse cursor to the target position.

Editor: The component of the system used to create and edit ObjectPAL methods.

event: The action that triggers a method (that is, causes code to execute). Also an objectPAL object type (Event).

event-driven application: An application where code executes in response to events, as opposed to a procedural application, where code executes in a linear sequence.

event model: The rules that specify how events are processed by objects in a form.

field: One item of information in a table. A collection of related fields makes up one record.

file: A collection of information stored under one name on a disk. For example, Paradox tables are stored in files.

focus: An attribute of an object. An object that has focus (also called the active object) is ready to handle keyboard input. Typically, the active or focused object is highlighted.

form: A window or "design document" for displaying data and objects. Also an ObjectPAL data type (Form). The form is the highest-level container object.

handle: A variable or pointer used to access and manipulate an object.

hierarchy: The relationship of objects in a form, derived from their visual, spatial relationship.

incremental development: A process of application development in which parts of the application can be progressively designed and tested interactively.

index: A file that determines the order in which Paradox can access the records in a table. The key field of a table establishes its primary index.

inspect: To view an object's properties and methods. To inspect an object, either right-click it or select it with the keyboard and press F6. When the object's menu appears, the chooses the property or method he or she wants to examine or change.

key: One or more fields in a table used to order records.

method: ObjectPAL code attached to an object that defines the object's response to an event.

object: An encapsulation of code and data. Entities that can be manipulated in the system are objects.

Object Tree: A dynamic diagram that shows how objects in a form are related in terms of containership.

parameter: The variable into which an argument is passed. Used in defining procedures.

procedure: Code bracketed by the keywords proc and endProc. Unlike a method, it has no object to give it context.

properties: The attributes of an object. One right-clicks an object to view or change its properties.

resize: Altering the size of a screen object by mouse-dragging a corner of the object to the target position.

run-time library: A collection of pre-defined methods and procedures that operate on objects in specific types.

scope: The accessibility or availability of a variable, method, or procedure to other objects.

script: A collection of ObjectPAL code that executes without opening a window.

Self: An ObjectPAL variable. Self refers to the object to which the currently executing code is attached.

target: The object for which an event is intended. For example, when a user clicks a button, the button is the target.

type: A way of classifying objects that have similar attributes. For example, all tables have attributes in common, and all forms have attributes in common, but the attributes of tables and forms are different. Therefore, tables and forms belong to different types.

variable: A named location in memory to store data that can be accessed and changed in programs using the given name.

DETAILED DESCRIPTION OF A PREFERRED EMBODIMENT

The following description will focus on the presently preferred embodiment of the present invention, which is operative in the Microsoft® Windows environment. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Additional input/output devices, such as a printing device 108, may be included in the system 100 as desired. As shown, the various components of the system 100 communicate through a system bus 110 or similar architecture. In a preferred embodiment, the system 100 includes an IBM PC-compatible personal computer, available from a variety of vendors (including IBM of Armonk, N.Y.).

System Software

A. Overview

Figure 1B:
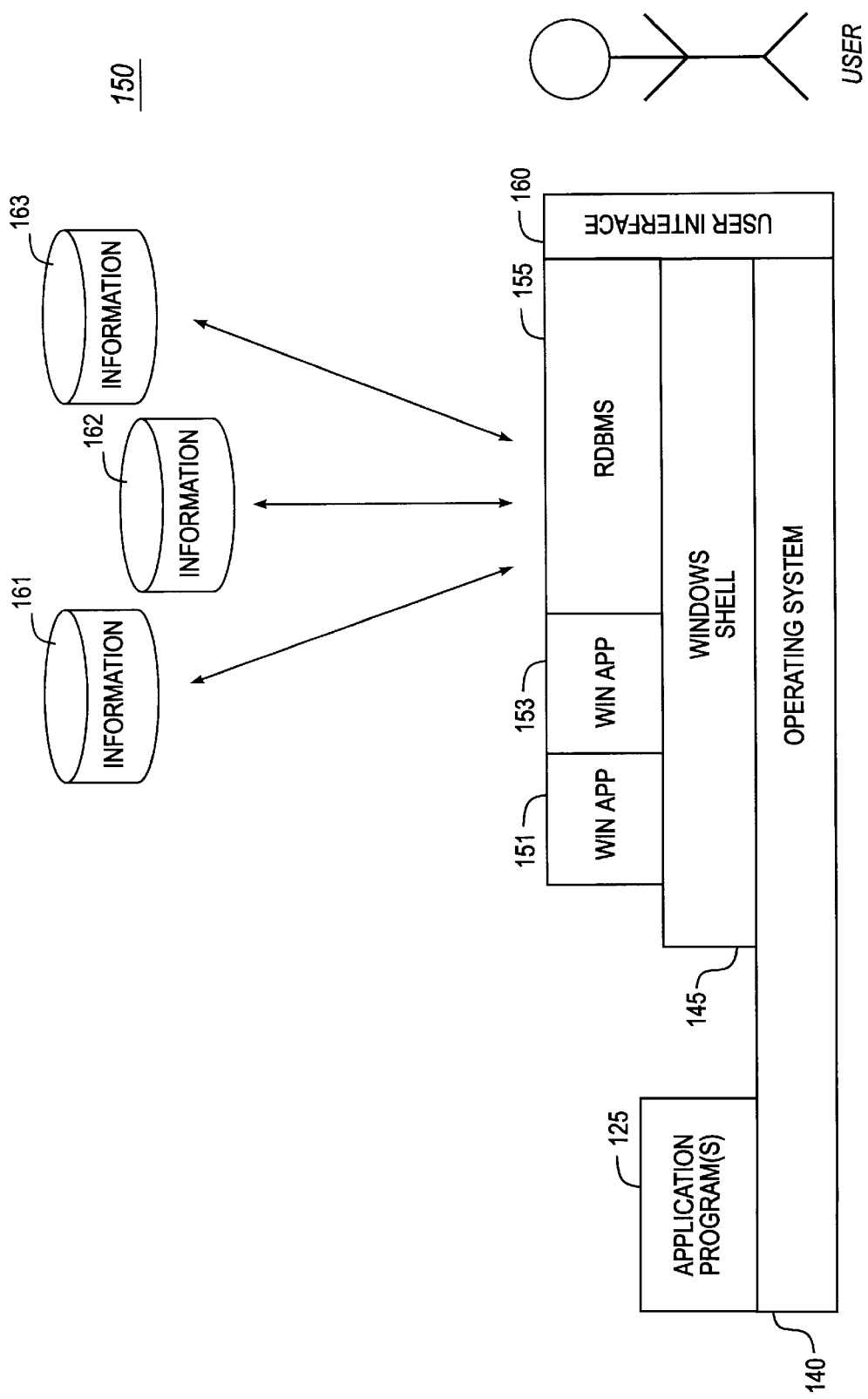
FIG. 1B is a block diagram of a software system of the present invention, which includes operating system, application software, relational database management system, and user interface components.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140. In a preferred embodiment, OS 140 is MS-DOS and windows 145 is Microsoft® Windows; both are available from Microsoft Corporation of Redmond, Wash.

B. Relational Database Management System

RDBMS 155 is a system that controls the organization, storage, and retrieval of information from a database. A database is an organized collection of related information or data stored for easy, efficient use. An address book is a database, as is the card catalog in a library, a company's general ledger, and a completed tax form. Thus, a database is a collection of one or more tables used to keep track of information, such as the information 161, 162, 163 of system 150.

In a preferred embodiment, RDBMS 155 includes Paradox® for Windows Database Management System, available from Borland International of Scotts Valley, Calif. General features and operation of Paradox® for Windows are described in the following Paradox® for Windows manuals (available from Borland): *Getting Started, User's Guide, Quick Reference Guide, Guide to ObjectPAL®,* and *ObjectPAL® Reference.* The disclosures of each of the foregoing are hereby incorporated by reference.

C. Graphical User (Windowing) Interface

1. System UI

Figure 2:
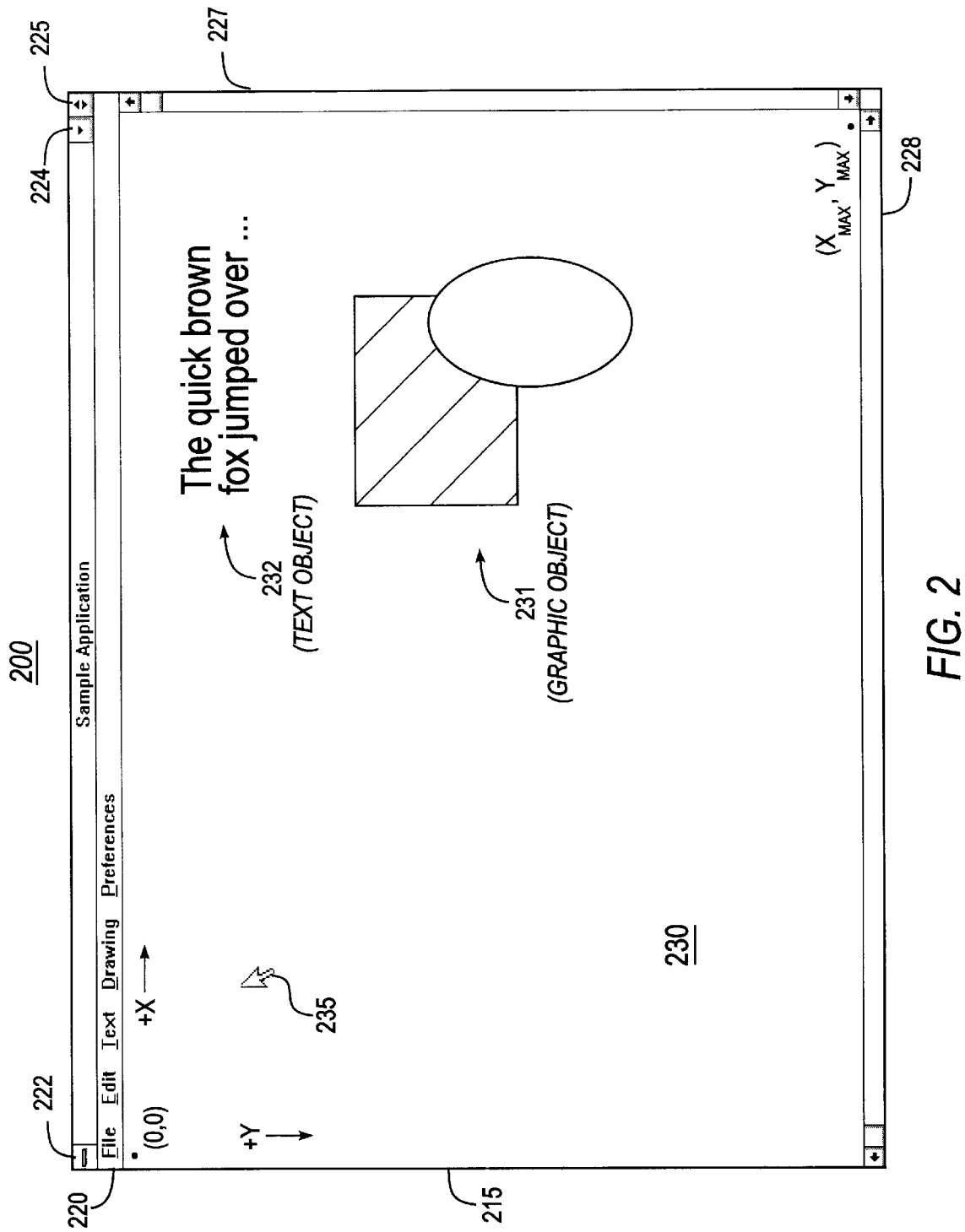
FIG. 2 is a bitmap screenshot illustrating the basic architecture and functionality of a graphical user interface (GUI) which the system of FIG. 1B includes for communicating with a user.

As shown in FIG. 2, the system 100 typically presents User Interface (UI) 160 as a windowing interface or workspace 200. Window 200 is a rectangular, graphical user interface (GUI) for display on screen 106; additional windowing elements may be displayed in various sizes and formats (e.g., tiled or cascaded), as desired. At the top of window 200 is a menu bar 220 with a plurality of user-command choices, each of which may invoke additional submenus and software tools for use with application objects. Window 200 includes a client area 230 for displaying and manipulating screen objects, such as graphic object 231 and text object 232. In essence, the client area is a workspace or viewport for the user to interact with data objects which reside within the computer system 100.

Windowing interface 200 includes a screen cursor or pointer 235 for selecting and otherwise invoking screen objects of interest. In response to user movement signals from the pointing device 105, the cursor 235 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 200 may be closed, resized, or scrolled by "clicking on" (selecting) screen components 222, 224/5, and 227/8, respectively. Keystroke equivalents, including keyboard accelerators or "hot keys", are provided for performing these and other user operations through keyboard 104.

In a preferred embodiment, GUI 200 is embodied in a message-based windowing environment. The general methodology for creating windowing interfaces and for retrieving and dispatching messages in an event-based GUI system, such as Microsoft Windows, is known in the art; see, e.g., Petzold, C., *Programming Windows,* Second Edition, Microsoft Press, 1990. Additional information can be found in Microsoft Windows Software Development Kit, including: 1) *Guide to Programming,* 2) *Reference, Vols.* 1 and 2, and 3) *Tools,* all available from Microsoft Corp. of Redmond, Wash. The disclosures of each of the foregoing are hereby incorporated by reference.

2. Desktop UI

Figure 3A:
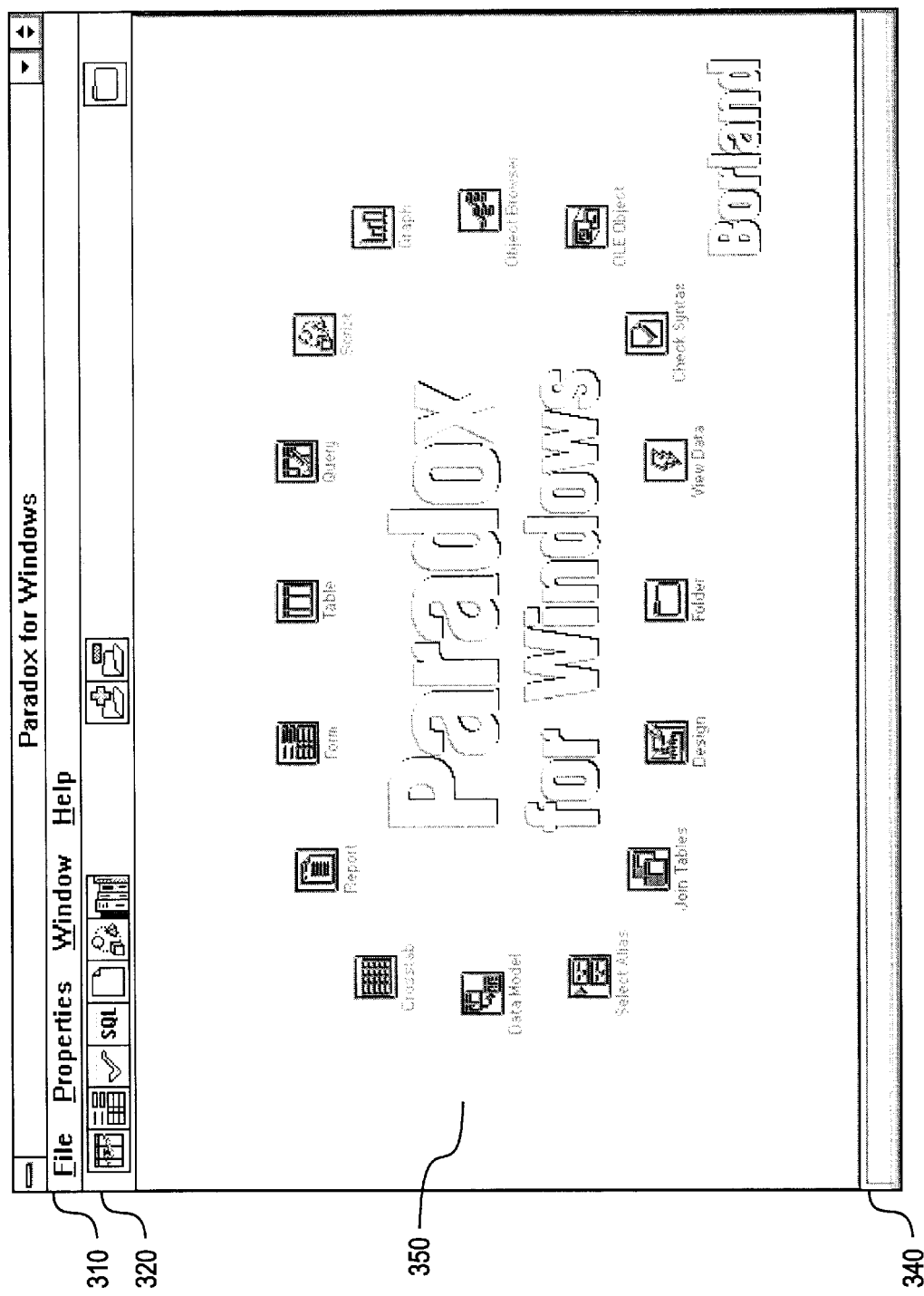
FIG. 3A is a bitmap screenshot illustrating a preferred desktop interface for the system of the present invention.

In addition to the general windowing interface 200 for system 100, the system includes a preferred application development environment, employing a database programming language (ObjectPAL®, available from Borland International). A preferred interface for the development environment will now be described. When a users starts the RDBMS system, a Desktop interface 300 first appears in display 106, as shown in FIG. 3A. The Desktop is the central working area in the system and serves as a "parent" window to all windows that appear in the system. It is where the user initiates all tasks. All windows are opened on the Desktop and are contained by the Desktop. Using the Desktop, the user can create and modify objects, set preferences, open and close files, and the like.

The Desktop may be divided into functional regions which include a main menu 310, a toolbar 320, a client area 350, and a status line 340. The menu bar 310 contains commands the user can choose to open windows, configure his or her Desktop, and work with his or her data. The menu bar is context sensitive, that is, it contains only the menus one needs at the moment. If a menu choice is not appropriate for a given task, it does not appear on the menu bar.

Figure 3B:
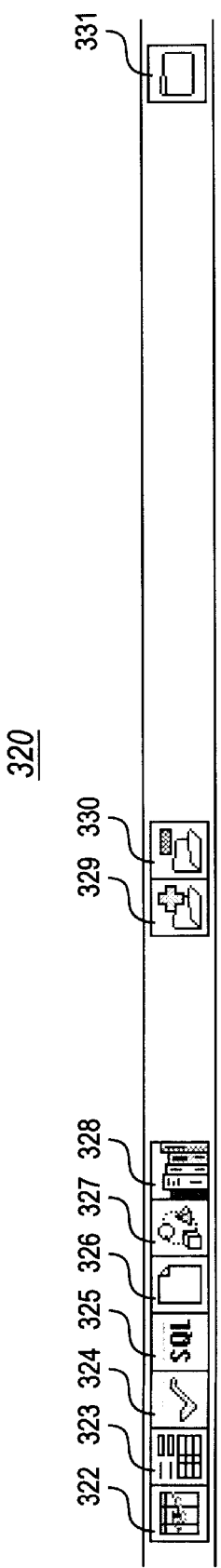
FIG. 3B is an enlarged view of a toolbar from the interface of FIG. 3A.

The toolbar 320 contains shortcut buttons for common menu commands. The toolbar 320, shown in further detail in FIG. 3B, comprises a row or palette of tools which provide a quick way for the user to choose commonly-used menu commands or properties. Like the menu bar, the toolbar buttons change as different windows are opened. To choose a toolbar button, one selects (clicks) it with the mouse. In an exemplary embodiment, the Desktop toolbar 320 includes Open (Create) Table 322, Open (Create) Form 323, Open (Create) Query 324, Open (Create) SQL link 325, Open (Create) Report 326, Open (Create) Script 327, Open (Create) Library 328, Add Folder Item 329, Remove Folder Item 330, and Open Folder 331 tools. The same actions are also available as corresponding commands in menus (available from menu bar 310). As with the menu system, toolbars are dynamic in the sense that only the tools available in a given context are displayed. The default action of a button (e.g., "Open" option of many of the buttons) is invoked by clicking the button with the left button of a two-button mouse device. An additional action (e.g., the "Create" option on certain buttons) is invoked by clicking the button with the right mouse buton.

The status bar 340 gives a user information about the task he or she is working on and the current state of the system. Like the menu bar and the toolbar, the appearance of the status bar changes as one works. As with the interface 200, standard Windows controls, like the title bar, the borders, the Control menu, the Maximize button, and the Minimize button are provided to let a user control the shape, size, and position of the Desktop.

Desktop 300 includes a client area 350, which functions in a fashion similar to that for the above-described Windows interface 200 (in FIG. 2) for displaying and manipulating screen objects of interest. In addition to simple text and graphic objects, the system provides the user with a set of sophisticated objects for storing and presenting his or her data. These will now be described in turn.

3. System Objects (a) Tables and Design Documents

Figure 3C:
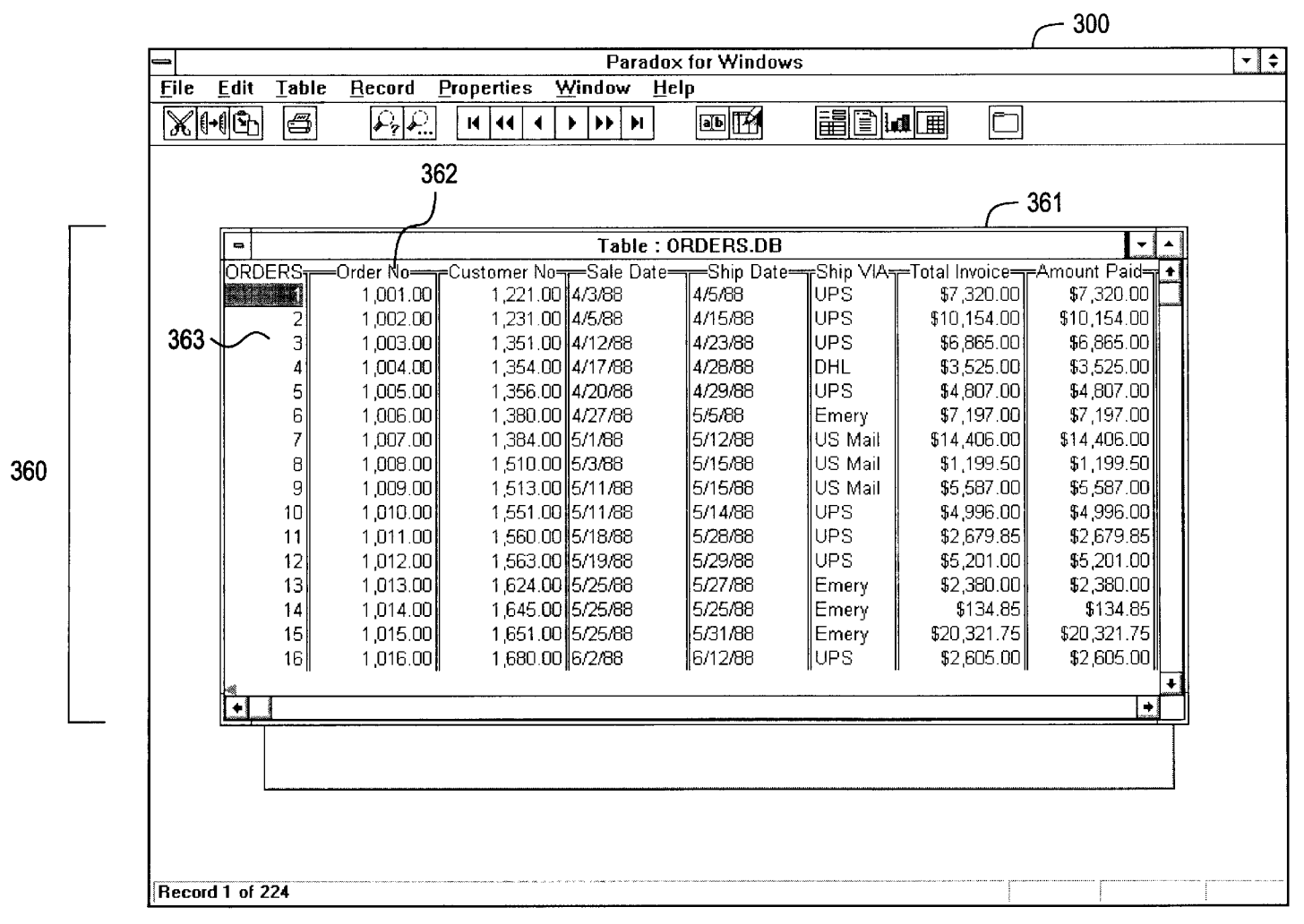
Figure 3D:
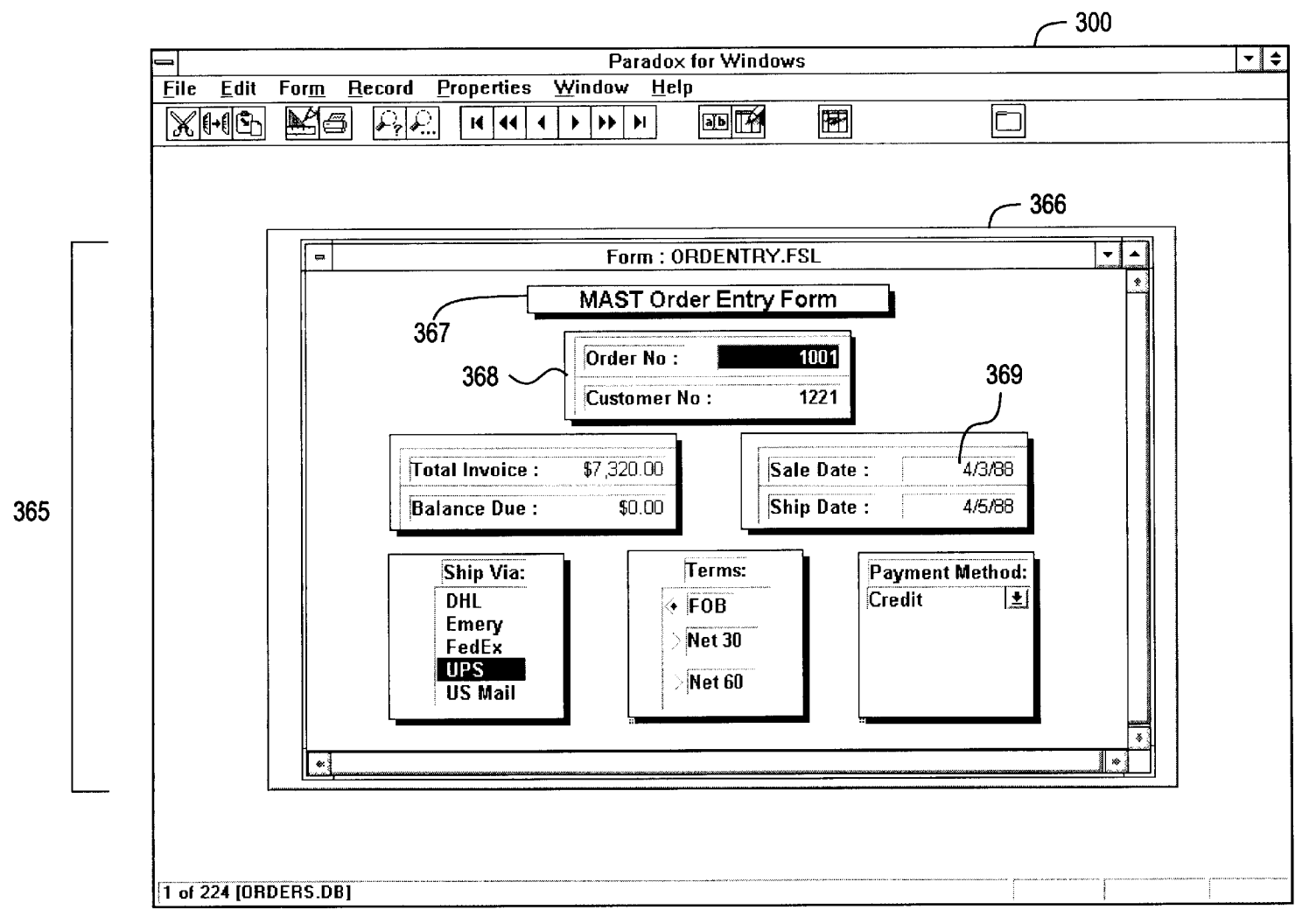
Figure 3E:
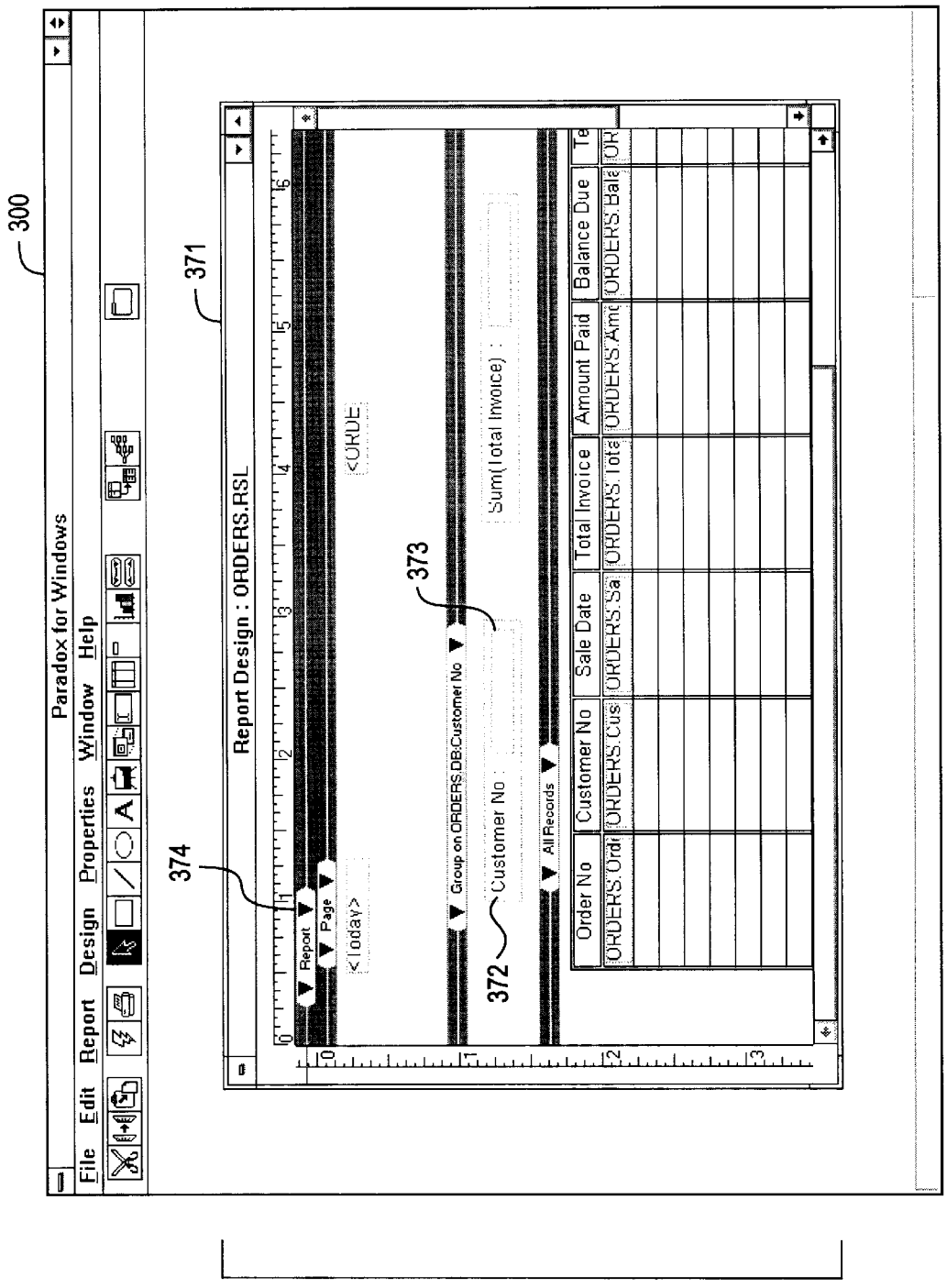

The system provides a set of objects including table, form, report, query, script, and library objects. As shown in FIGS. 3C–E, each type of major object in the system appears in its own type of window within the client area 350 and is itself comprised of objects. Table 361, for example, appears in a Table window 360; it comprises row and column objects 362, 363. Form 366 appears in a Form window 365 and includes (among other objects) an edit field object 369, a box object 368, and a text object 367. Similarly, Report 371 appears in a Report window 370 and includes, for instance, a report band object 374, a field object 372, and an edit field 373 (contained within the object 372). Each type of window includes specialized commands and functions that apply only to that type.

The windows are contained within the Desktop 300; here, the commands and functions of the Desktop remain available to all the objects. Once one learns to work with one type of object, he or she can work with similar objects. For example, when the user knows how to edit tables using Table windows, he or she can also edit tables using Form windows. When one knows how to design forms, he or she has the basics of designing reports.

While tables (e.g., Table 361) are the objects that users will use the most in the system, users will often want to display information in a format which is not tabular. For this purpose, the system provides "design document" objects. Form 366 of FIG. 3D and Report 371 of FIG. 3E are design documents, for instance. Each allows the user to customize how the user's data are presented. For instance, a user can create design documents that display one record at a time, display multiple records at a time, display only certain fields of a table, display design features (e.g., lines, boxes, graphic images, shading, or special colors), and the like. Design documents can also link together different tables, so that information stored in separate tables appears to the user to come from one place.

Forms and reports differ as follows. Forms are editing tools which let the user display and edit data in his or her tables. The user can, for example, create forms that add data to several tables at once. Reports, on the other hand, are printing tools. They allow the user to format and print his or her data. A user can, for example, use reports to create form letters, mailing labels, invoices, and the like. Unlike forms, reports cannot change the data in a user's table (though they can change the way his or her data appears on a final report).

Underlying the design document is one or more tables that contains the data which the user wishes displayed on screen or printed in a report. Thus, the task of creating a design document is one of choosing the table (or tables) that contains the data desired; defining the relationships between tables (in the instance of a multi-table design document), specifying the fields desired to be displayed in the design; and choosing an initial design layout for the document.

Thus, the system provides a set of objects including table, form, report, query, SQL, script, and library objects. Each type of major object in the system appears in its own type of window when opened/created via the appropriate toolbar button, menu selection, or hot key. Any number of these window types can coexist on the screen, either tiled or overlapping, as is known in the computing art. Each type of window includes specialized commands and functions that apply only to that type.

(b) Design Document interface

To create a new design document, the user first opens a design window for the type of document desired. For Form design, for instance, the system displays a Form Design Window 400 containing an empty Form object 450, as shown in FIG. 4A. This Form object is the result of either selecting the menu sequence File|New|Form from the desktop of FIG. 3A, or from a right-button mouse click on the Open/Create Form icon on the desktop toolbar. The Form Design Window 400 includes its own main menu 410, toolbar 420, and scroll bars 451.

The toolbar 420 includes editing and drawing tools for designing, updating, and testing the Form: Cut to Clipboard 421; Copy to Clipboard 422; Paste from Clipboard 423; View Data (Run Form) 424; Print 425; Selection Arrow 426; Box Tool 427; Line Tool 428; Ellipse Tool 429; Text Tool 430; Graphics Tool 431; OLE Tool 432; Button Tool 433; Field Tool 434; Table Tool 435; Multi-Record Tool 436; Graph Tool 437; Crosstab Tool 438; Data Model 439; Object Tree 440; and Open Folder 441. As with the menu sytem, toolbars are dynamic in the sense that only the tools available in a given context are displayed. For instance, if no data has been cut or copied to the clipboard, the Paste from Clipboard button will be dimmed and inoperable. The ruled border 452 serves as an aid for the designer when positioning boxes, buttons, and other objects inside the form.

Using the design interface, the user may place the objects he or she needs on the document. Then, the user may program the form by simply attaching methods to form objects and changing the property of the objects on the document until they appear as desired. This aspect will now be described in further detail.

D. Visual Design

1. Attaching methods to a button object

Referring now to FIGS. 4A–H, an exemplary session using the object-based visual programming methods of the present invention is illustrated. This example builds a program which provides a customized button that responds to a specific user event, a mouse click, by displaying a dialog box. In particular, the example shows how to attach program code (Borland's ObjectPAL® in an exemplary embodiment) to a button so that the code executes when the button is clicked.

The traditional way to demonstrate how to use a new language is to present a simple "Hello, world!" program—a program consisting of the minimum code needed to display the message "Hello, world!" on screen. The classic "Hello, world!" program in the C language, however, is not interactive. The program is simply executed and the message appears. In contrast, ObjectPAL is a language for creating interactive, event-driven applications. In the following "Hello, world!" application, the user controls when to display the message and when to put it away. The button is programmed to display a dialog box, but the code executes only when the user clicks the button.

Figure 4B:
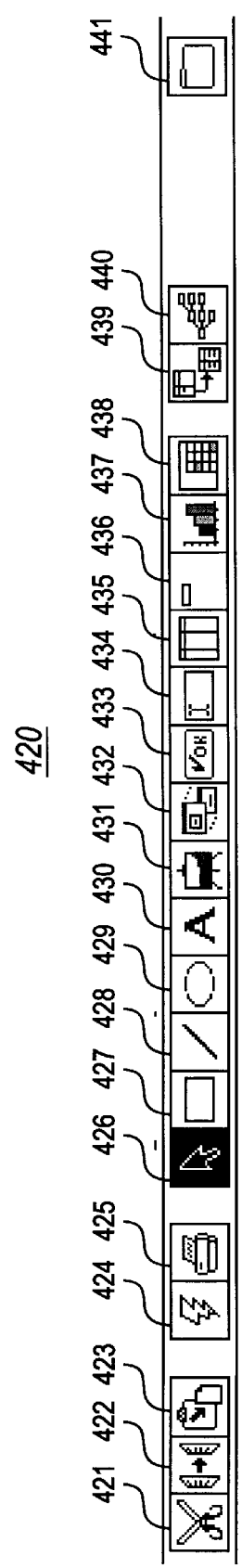
FIGS. 4A–4J are bitmap screenshots illustrating preferred design-mode and run-mode interfaces for the system of the present invention.
Figure 4A:
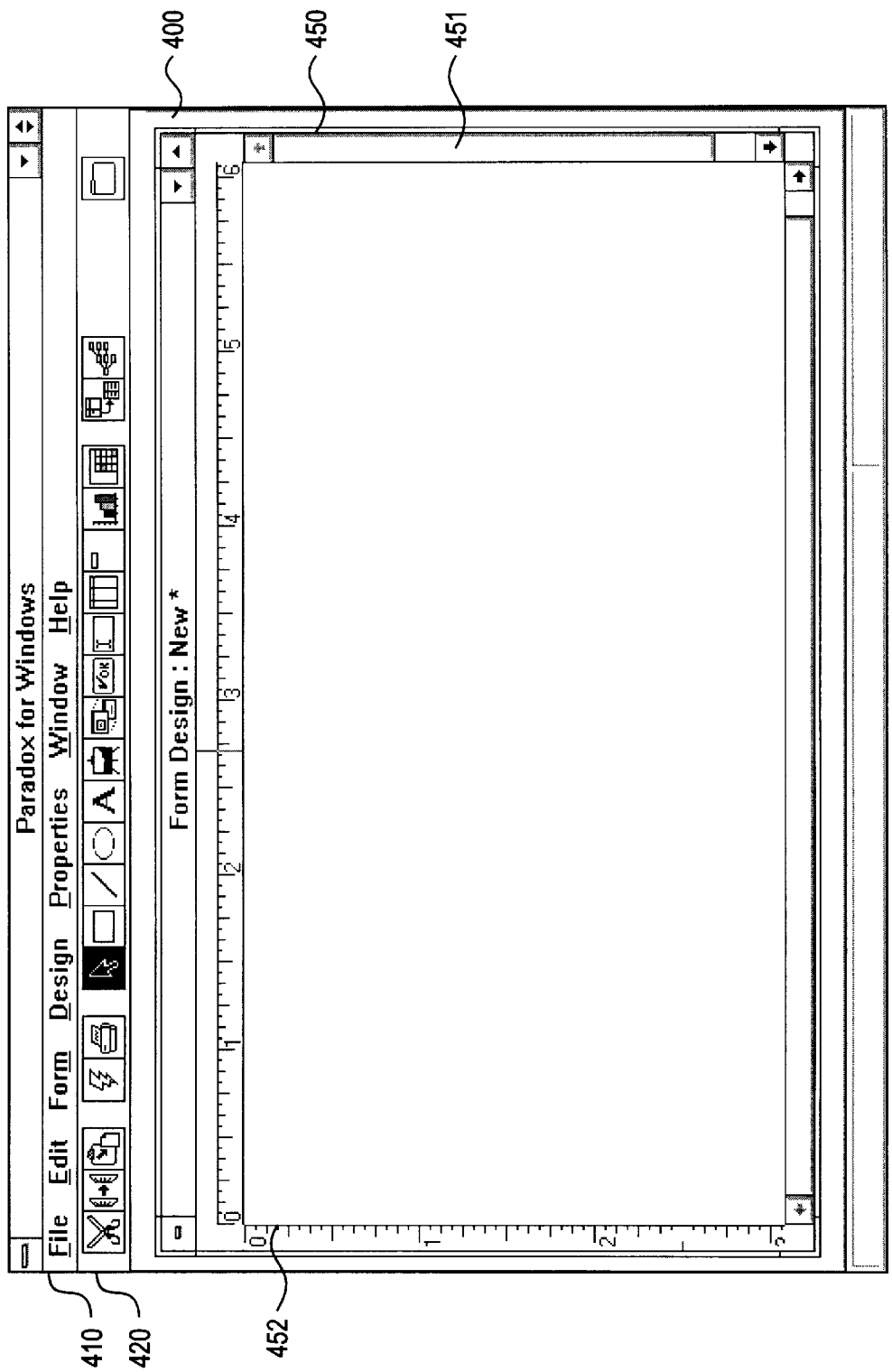
Figure 4C:
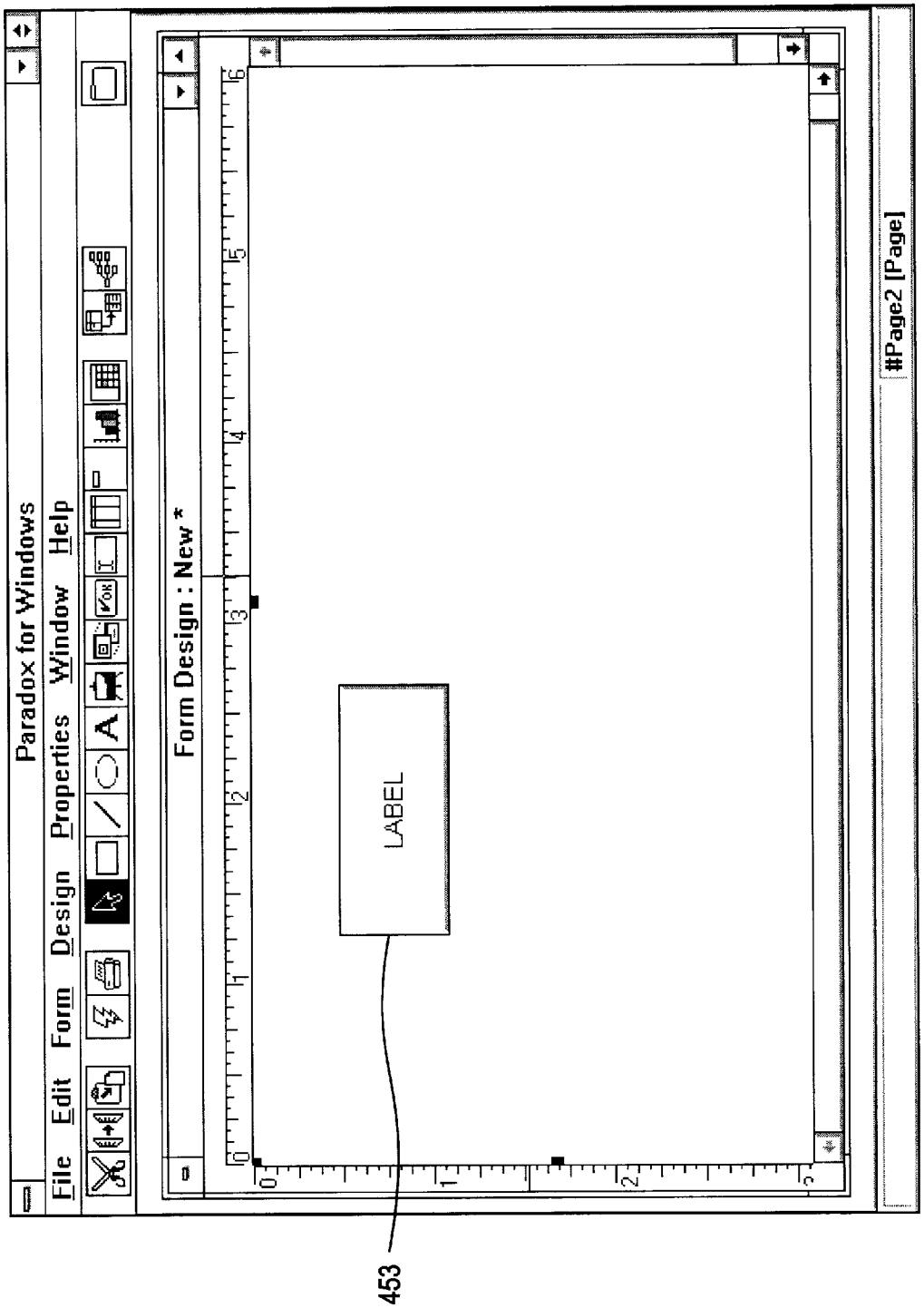

Starting from the empty Form Design window shown in FIG. 4A, the programmer starts by clicking on the Button Tool icon 433 (shown in detail in FIG. 4B). This results in the display of a "default" button 453 with the generic name "LABEL" as shown in FIG. 4C. Like other properties of the button, the button name can be changed at any time during design. The button can now be "dragged" and "resized" to any position within the form using the mouse or equivalent keystrokes. Ruled borders 452 are provided to assist the designer in positioning and sizing the button.

The incremental development feature embodied in the invention lets the user test each step of the evolving program. If the user clicks the View Data (Run Form) toolbar button 424, the program is incrementally compiled and the screen switches from design mode to run mode. The toolbar changes to offer run mode options (as shown later in FIG. 4I). In run mode, the button can be clicked to test its default behavior. At this point in the example, since no event-handling methods have yet been attached to the button object by the user, the only effect of clicking the button is a purely visual change as the button seems to press into the screen. Releasing the mouse click restores the button appearance. These default actions are built into every button object so the programmer is not concerned with coding such behavior. The programmer continues by switching back to design mode by clicking the Form Design button.

Figure 4D:
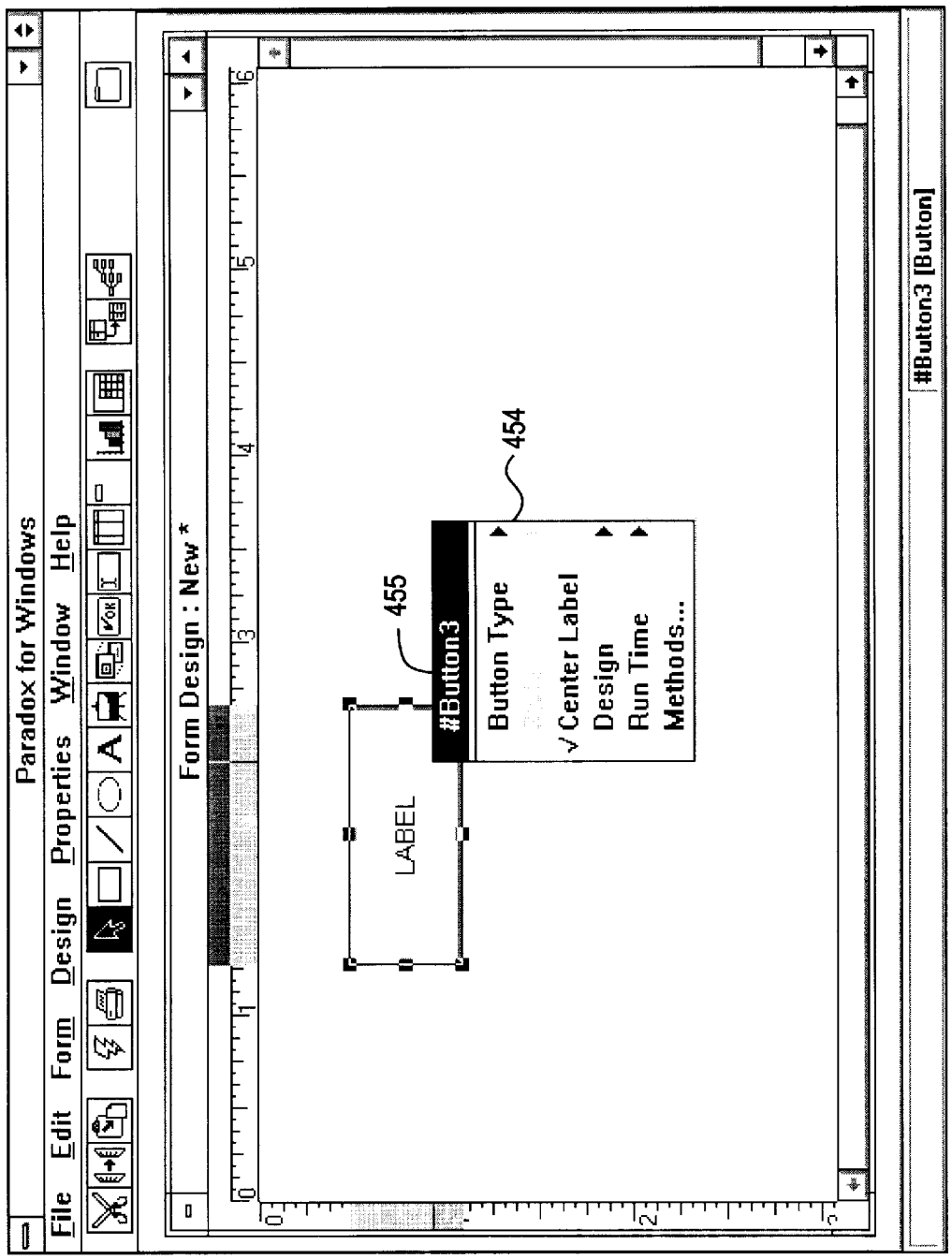

Referring now to FIG. 4D, the method of the present invention for attaching methods to objects and changing the property of those objects will now be described. As shown in the figure, the button is "inspected" to reveal its current properties and methods. Specifically, the object is inspected by right mouse clicking the object. The first stage of inspection invokes a popup menu 454 from which the programmer can select a button property, such as Button Type, Center Label, or Design, or select the Methods menu item. Its properties determine its appearance. As shown, the Center Label property is on by default, as indicated by the check mark in the Center Label menu item. The other property menu items in 454 call up submenus when selected from which various properties, such as type and style, can be customized.

The button object itself is automatically assigned a generic name, shown as #Button3 in the menu title bar 455. Clicking on this bar invokes a button-name dialog box allowing the programmer to assign a more meaningful name, such as Hello Button, to the button object. This can be a useful mnemonic if later coding needs to refer to the button object. The button object name should not be confused with text displayed on the button. The latter is controlled via a Label Text property and can be set to any appropriate text string, such as "Press Me" or "Say Hello!".

Figure 4E:
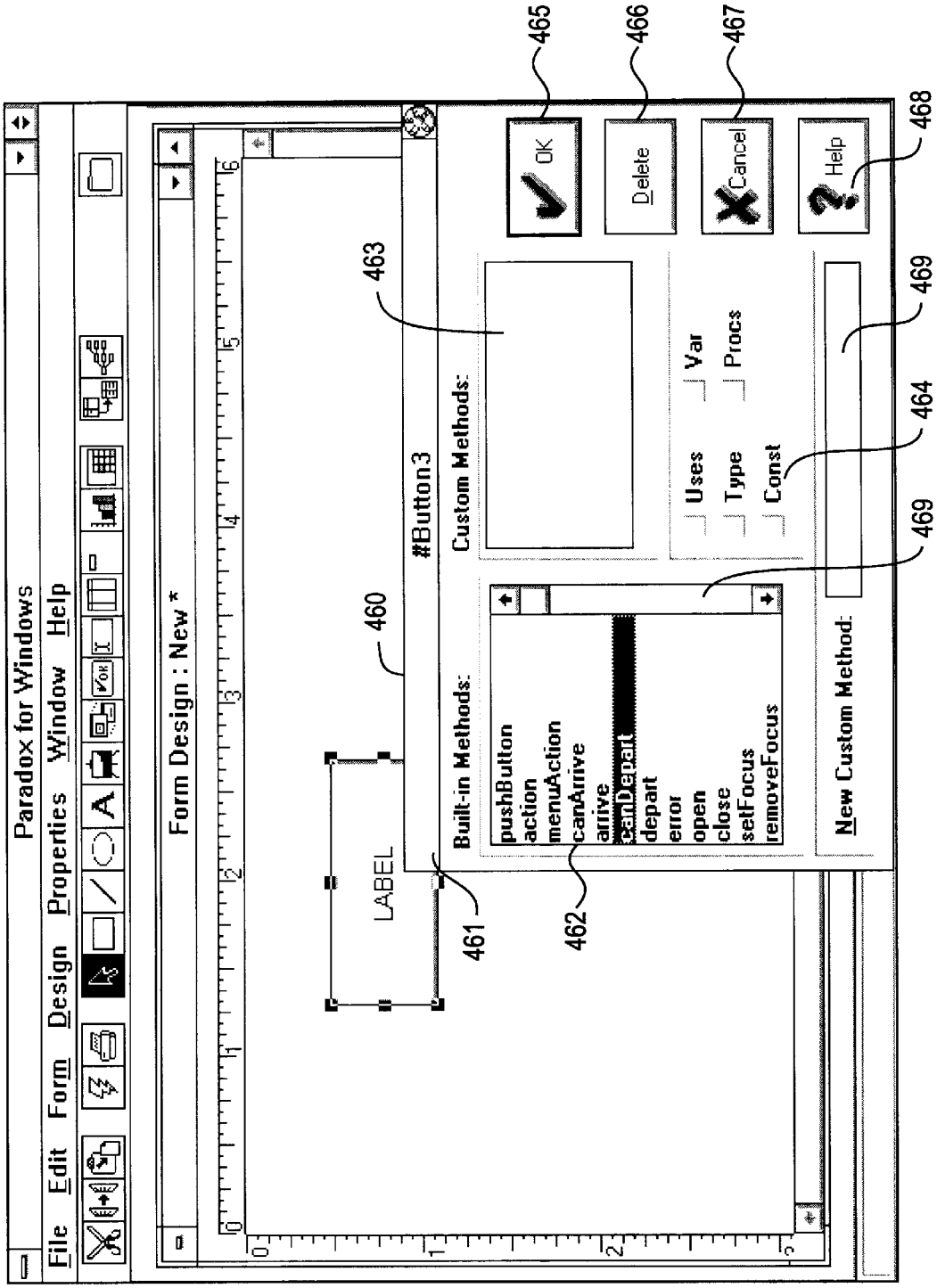

Every object in a form (as well as the form itself) includes built-in methods that execute in response to events. A button object's methods include pushButton, action, menuAction, and so on, which determine what happens when the button is clicked. Specific actions to be triggered by the button can be achieved by editing the default methods or by writing new methods which are "attached" to the appropriate button object. To inspect the default methods attached to #Button3, the Methods . . . option of the menu 454 is selected; this invokes the Methods window 460, as shown in FIG. 4E. Window title bar 461 shows the name of the object being inspected. A Built-in Methods listbox 462 lists the built-in (default) methods already attached to the button. This list is scrollable (using the vertical scrollbar 469); particular methods can be inspected by double-clicking the target name or by selecting a method and then clicking on OK button 465. Selected methods can be unselected via Cancel button 467, or deleted by clicking Delete button 466. On-line help is available on-demand by selecting Help button 468.

The Custom Methods box 463 lists the names of additional custom (user-defined) methods that have been attached to the object being inspected. Additional custom methods may be defined using New Custom Method edit box 469. Radio buttons 464 allow the programmer to inspect any libraries, custom data types, variables, procedures, or constants associated with the current object.

Figure 4F:
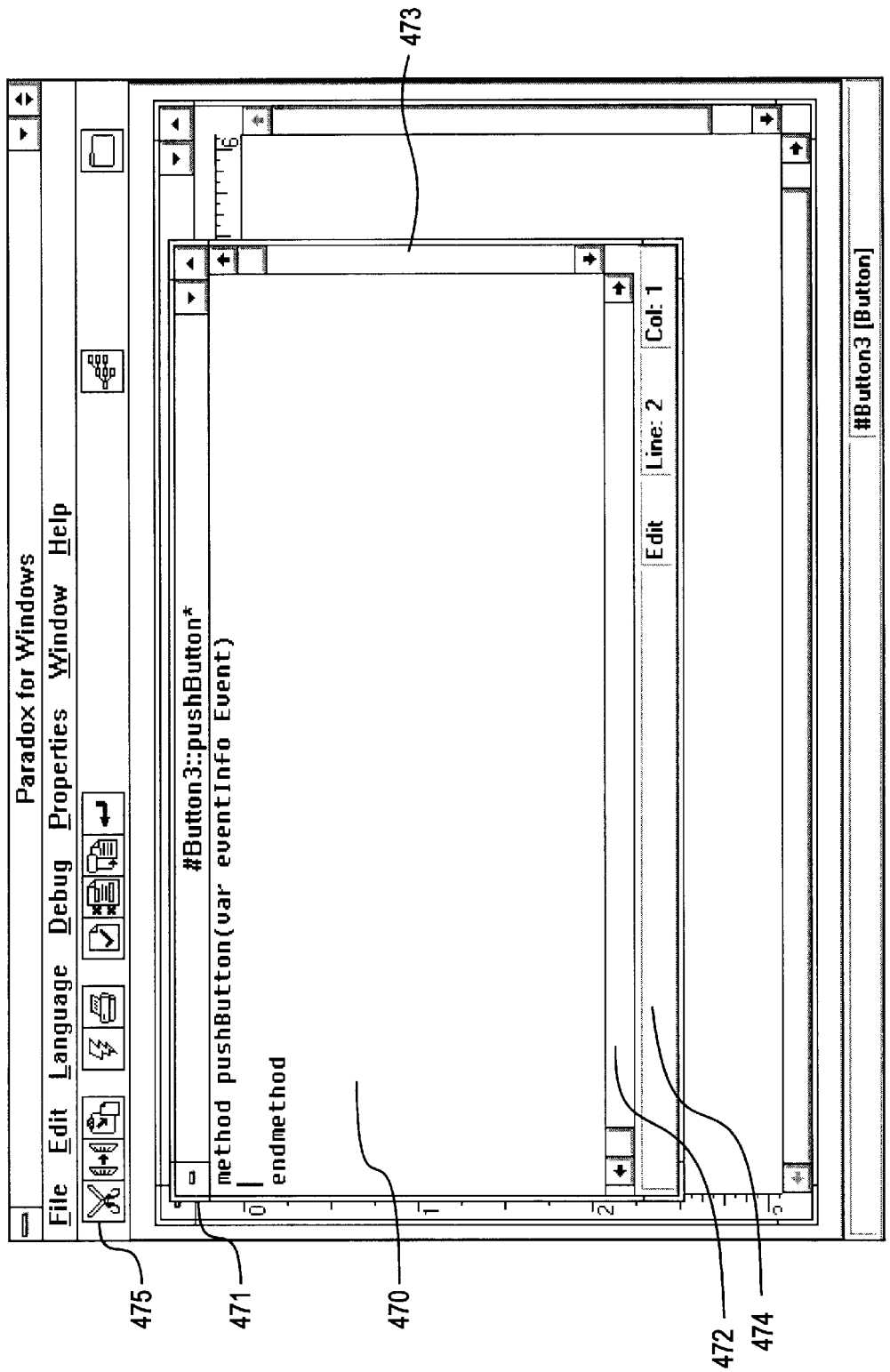

The behavior of the button object can be varied in two ways: the built-in methods can be edited or new custom methods can be written. For the example at hand, the built-in pushButton method will be changed to make it respond to a push-button event by displaying a dialog box. This is achieved as follows. The user selects (e.g., double-clicks) the pushButton item in list 462, thereby invoking an Editor Window 470 as shown in FIG. 4F. This a full text editor with horizontal and vertical scrollbars 472/3. The editing tools in the toolbar 475 offer cut, copy and paste, as described earlier, together with printing options. A status bar 474 of the window displays the cursor position and editing modes. The title bar displays #Button3::pushButton, which is the "extended" or "qualified" name of the method; the notation allows this object's pushButton method to be distinguished from other objects' pushButton methods.

As shown in FIG. 4E, the Editor Window 470 displays the following two lines of code representing the default push-Button method:

```
method pushButton(var eventInfo Event)
endmethod
```

The method definition allows the user to program steps which are to occur when a push-button event reaches this object. In addition to user-specified behavior, the object includes default behavior, for instance, the button appearance changes (to a pushed-in or depressed appearance) when the object is clicked. In a preferred embodiment, the steps of the built-in code are not displayed with the pushButton method; however, the system allows one to bypass the built-in code if desired. In general, the added code executes first, followed by the built-in code.

Figure 4G:
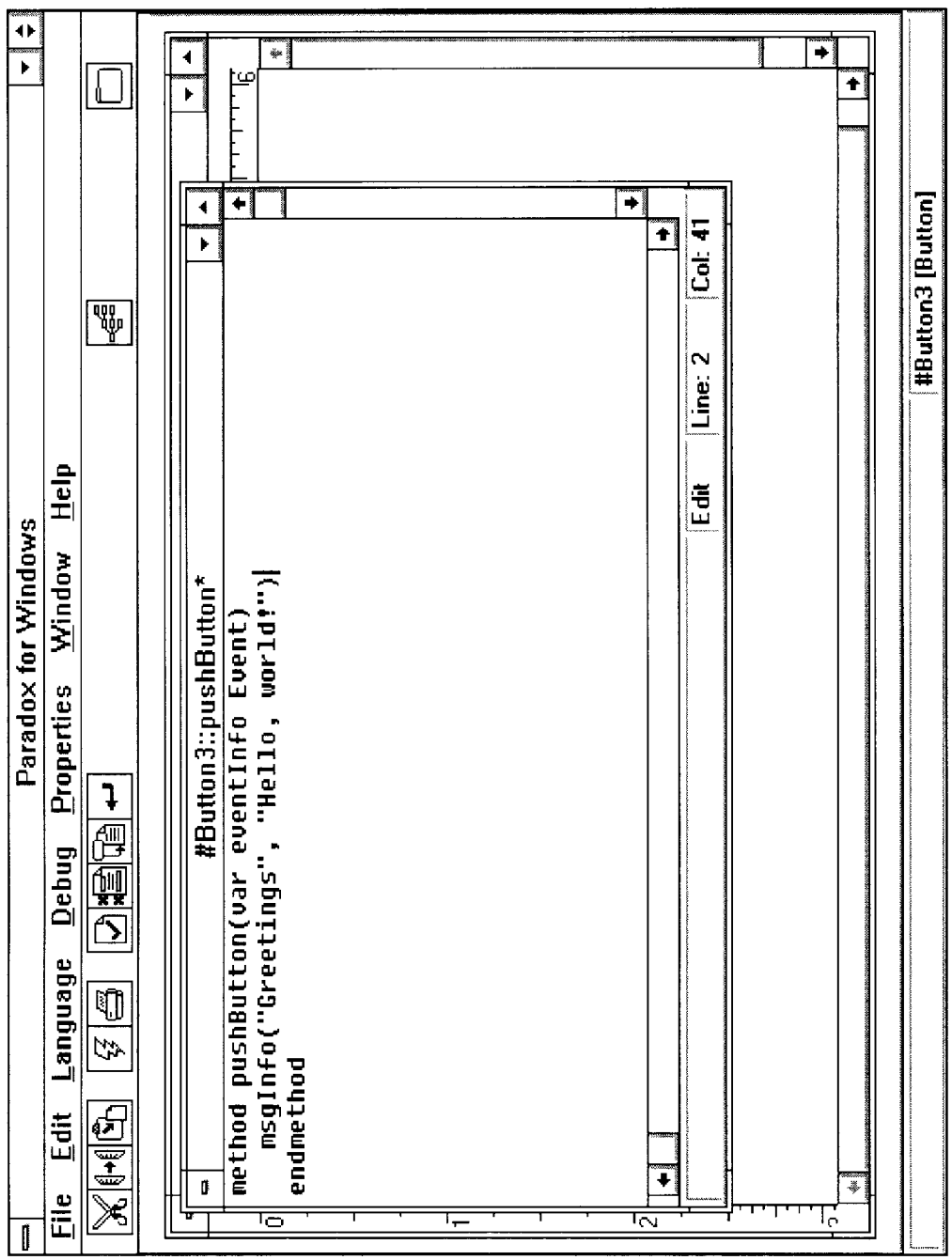

Continuing with the example, a line is added to the body of pushButton, as shown in FIG. 4G:

```
method pushButton(var eventInfo Event)
msgInfo("Greetings", "Hello, world!")
endmethod
```

The added line calls msgInfo; this instruction creates a dialog box when the pushButton method is executed. msgInfo is a standard procedure in the system which is provided as part of an ObjectPAL run-time library—a collection of pre-defined methods and procedures that operate on objects or data of a specific type. msgInfo takes two arguments or parameters. The first argument, "Greetings", specifies the text to display in the title bar of the dialog box, and the second argument, "Hello, world!" specifies the text to display in the dialog box itself.

Figure 4H:
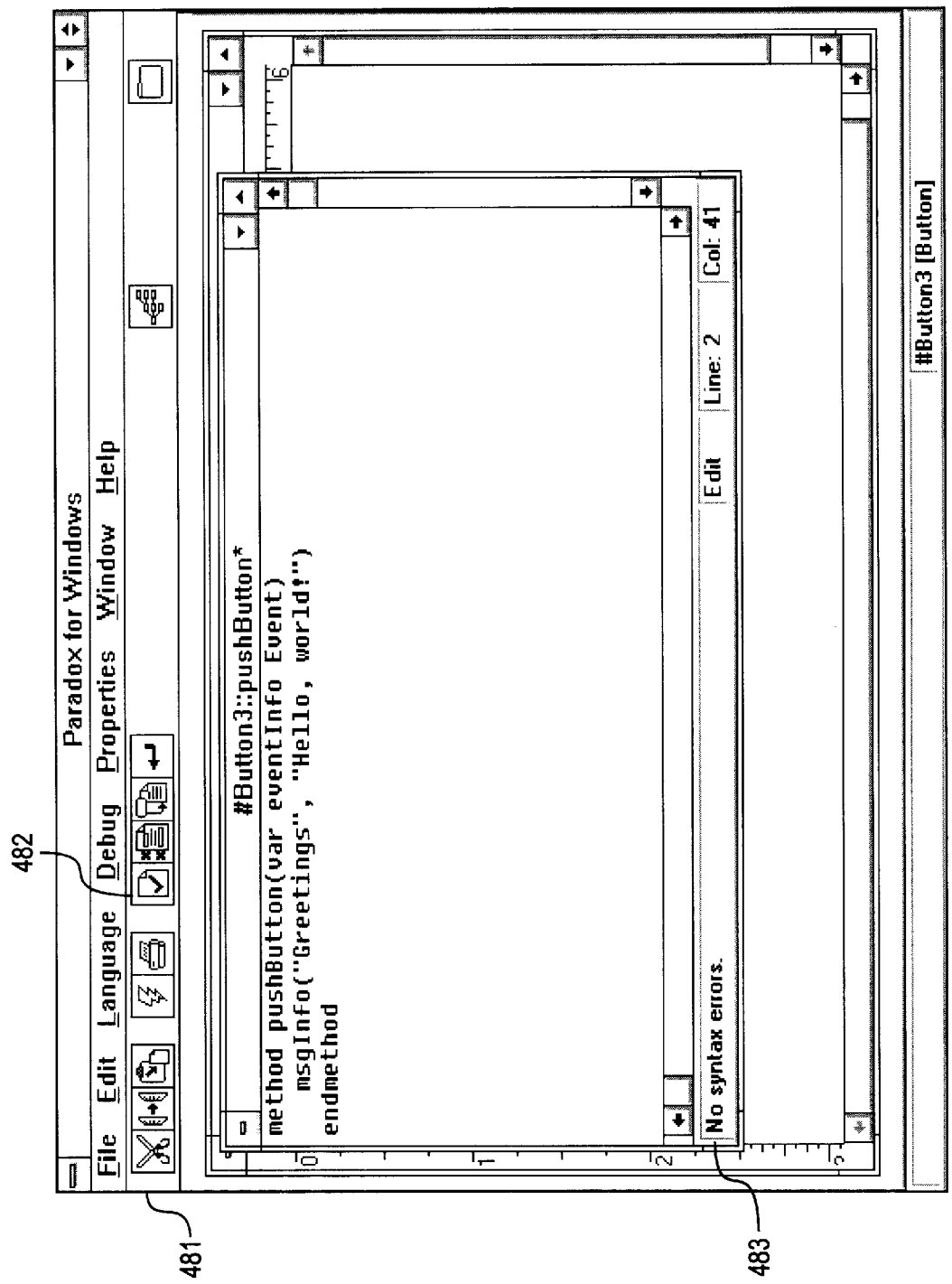

Before running the program, the syntax can be checked, as shown in FIG. 4H, by clicking Syntax Check button 482 on toolbar 481 or, alternatively, by selecting the menu sequence Language|Check Syntax. If there are errors, a message in the status bar 483 indicates the type of error. Otherwise, as shown in FIG. 4H, the message "No syntax errors" appears in the status bar and the edited code is saved. Errors can be corrected with the aid of the integrated debugger.

Figure 4I:
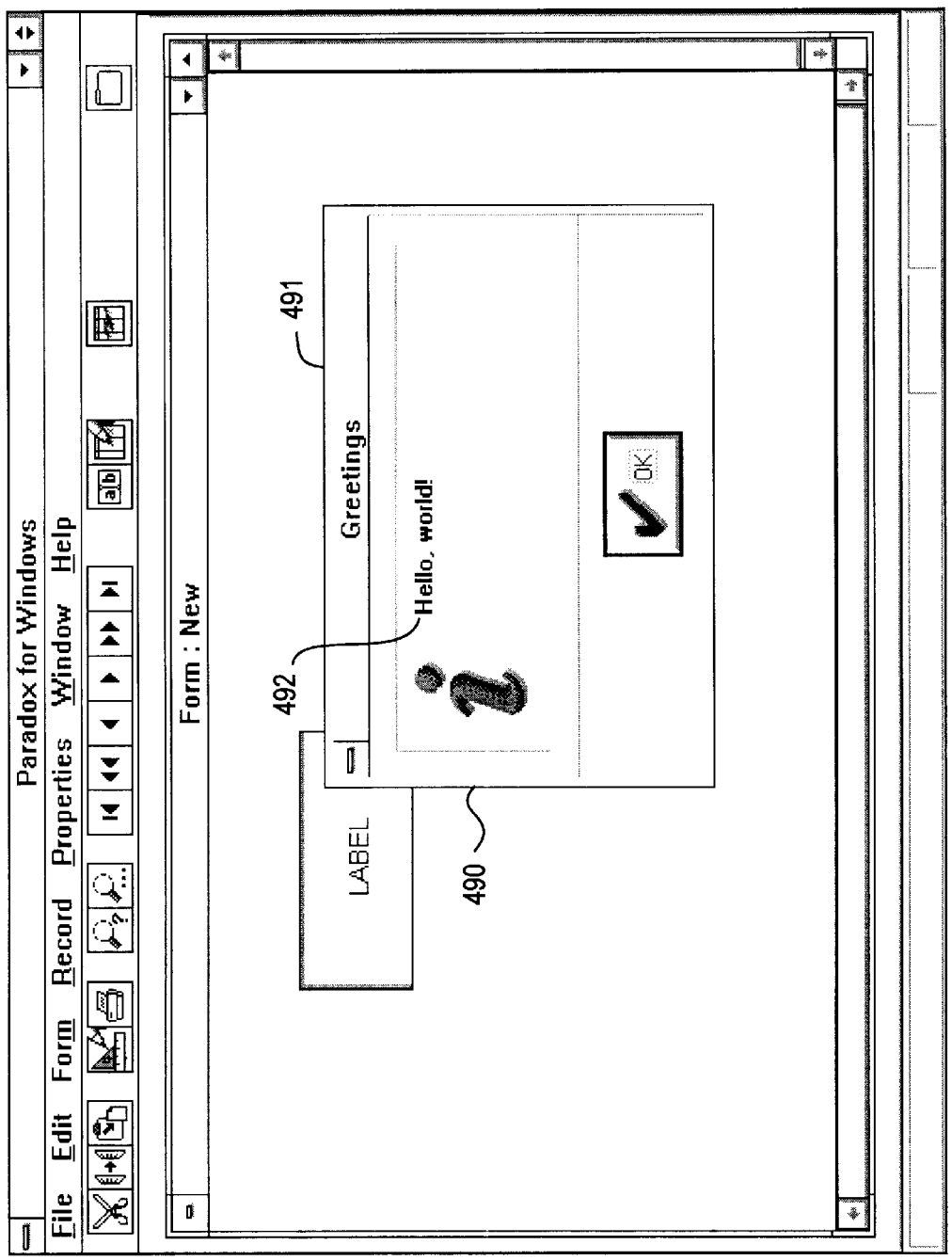

The program can now be executed by switching to run mode via the View Data toolbar button, as described earlier. FIG. 4I shows the result of clicking on the button in run mode: the action generates a push-button event which triggers the modified method #Button3.pushButton, which in turn calls the msgInfo function with the given arguments. The msgInfo function creates a Dialog box 490 having a title bar 491 displaying "Greetings" and a text body displaying "Hello, world!" 492 (as specified in the new pushButton method). Once the programmer is happy with the design, he or she can save the form with attached methods to disk.

2. Object reuse

Figure 4J:
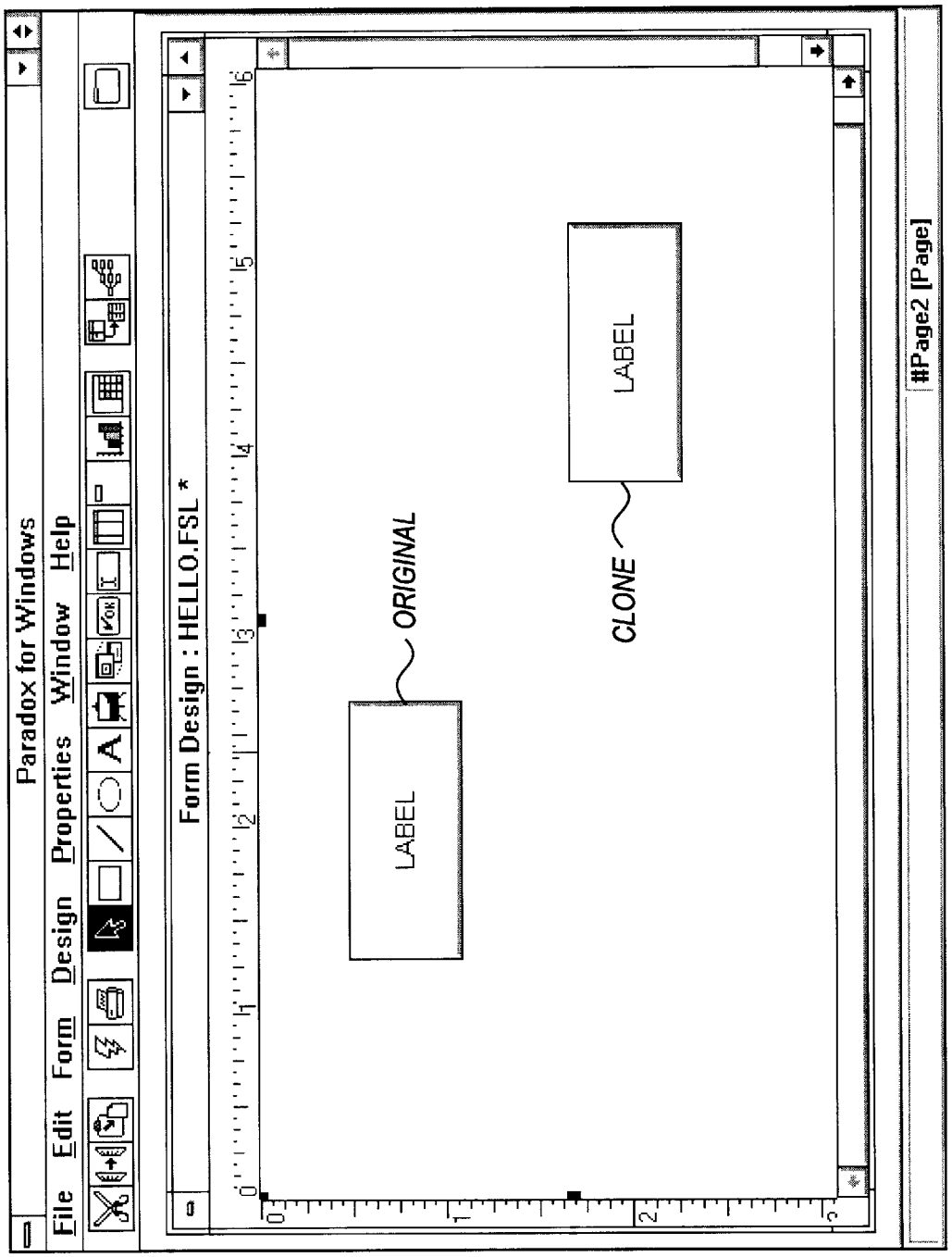

The button created during foregoing session can be easily reused in the same or other applications with little effort. As shown in FIG. 4J, the user may select the button in design mode, copy it to the clipboard, and then paste it directly to another part of the same or another form. By switching forms, which leaves the clipboard unchanged, the button object can also be pasted into an entirely different application form. In both cases, all the properties and methods (built-in and customized) copy over to the target form. The "cloned" button will display and react to events in exactly the same way. Alternatively, the copy button can be further edited for the new application.

The present invention provides the same clipboard copy-and-paste reusability for all objects. At the user interface level, a preferred technique for cutting and pasting one or more objects may be summarized as follows. First, the user selects one or more objects desired to be cloned. This may be done by simply "clicking" on the object, or "shift-clicking" for selecting a plurality of objects. Next, the user selects Copy (e.g., by clicking the Copy button from the toolbar 420). Alternatively, the user would issue a Cut command if he or she desires removal of the original object or objects. A destination is then specified by the user, again using selection technique. To place an object in a new form, for instance, the user need only click in that new form for specifying it as the intended destination. To specify a container as the destination, the user need only select the container object (e.g., by clicking it). Finally, the user completes the operation by issuing Paste (e.g., by selecting the Paste button from the toolbar 420). In response, the system will create a clone of the selected object or objects at the specified destination. In the process, the system checks for any incompatibilities between object types (e.g., attempting to place one object in another object which cannot contain it).

This "clip object" functionality is provided by extending Windows clipboard format to carry all of the information that is needed for an object (or group of objects). In addition to standard data types, such as text, bitmaps, metafiles, and the like, Windows clipboard accommodates user-defined formats. A general discussion of Windows clipboard services and formats may be found in Petzold's Programming Windows, as well as Microsoft's Windows SDK documentation.

In a preferred embodiment, an object format is defined to transport information about the object, including: (1) type of object ("Who am I?"); (2) object properties; and (3) object methods. The latter may be considered to be yet another property of an object. A structure specifying a proprietary Windows clipboard format (PXClipFormat) may be created as follows:

```
typedef enum
{
PXCF_NONE,          // cannot cut/copy or paste (as appropriate)
PXCF_NF,            // uiobject native format
PXCF_BITMAP,        // use CF_BITMAP
PXCF_TEXT,          // null terminated text
PXCF_NRT,           // our own internal rich text
PXCF_RTF,           // CF_RTF (if we decide to do it)
PXCF_META,          // MetaFile
PXCF_TEXT_DB,       // Database-only text read/write.
PXCF_NRT_DB,        // Database-only NRT read/write.
PXCF_DBASE_BLOB,    // Database-only non structured dBase Blob.
PXCF_WORDTEXT,      // File export/import only: DOS Word proc text
(paragraph=double cr/lf)
}PXClipFormat;
``` where PXCF_NF specifies a native object format. Once the format is registered with Windows, the system may cut and paste (memory blocks of) objects, including object properties and methods (e.g., stored as pcode). The system assumes responsibility for correctly interpreting the object format.

3. Event Model

All interactions with an application generate events. For each event, the system creates a packet of information and sends it to the form. By default, the form examines the event packet and dispatches it to the target object, which executes the appropriate built-in method. This behavior is governed by the event model. As previously stated, applications are developed by placing objects in a form and writing code to define how the objects respond to events. When users interact with these objects and generate events, the event-handling code executes. A single user action triggers a chain reaction of events and built-in methods that execute by default.

The system recognizes two kinds of events: internal and external. Internal events are triggered from within the system. Examples of internal events include opening and closing an object, arriving at and departing from an object, and timer events. External events are triggered by the user (or from within a method that simulates a user action). Examples of external events include keypresses, mouse clicks, and menu choices. Every design object has built-in default methods that respond to each of these events. For the convenience of the programmer, the system groups events into event classes: ActionEvent, ErrorEvent, Event, KeyEvent, MenuEvent, MouseEvent, MoveEvent, StatusEvent, and TimerEvent. The Event class handles general events while the others offer specialized services as their names imply.

Containership

A. Introduction

"Containership" is the notion that objects may be contained within other objects—"container" objects. For instance, the button object 453 of FIG. 4C is contained within the form object 452. Objects in a form coexist in a hierarchy of containers. For example, if a screen button is placed on a page of a form, the form contains the page, and the page contains the button.

An object's visual and spatial relationship to other objects within a containership model affects its properties and behavior. Position in the hierarchy is important since it defines what is "visible" (within "scope") to an object—what methods, procedures, properties, and variables of other objects are available. An object is "contained" if it is completely within the boundaries of the containing object. An object has direct access not only to its own methods, procedures, properties, and variables but also to those of objects within its containership scope. Containership, therefore, provides an intuitive, visual approach to object-based inheritance scheme.

Containership also provides yet another tool for reducing coding effort. This is perhaps best described by example. Consider a form containing a group of field objects. If there is a special action needed for each field, rather than attach the same custom code to each field object, a box can first be defined that surrounds the group of fields. Custom code can now be attached to this containing box. Since each field is contained in the box, the box's methods and custom code are made available to each field.

At the highest level in the containership hierarchy is the form itself; it is the starting container. If there is a special action needed for each object on a form, the user need only attach custom methods and procedures to the form to make them available to all objects contained by that form. The relationship between containership and scope applies not only to variables, but to object properties, custom methods and procedures attached to objects, the way objects handle events, and the way the system handles errors.

B. Event bubbling

Containership controls the way in which events are handled by the system. The containing form filters all events, both internal and external, for each of its contained objects. For internal events, the containing form knows the object target and passes on the event for immediate action. For external events, on the other hand, the system provides a mechanism, called event bubbling, for passing the event from object to object up a containership hierarchy until an object is reached that can fully handle the event.

Figure 4K:
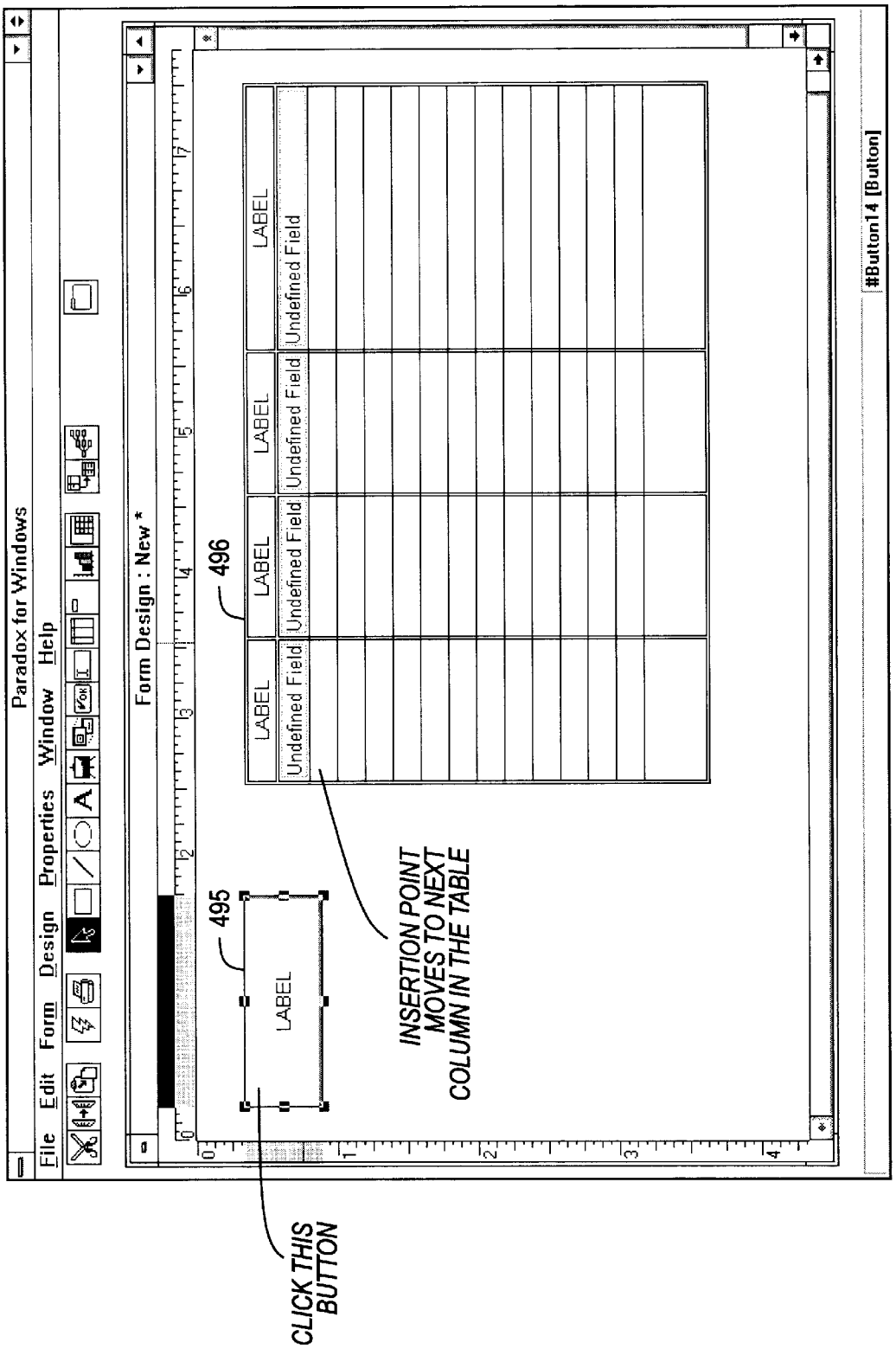
FIGS. 4K–M are bitmap screenshots illustrating the processing of events in the containership/event model employed by the system of the present invention.

Consider a form containing a button and a table frame. Objects will be placed on the form, and code attached to the button so that button clicks move the insertion point to the next column in the table frame. FIG. 4K shows such a form. The steps for creating it and attaching code are as follows: First, the user creates a blank form (e.g., by requesting File|New|Form from the Desktop). Next, the Button tool (433 of FIG. 4B) is selected to create a button 495 in the upper left corner of the form. The Table tool (435 of FIG. 4B) is invoked to create an empty table frame 496 to the right of the button. The table frame is renamed TFrame by inspecting it (as explained in the previous session), clicking the object's name from its menu, and typing the new name in the object-name dialog box. Now that the form design is complete, the next step is to attach code to the button so that the code executes when the button is pressed. The built-in pushButton method is edited as follows:

```
method pushButton(var eventInfo Event)
   TFrame.action(MoveRight)
endmethod
```

After closing the Editor window, the user may switch the system to run mode (using Form|View Data) to compile and run the form. Clicking the button at runtime moves the insertion point (highlight) in the table frame to the right after each click, until it reaches the rightmost field in the table frame.

Figure 4L:
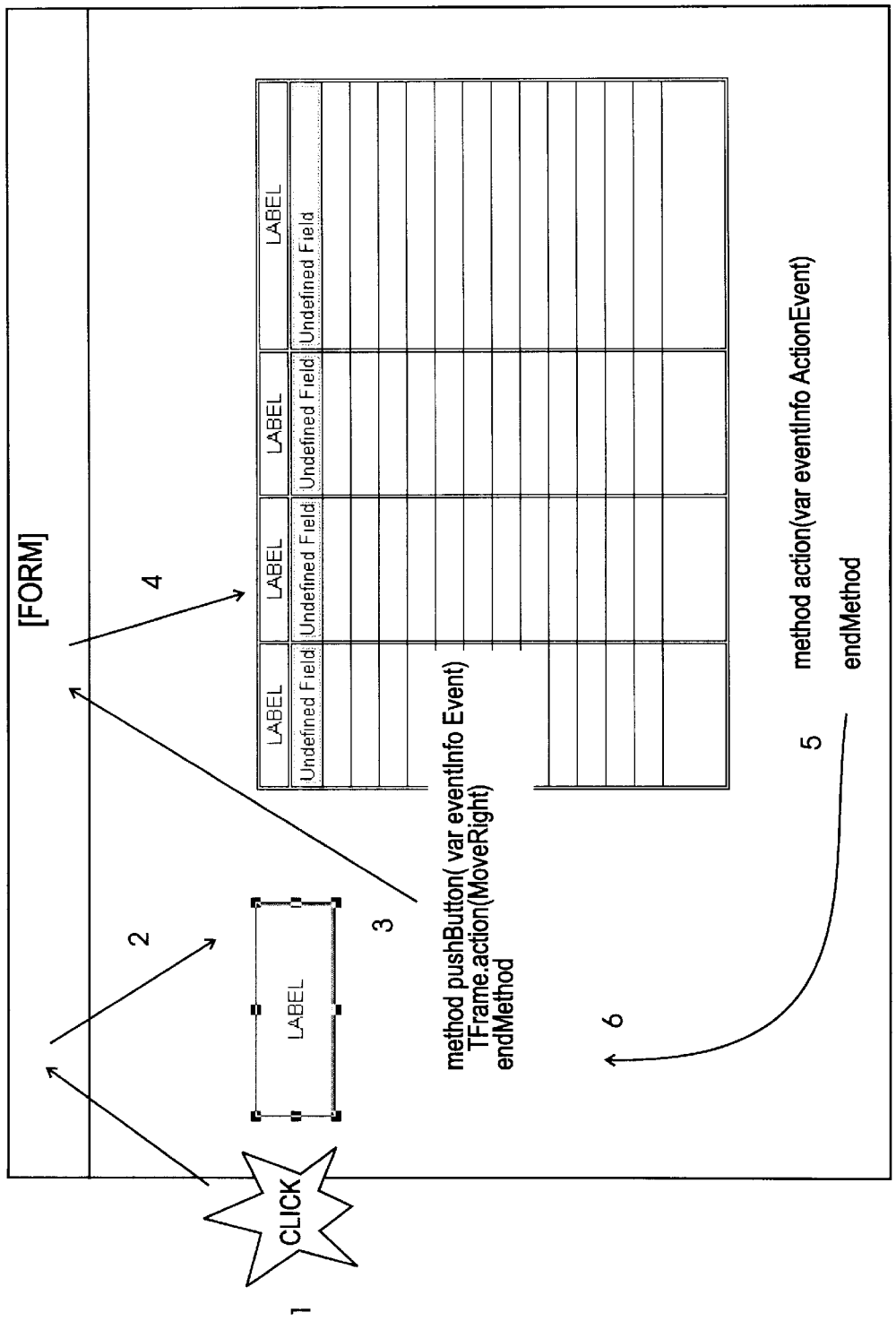

The containership-based event model employed by the system of the present invention may now be understood by examining the event handling sequence which occur for the form of FIG. 4K. First, a mouse click generates an event, as shown in FIG. 4L. The event goes immediately to the containing form. The form knows which object is the target and acts as a dispatcher for the event. Because the mouse was clicked when the pointer was over the button, the form's built-in pushButton method executes, and by default calls the button's built-in pushButton method. Next, the button's pushButton method executes. The button appears pushed in.

When the attached statement in the pushButton method executes, it generates another event:

```
TFrame.action(MoveRight)
``` which again goes first to the form. The form interprets this event. The form's built-in action method executes, and calls the built-in action method of the object named TFrame. The default code for TFrame's built-in action method executes, even though no code has been added to it. The insertion point moves to the right. Finally, the default code (portion) for the button's built-in pushButton method executes, and the button appears to pop out. Processing for this event is complete.

Figure 4M:
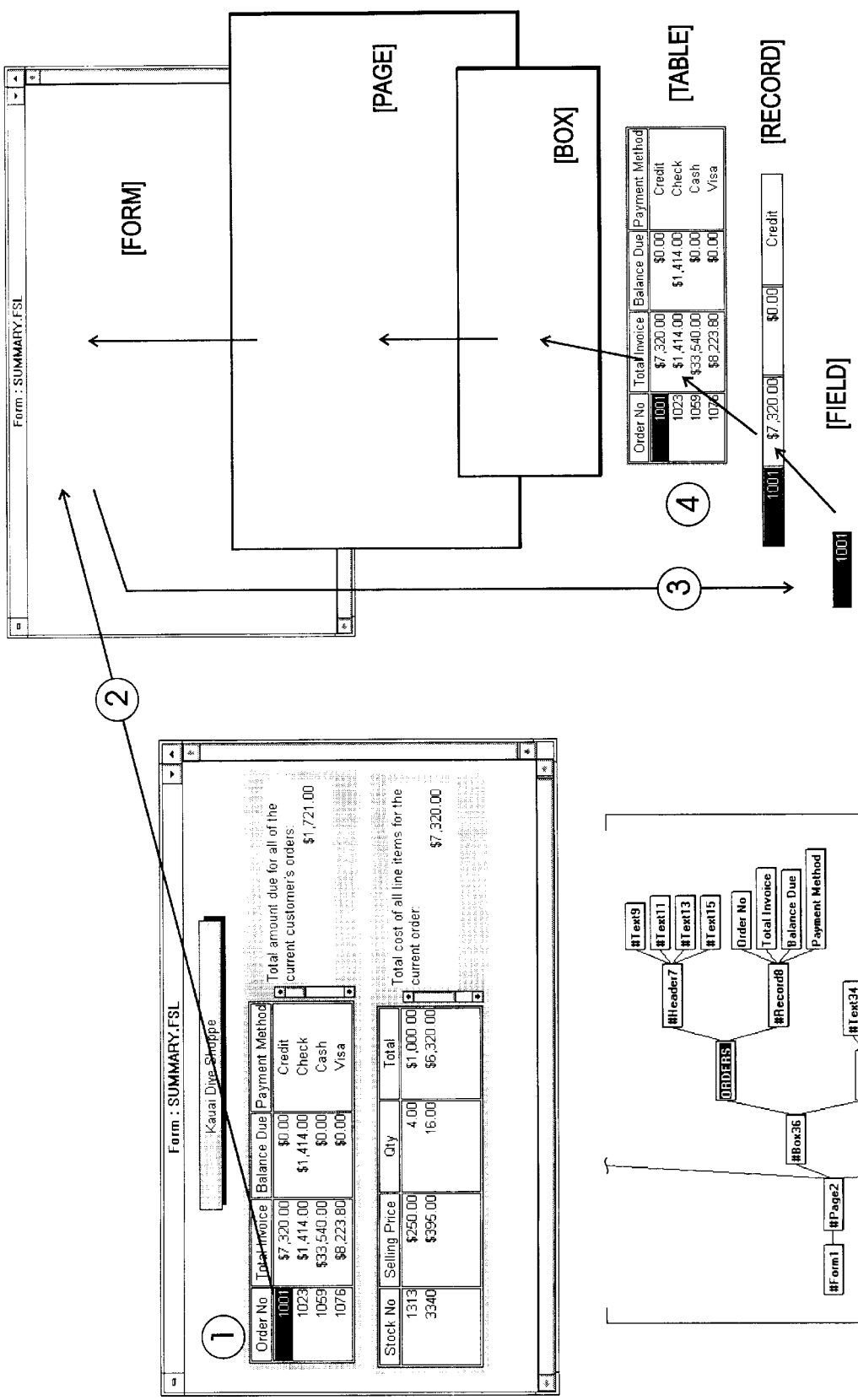

As another example, FIG. 4M illustrates event message processing for an event (e.g., keystroke) occurring in a field of a table frame. As shown, the event is passed to the form which processes the event (if of interest) and then passes the event back to the field where the event occurred. Passing the event to the form first is particularly advantageous for trapping a particular event for all objects. From the form, the event is passed back down to the field where it bubbles up the containership chain for processing.

C. Visual containership with auto-embedding

Figure 5A:
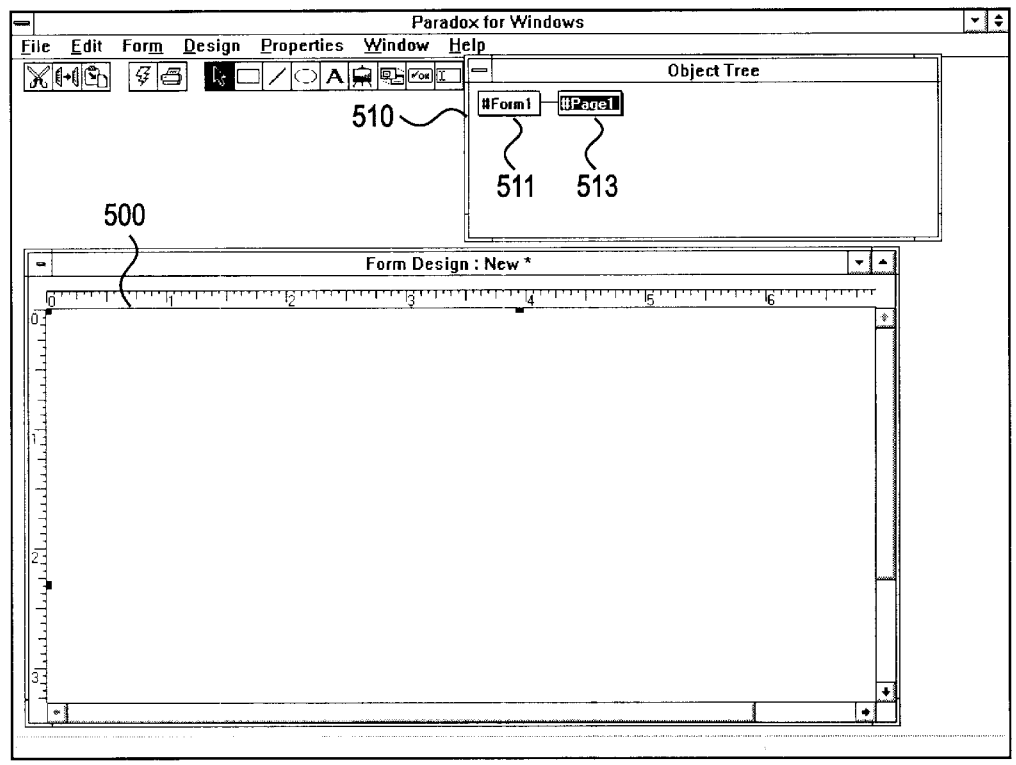
FIGS. 5A–H are bitmap screenshots illustrating methods of the present invention for visual containership with auto-embedding of objects.

Referring now to FIGS. 5A–F, methods of the present invention for embedding screen objects within other objects will now be described. FIG. 5A shows a blank form 500 displayed in a form design window; this blank form is created by simply invoking the command File|New|Form. Also shown is an Object Tree window 510. The Object Tree window displays a hierarchical tree listing the objects of the form. For the blank form 500, for instance, the Object Tree window 510 displays a tree having #Form1 (511) containing #Page1 (513). In this manner, the Object Tree schematically illustrates to the user that the form (which is given a default name of #Form1) contains a page (which is given a default name of #Page1).

Figure 5B:
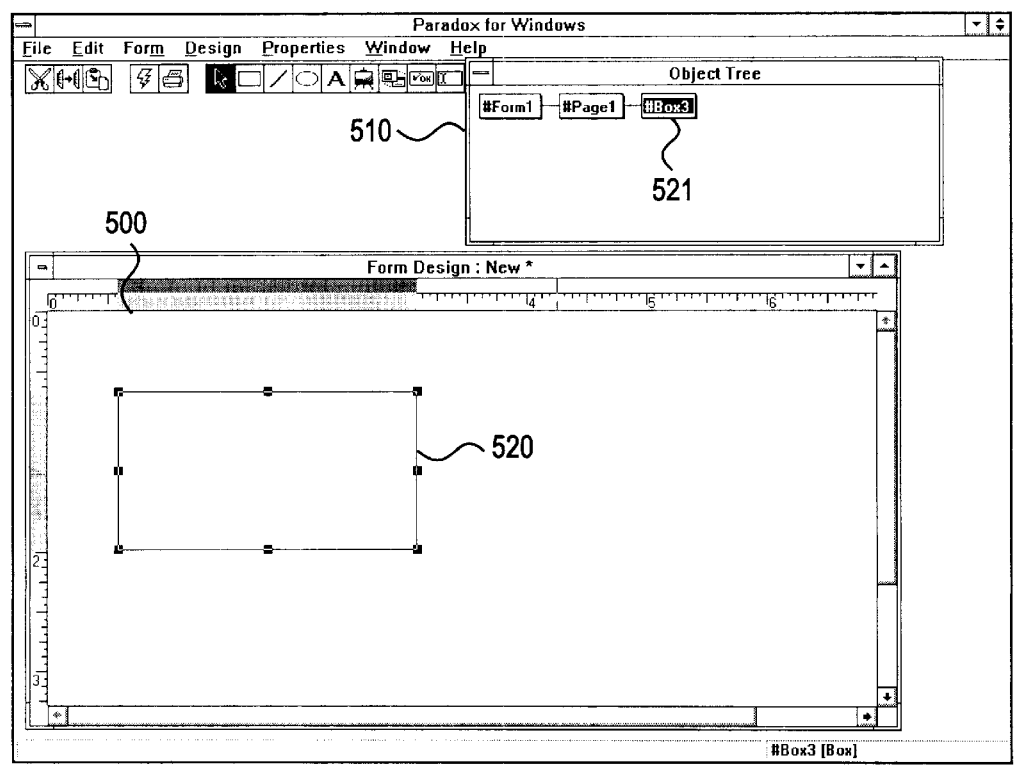

Continuing with the example, FIG. 5B illustrates that the user has drawn a box 520 (using the Box Tool 427 of FIG. 4B). As shown in the figure, the Object Tree 510 has been updated to include an identifier for the box 520: #Box3 (521). As the Object Tree demonstrates schematically, #Box3 is contained within #Page1 (which in turn is contained within #Form1).

Figure 5C:
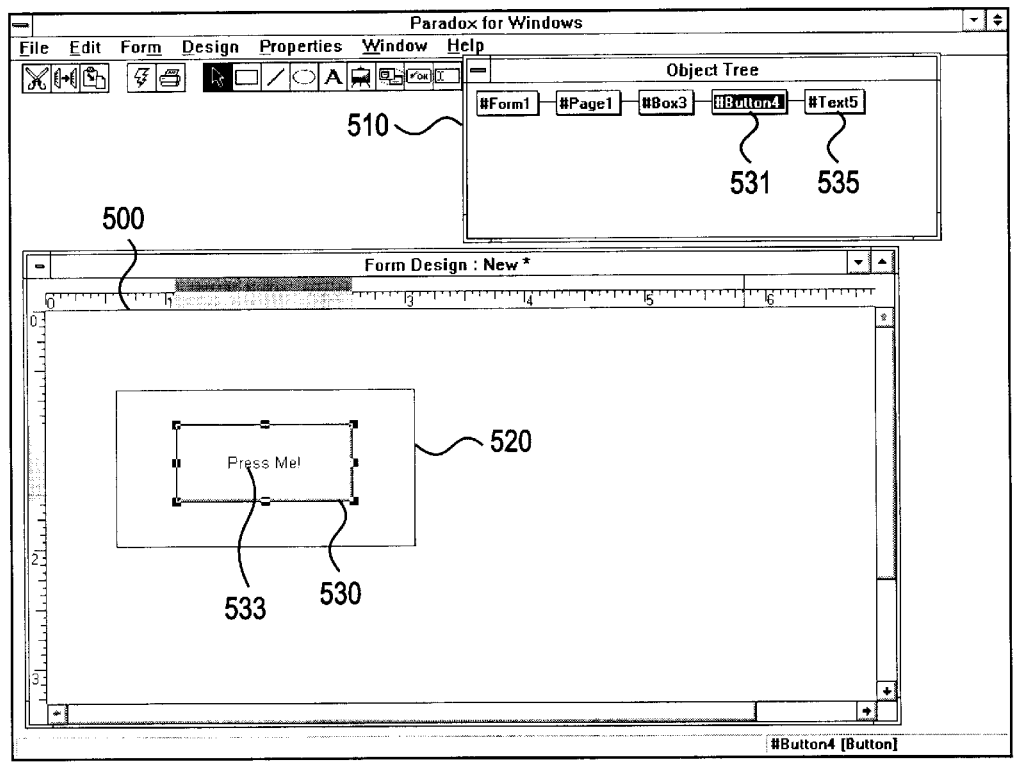

Additional objects will now be added to the form 500 to illustrate the feature of auto-embedding—when an object detects that it can be contained within another object it automatically embeds itself within that object. In FIG. 5C the user has drawn a button 530 and edited its default text ("LABEL") to display "Press Me!" 533. The button 530 is drawn with the Button Tool 433 (of FIG. 4B). As shown in the figure, the user has drawn the button 530 within the confines of the box 520. Accordingly, the button 530, since it may be contained within a box object, has auto-embedded itself within the box 520. This containership relation between the button 530 and the box 520 is illustrated schematically by the Object Tree window 510. Specifically, the tree displays a #Button4 (531) identifier for the button 530 and shows the button identifier 531 being contained within (i.e., a dependent of) #Box3. Also shown is a #Text5 (535) identifier which illustrates that the button 530 is itself a container for the text object 533; in this regard, the button 530 is a "composite object" which includes subobjects.

Figure 5D:
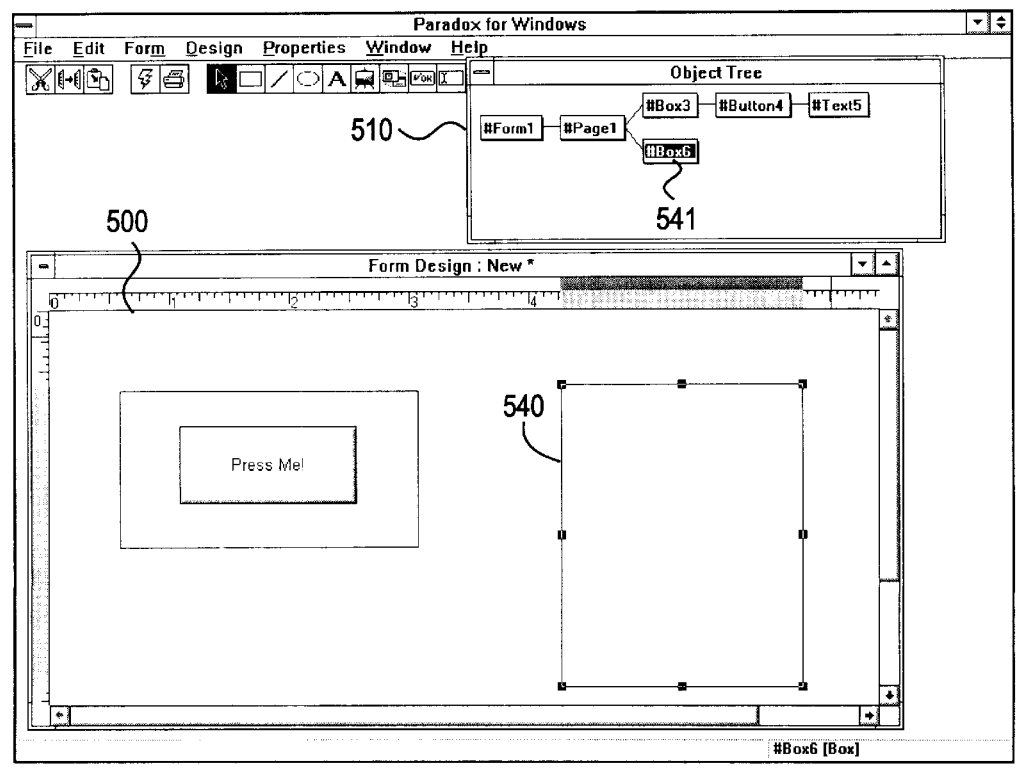

Continuing with the example, in FIG. 5D the user has drawn a second box 540 in the form 500. As can be discerned from the drawing, the box 540 is visually contained within the page, #Page1, which in turn is contained within the form. The Object Tree window 510 illustrates this relationship schematically. A #Box6 (541) identifier is shown as a dependent of #Page1. Just like #Box3, #Box6 has #Page1 as its immediate parent (container).

Figure 5E:
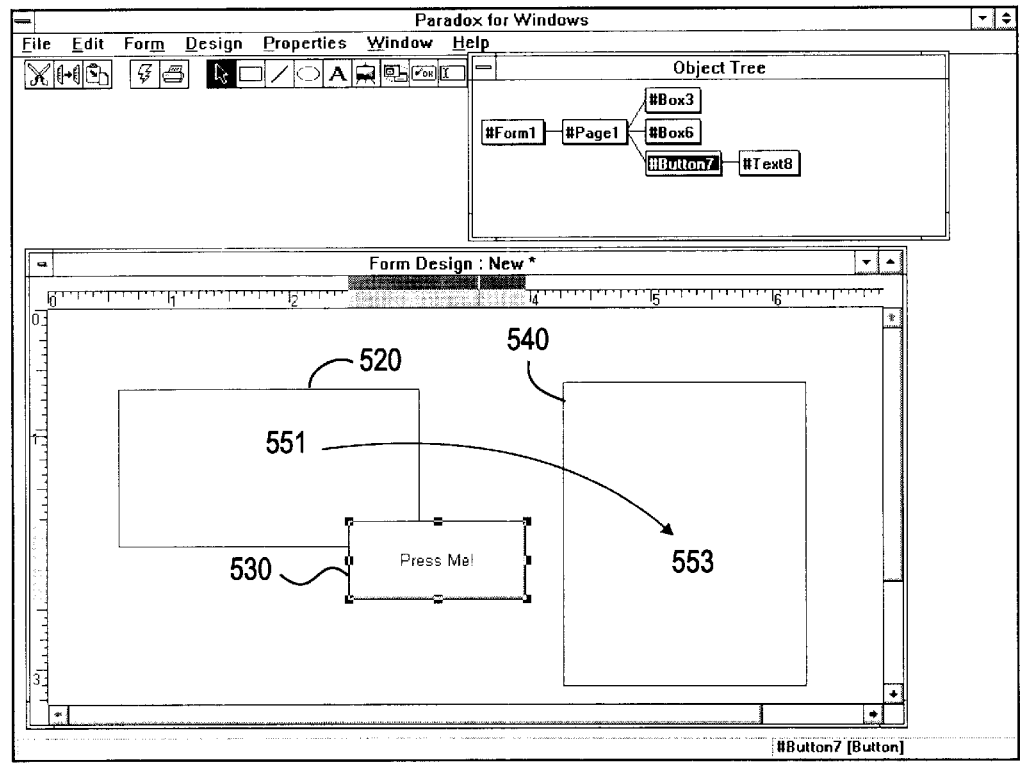
Figure 5F:
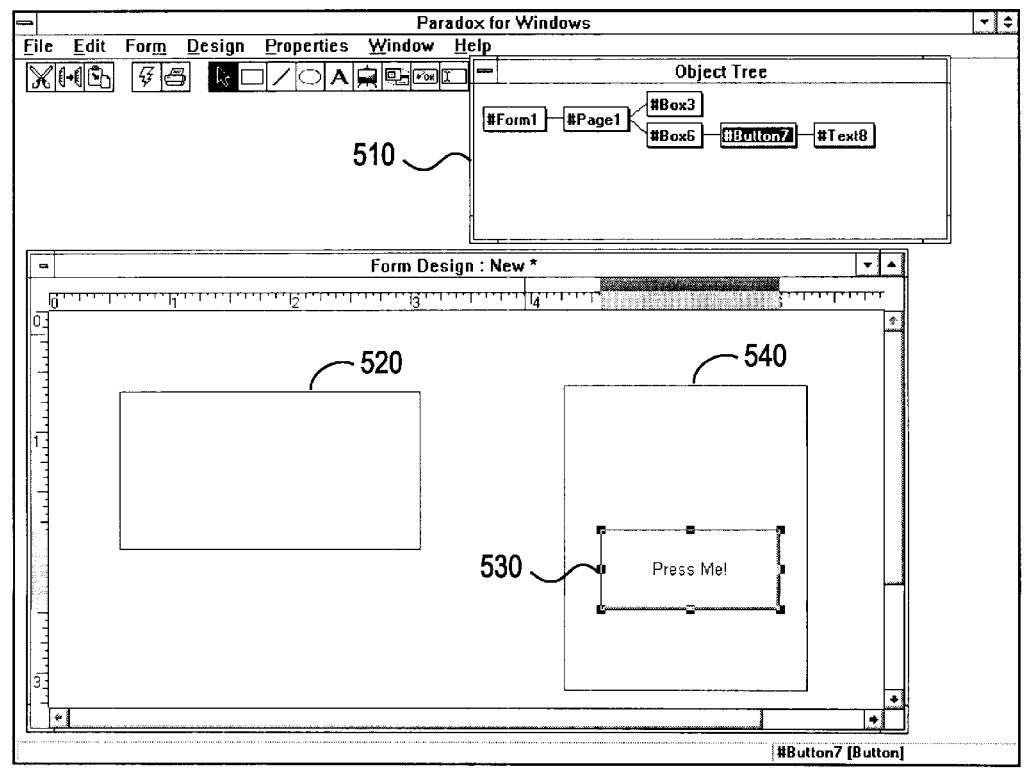

Having covered the basics of auto-embedding in a visual containership model, the reader may now progress to a more complex, drag-and-drop example. FIG. 5E illustrates a drag-and-drop operation by the user. Specifically, the user, using the pointing device (e.g., mouse), drags the button 530 from its original position 551 (contained within box 520) to new position 553 (contained within box 540). FIG. 5F illustrates the final result. As shown visually (by the figure) and schematically (by Object Tree 510), the button 530 has auto-embedded within the box 540, thereby establishing a new containership relation with the box 540 (and severing the old containership relation with box 520).

Figure 5G:
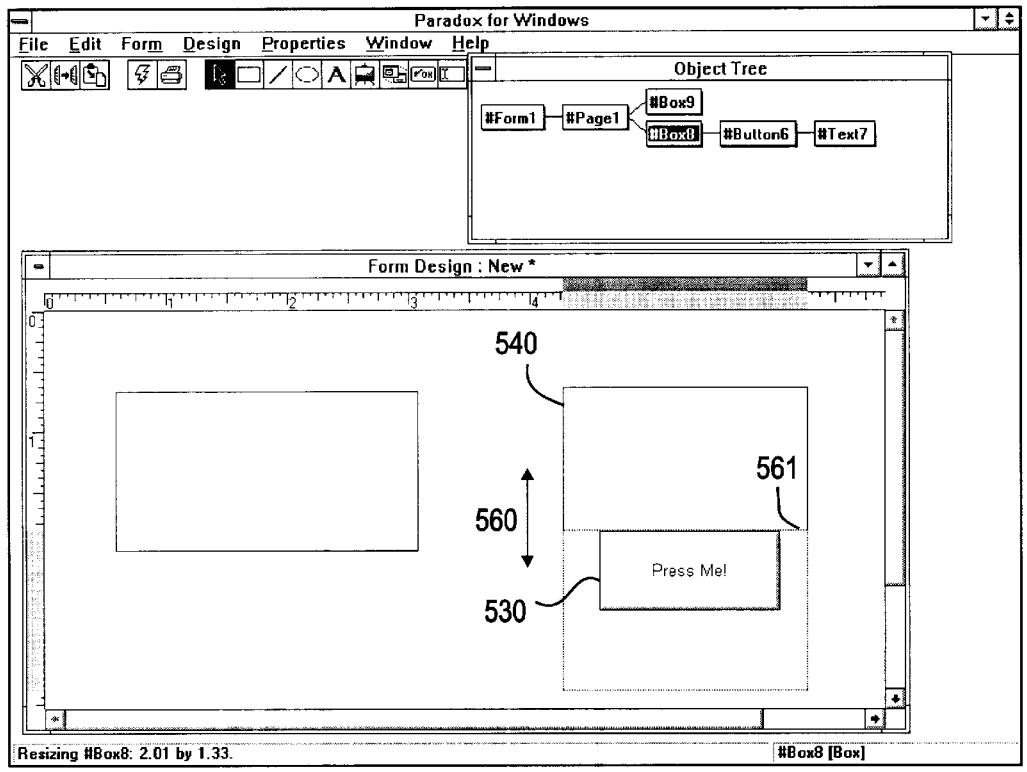

FIG. 5G illustrates interaction between objects having a containership relation. As illustrated by the arrow 560, the user attempts to resize the box 540. Since box 540 is the container or owner of the button 530, however, the box 540 cannot be resized such that it violates its contained-within objects, button 530 in this instance. As illustrated by line 561, the resizing of box 540 is constrained so as not to violate or "dis-embed" the button 530. This container-integrity feature may also employed when pasting a clipboard object to a destination container. Specifically, the destination container may be automatically reconfigured (e.g., resized) so that it appropriately accommodates the candidate object. Alternatively, the system may forewarn the user that the destination container cannot accommodate the candidate object.

Figure 5H:
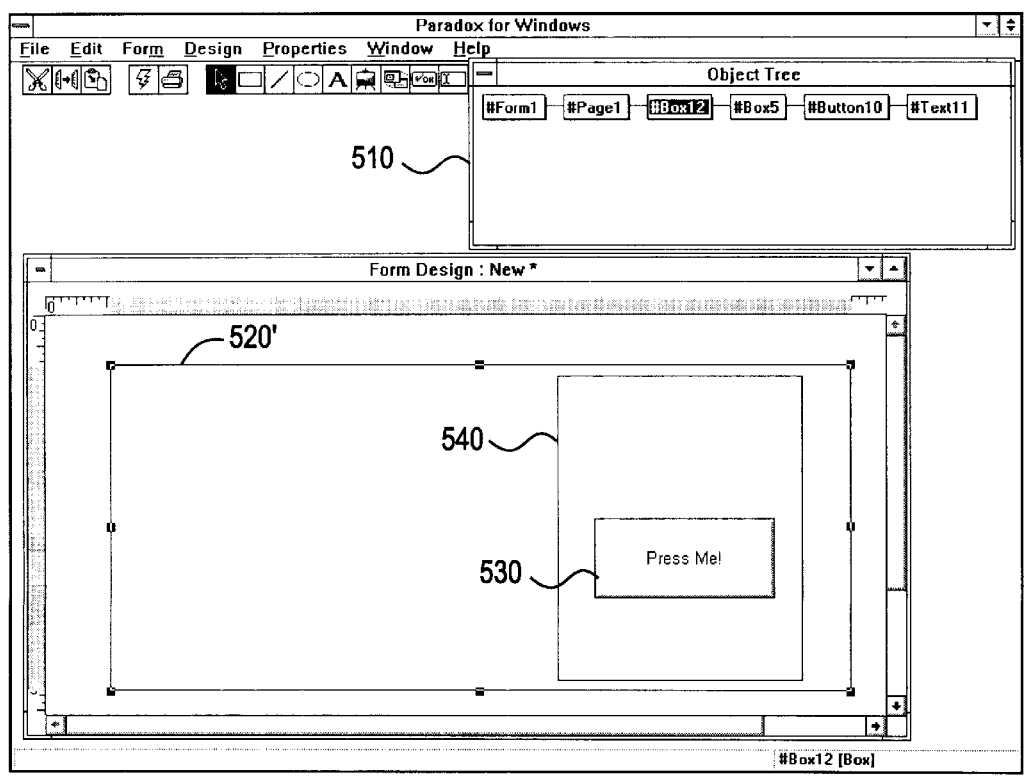

Finally, FIG. 5H illustrates the user operation of resizing box 520 (to box 520') so that it contains the box 540 and the button 530. As shown by the Object Tree window 510, in response to the user resizing the box 520 to visually contain the box 540 and button 530, the system auto-embeds the box 540 and the button 530 within the box 520'. Thus, as illustrated by FIGS. 5A–H, the system of the present invention provides a visual containership programming model which allows objects to be embedded within other objects using simple drag-and-drop techniques. Moreover, the system provides simultaneous schematic information of the containership hierarchy of a form by use of a Dynamic Object Tree. If desired, the user may disable the containership interaction for an object by changing a Contains Object property to False (as described above).

Objects in the system of the present invention include built-in knowledge of the types or classes of objects which they may be embedded within. For instance, a button object may be embedded within a box object, as demonstrated above. A box object cannot be embedded by the user within a text object, for instance. One should be careful not to confuse embedding with overlaying. Embedding establishes a containership relation between, with programatic consequences; if desired, however, the user may merely overlay objects without invoking a containership relation. With built-in knowledge of compatible classes, objects in the system are self-monitoring: objects will only allow the user to auto-embed objects of containership-compatible types.

D. Inheritance by context

FIGS. 6A–M illustrate use of visual containership of the present invention for simplifying the task of attaching program code to objects. As discussed above, objects have available for their use (i.e., within their "scope" or "visibility") various methods and data structures. Exactly which method or data structure is invoked by a particular object depends on the context of the object—where it is located. This aspect will now be demonstrated.

Figure 6A:
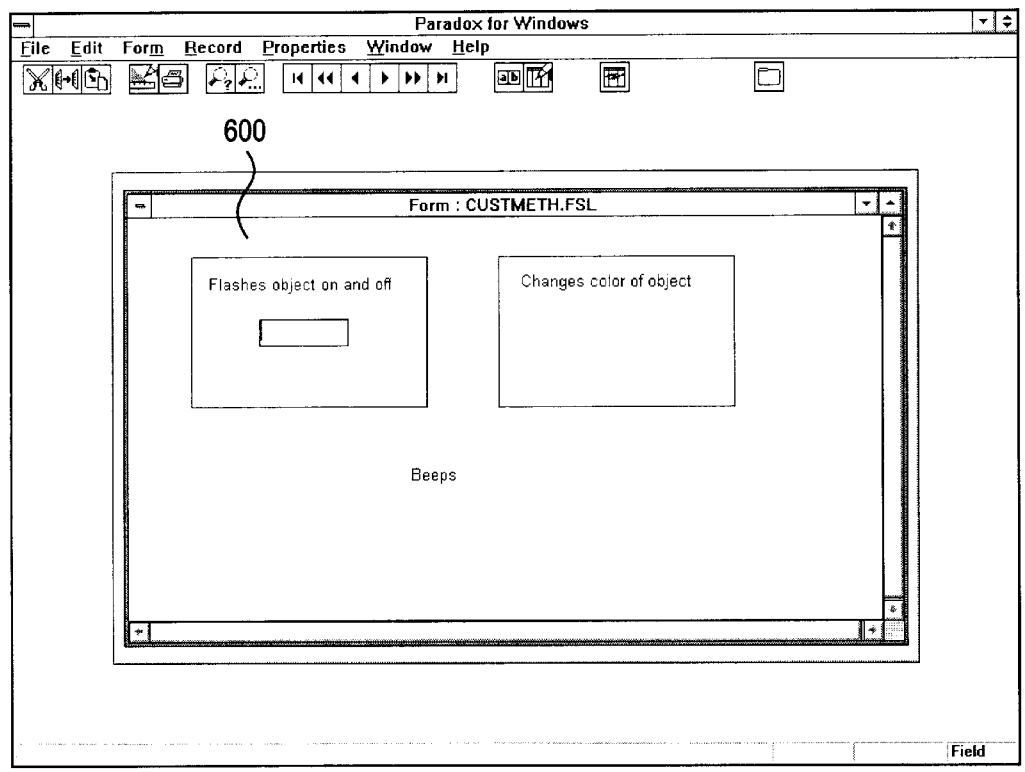
FIGS. 6A–M are bitmap screenshots illustrating methods of the present invention for providing objects with inheritance by context.
Figure 6B:
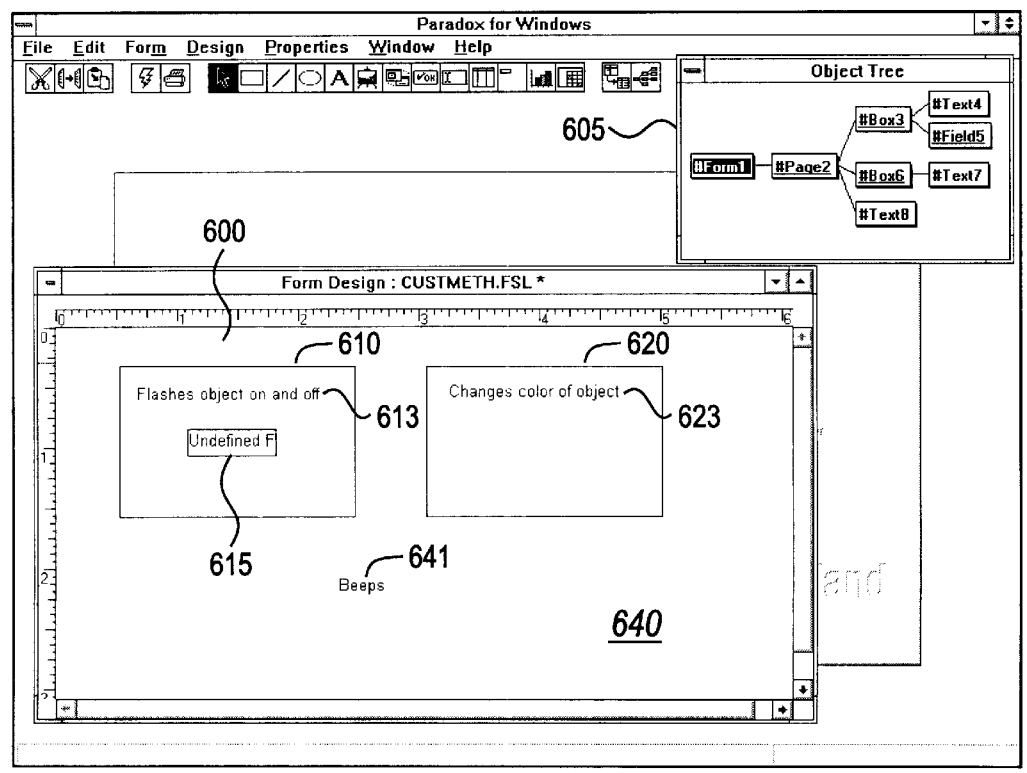

FIG. 6A illustrates the runtime appearance of a simple form, form 600. The form includes several objects. The object composition of the Form 600 is perhaps best demonstrated by switching to Design mode (as previously described), as shown in FIG. 6B. In Design mode and using Object Tree 605, one sees that the form 600 includes a page 640 having a box 610 and a box 620. Box 610 in turn contains a text object 613 and a field object 615. Box 620, on the other hand, only includes a text object 623. The containership relation between these various objects is schematically represented by the Object Tree 605.

Figure 6C:
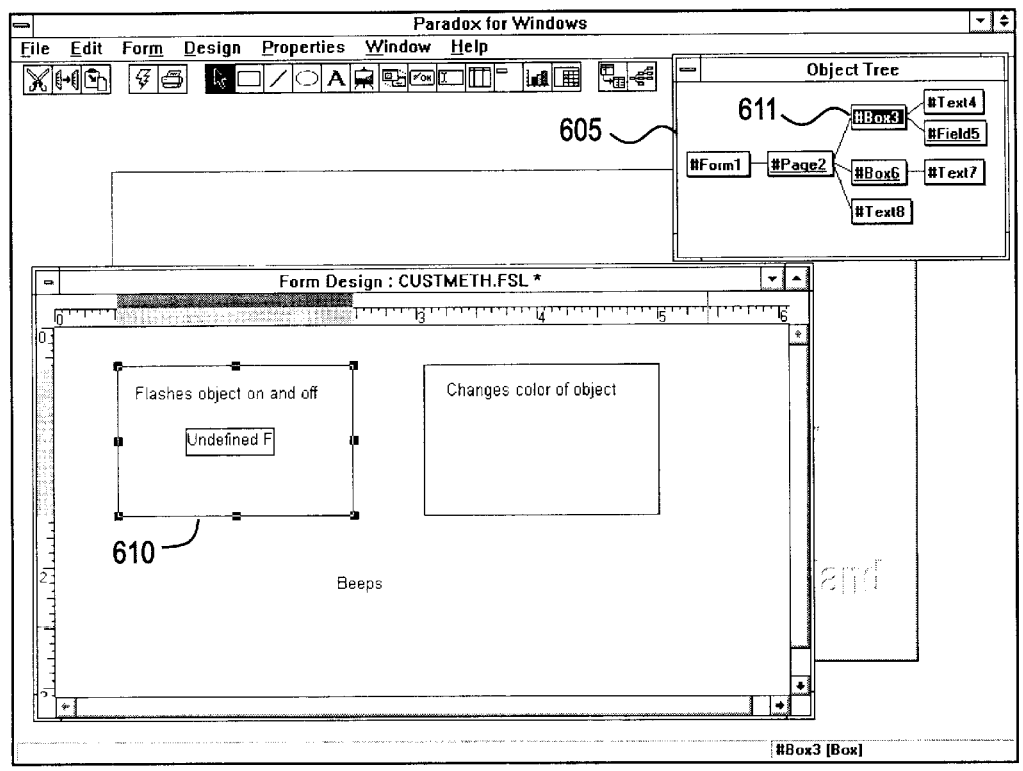
Figure 6D:
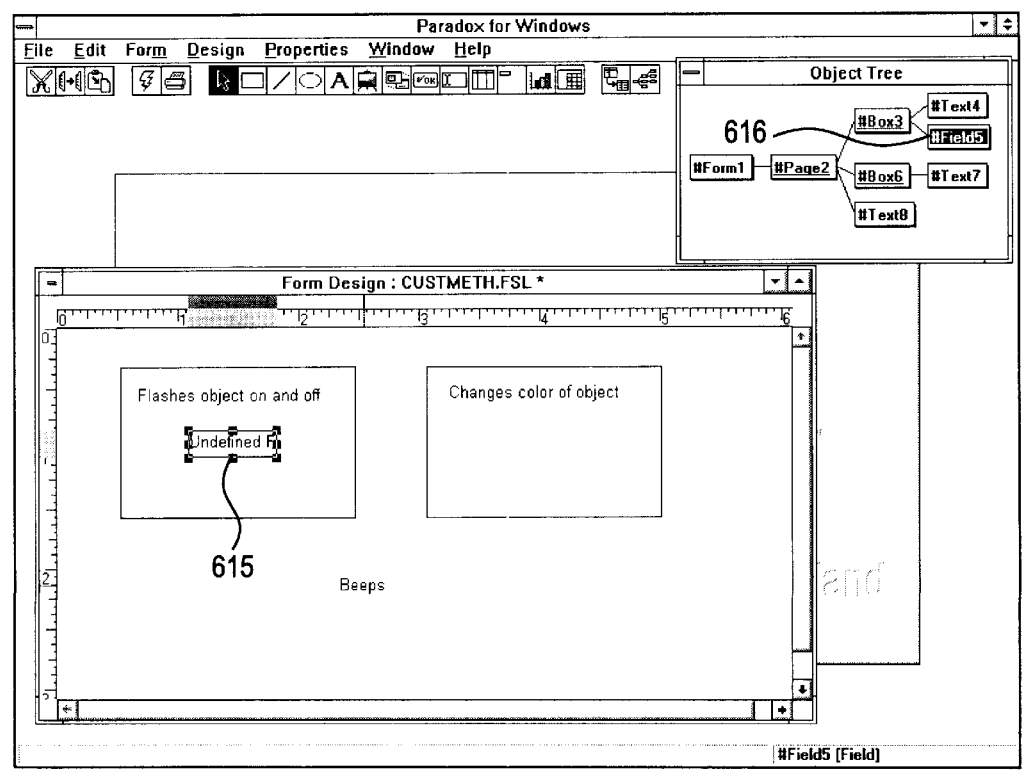

When the user selects a particular object (e.g., by clicking on it), the Object Tree highlights the particular object being selected. In FIG. 6C, for instance, the user has selected box 610 (selection indicated by selection handles—bounding rectangles), whereupon the Object Tree window 605 now highlights #Box3 (611) identifier, the identifier corresponding to box 610. FIG. 6D illustrates that selection of Field object 615 causes #Field5 (616) identifier to be similarly highlighted.

Figure 6E:
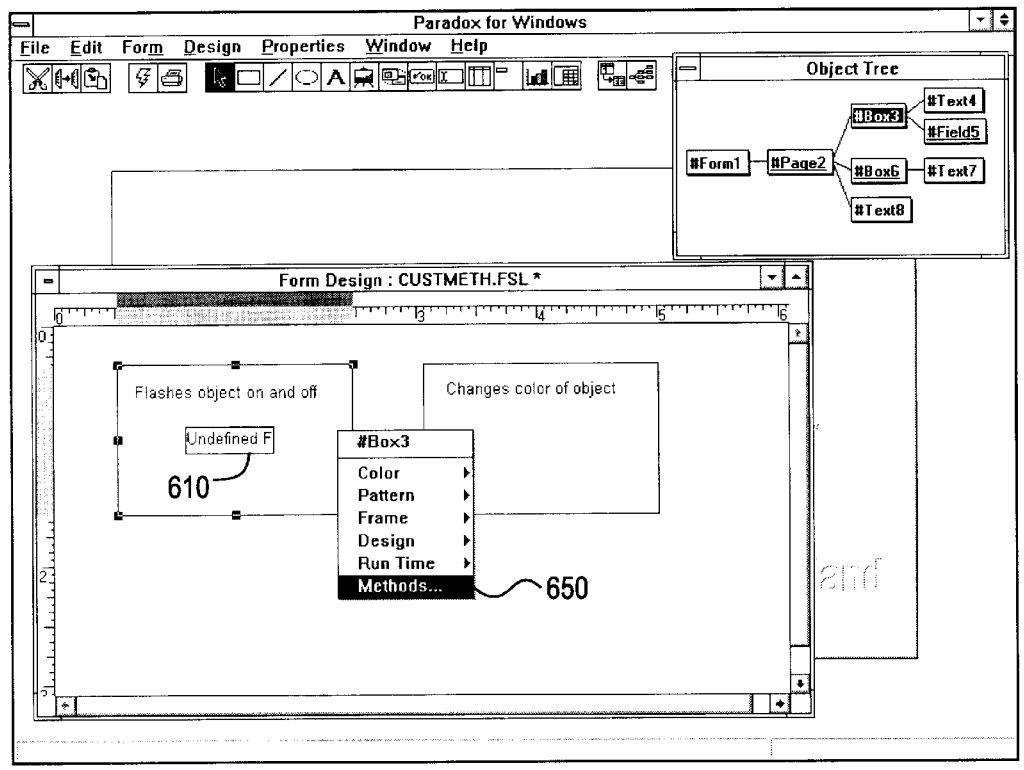
Figure 6F:
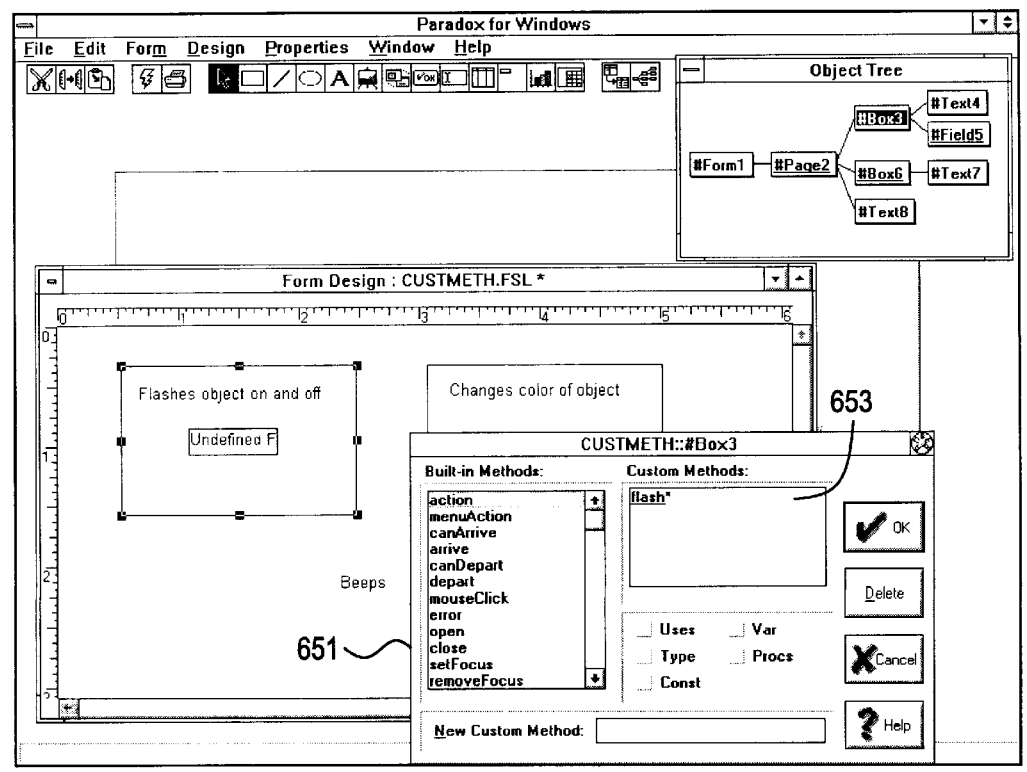
Figure 6G:
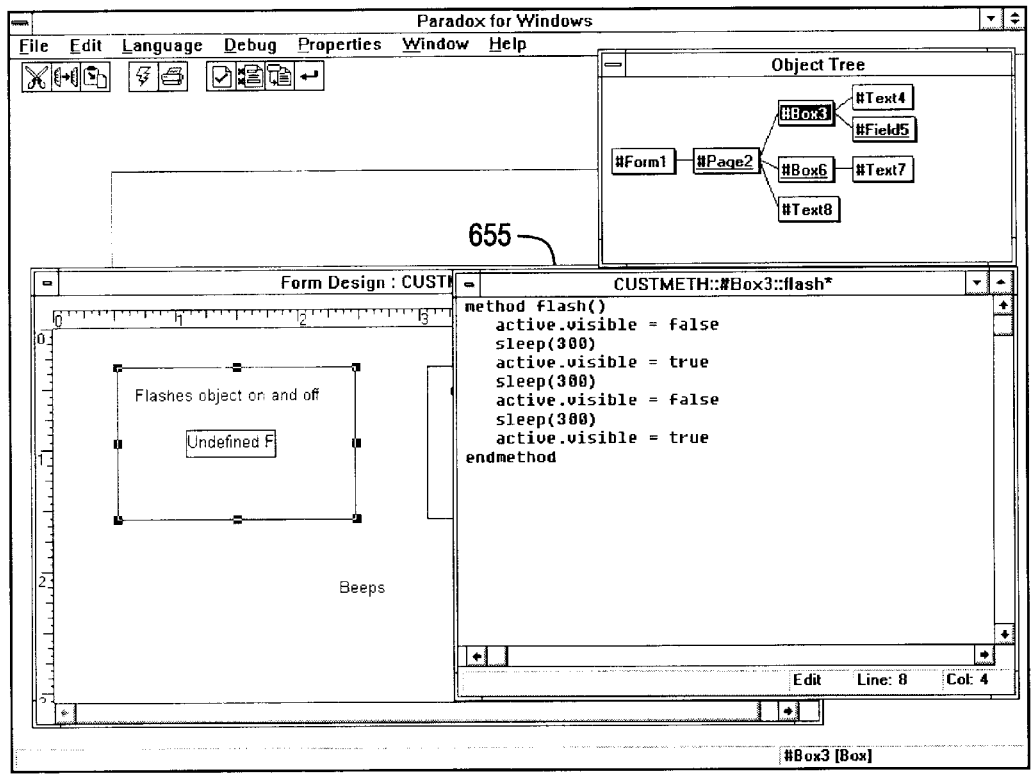

Continuing with the example, the user will now attach a method (program code) to the box 610, as illustrated in FIGS. 6E–G. In FIG. 6E, the user invokes the inspector popup menu for the box 610 (e.g., by right-clicking it). The popup includes a Methods choice 650. Upon selection of the Methods choice 540 by the user, the system displays a Method dialog box 651, as shown in FIG. 6F. The user adds a custom (i.e., user-defined) method named "flash" 653. As shown by Method edit window 655 of FIG. 6G, the user has defined the method "flash" to include steps which tell an object to flash itself on and off (by toggling its visible property).

Figure 6H:
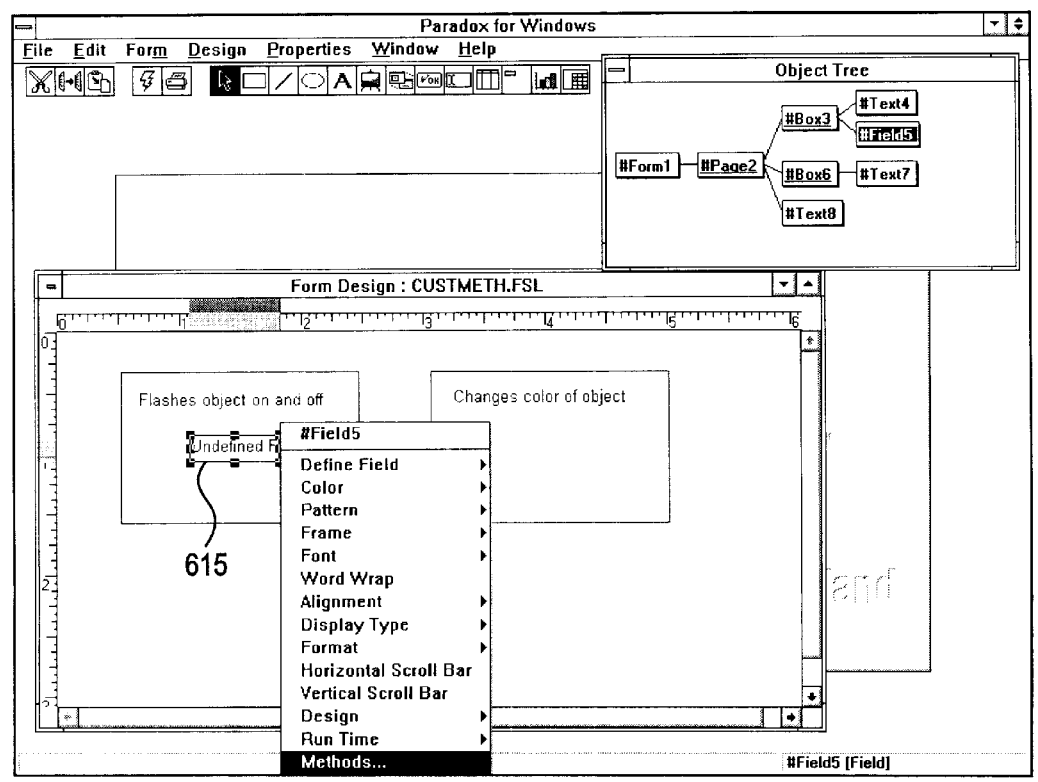
Figure 6I:
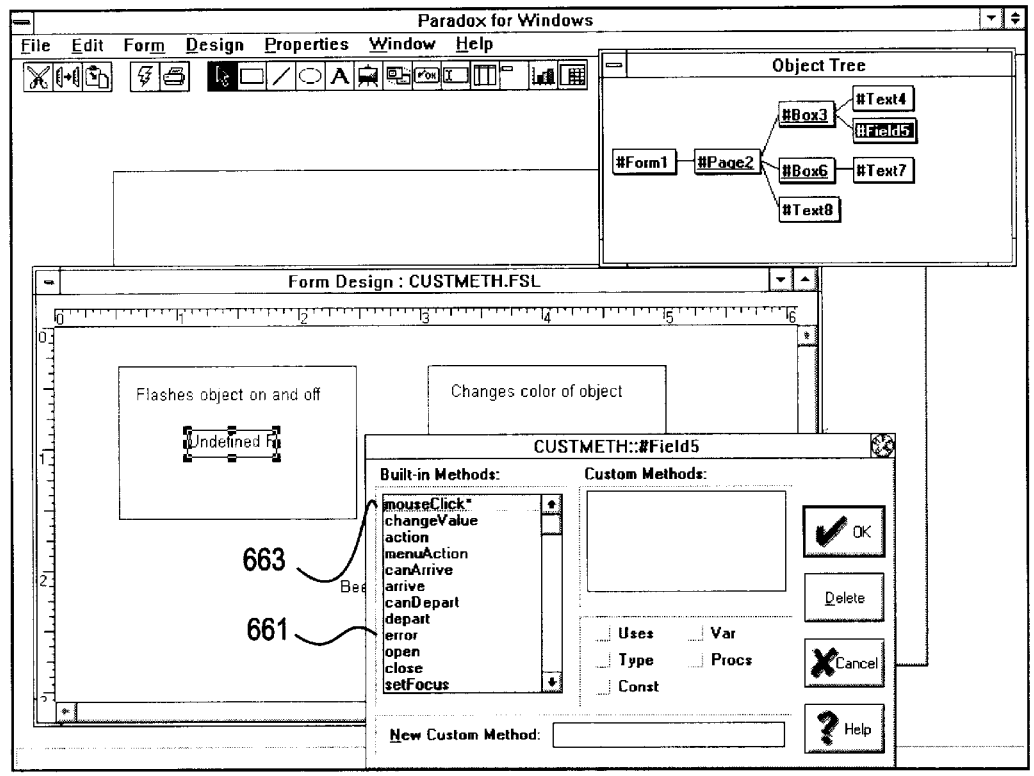
Figure 6J:
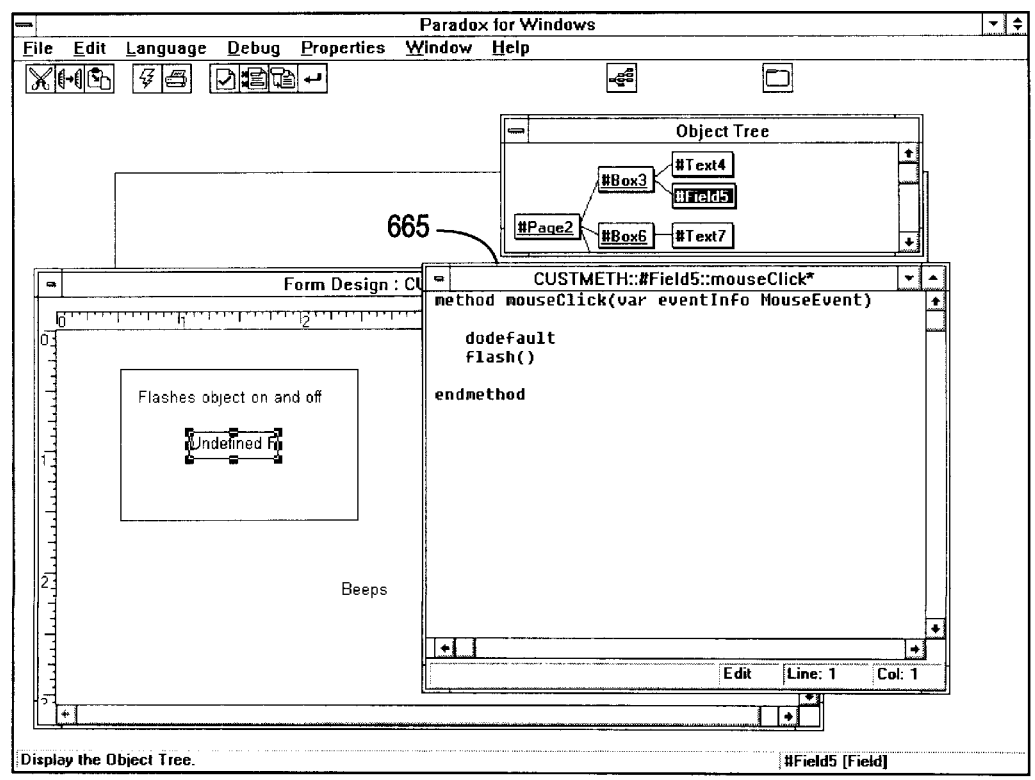

Next, in FIG. 6H, the user will attach a method to the field object 615. As before, the user invokes the inspector dialog for the object (e.g., by right-clicking the object). Upon the user selecting the Methods option for the field object 615, the system displays Method dialog box 661, as shown in FIG. 6I. Here, the user will select the mouseClick built-in method for specifying a desired action (for the object when it is clicked with the mouse). FIG. 6J shows the Edit window for the mouseClick method: Edit window 665. As shown in the figure, the user has edited the mouseClick method to include executing the "flash" method. In other words, when the object is clicked with the mouse (i.e., receives a mouse-Click event), the object will execute the "flash" method which causes the object to flash on and off (as specified by the program steps of the flash method (shown previously in window 655 of FIG. 6G). Running the form at this point (i.e., runtime mode shown in FIG. 6A), therefore, causes the field object 615 to flash intermittently whenever it is clicked with the mouse.

Figure 6K:
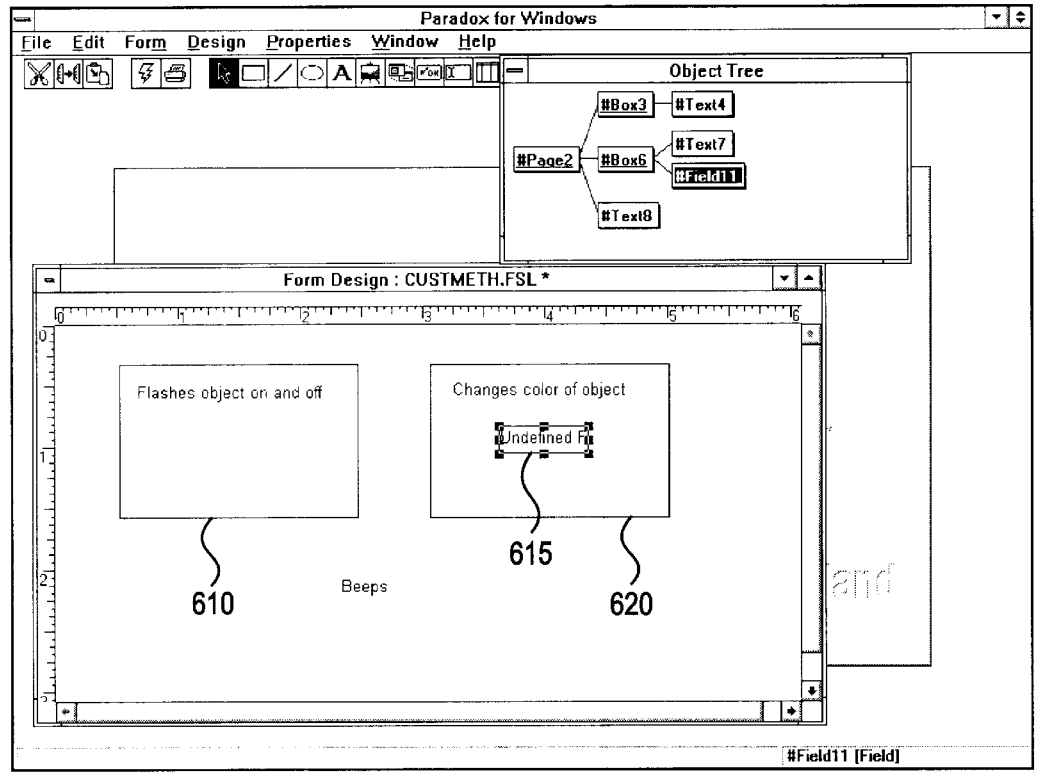
Figure 6L:
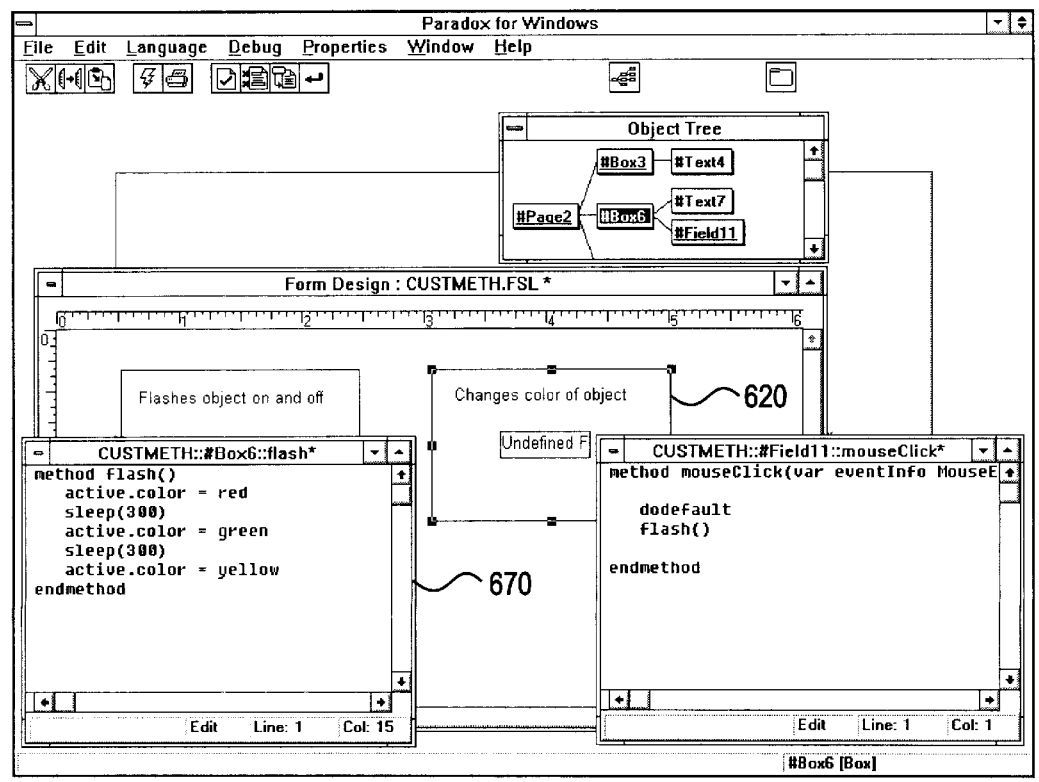

As will now be illustrated by FIG. 6K, the user may drastically change the behavior of the field object 615 by simply dragging it from one container (box 610) to another container (box 620). Recall that, according to the present invention, methods attached to an object remain with that object throughout cutting, pasting, moving, and the like. Thus, the previously-defined mouseClick method (which includes a call to a "flash" method) remains with the field object 615, despite having been moved to a new container (box 620). At this point it should be appreciated that while the "flash" method of the box 610 was available to the field object 615 when the field object 615 was contained within the box 610, movement of the field object 615 to a new container severs the previously-inherited behavior (of flashing on and off). Instead, the field object 615 inherits by context the "flash" method for its container, box 620. As shown in FIG. 6L, the "flash" method for the box 620 has been defined by the user to cause an object to change color (as shown by the method steps in the Method Edit window 670). Thus at this stage, when the form is executed the act of clicking on the field object causes the object to change colors (since it has inherited this new behavior by context).

Figure 6M:
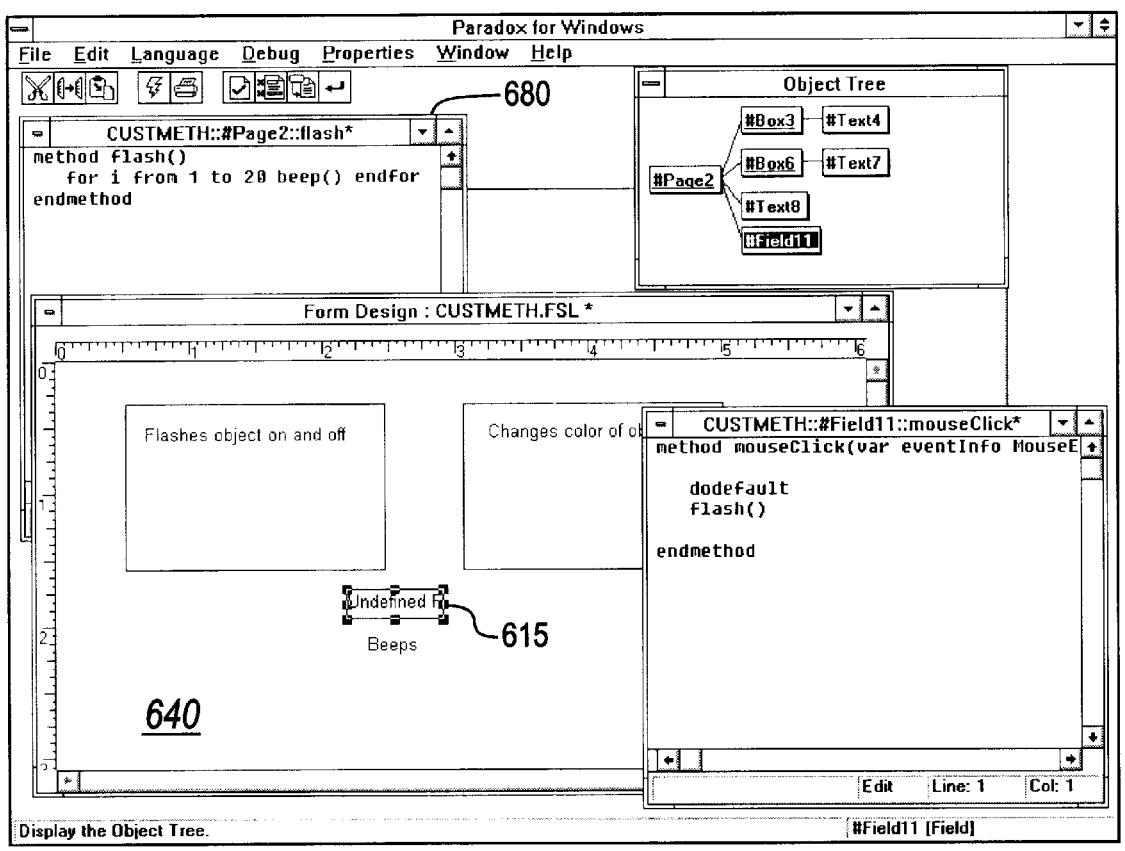

Finally, FIG. 6M illustrates the impact of dragging the field object to yet another context. As shown by the figure, the field object 615 is now contained within the page 640. Page 640 includes a "flash" method which instructs an object to beep 20 times. At this stage, when the form is executed an action of clicking on the field object 615 will cause the object to beep 20 times. Thus, FIGS. 6A–M have illustrated inheritance by context—that is, the method of the present invention where an object inherits a particular behavior as a result of its containership location (i.e., context).

E. Name space

Figure 7A:
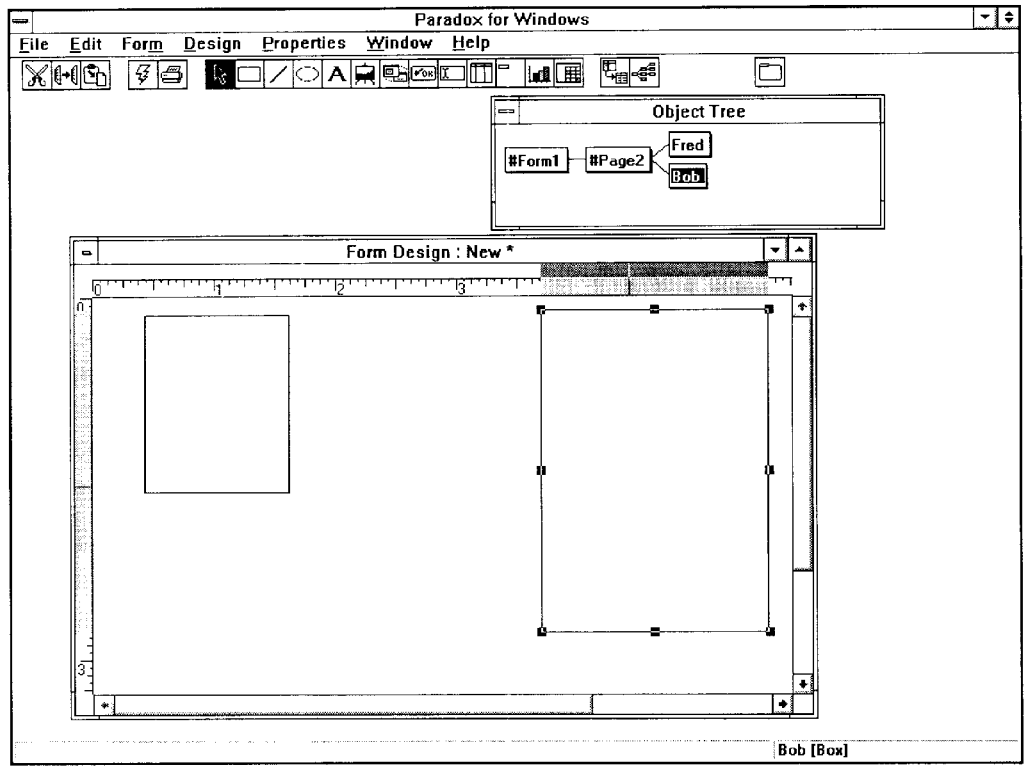
FIGS. 7A–D are bitmap screenshots illustrating methods of the present invention for providing a container-based name space for resolving object references.

Every object in the system has a name. If a name begins with a # sign, then it is a default name assigned by the system (e.g., #Box3). The user may rename objects, as desired. For instance, #Box3 may be renamed to Fred; #Box6 may be renamed to Bob. A form containing a Fred box and a Bob box is illustrated in FIG. 7A.

Within an ObjectPAL source listing, objects are referred to by name. "Dot" expression is used to associate a method call or property with a particular object. For example, the statement ---
boxOne.color = Blue
--- sets the Color property of boxOne to blue. Several objects may have a method named action, so to call the action method of the OrderTable object one needs to write OrderTable.action.

Figure 7B:
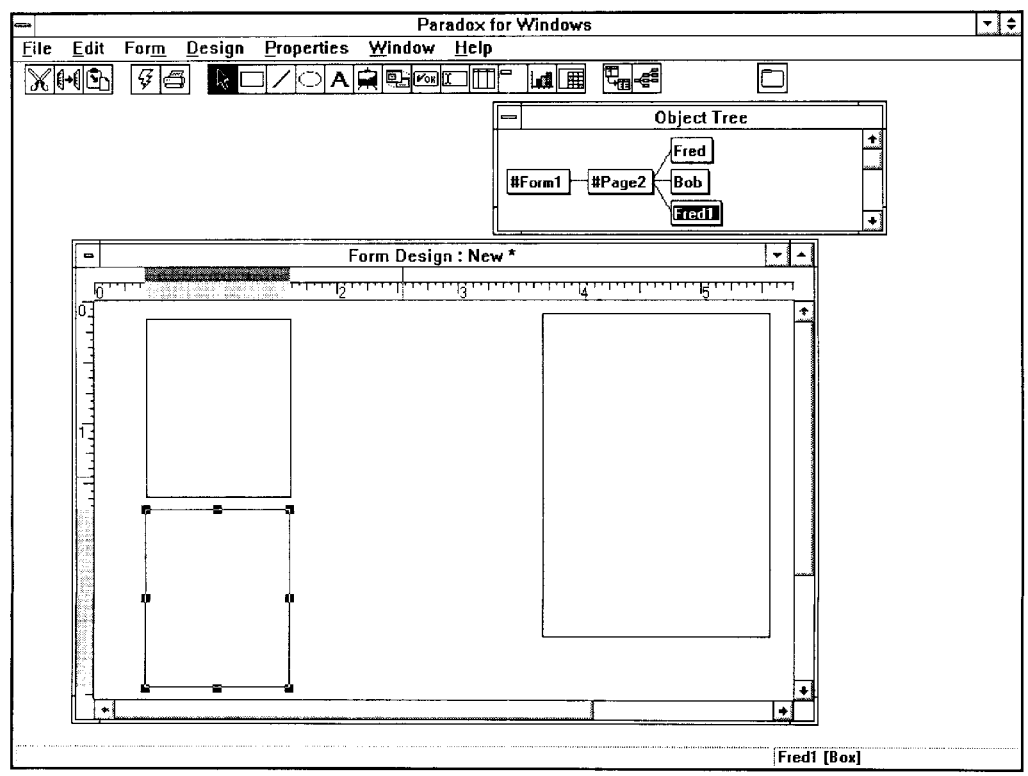
Figure 7C:
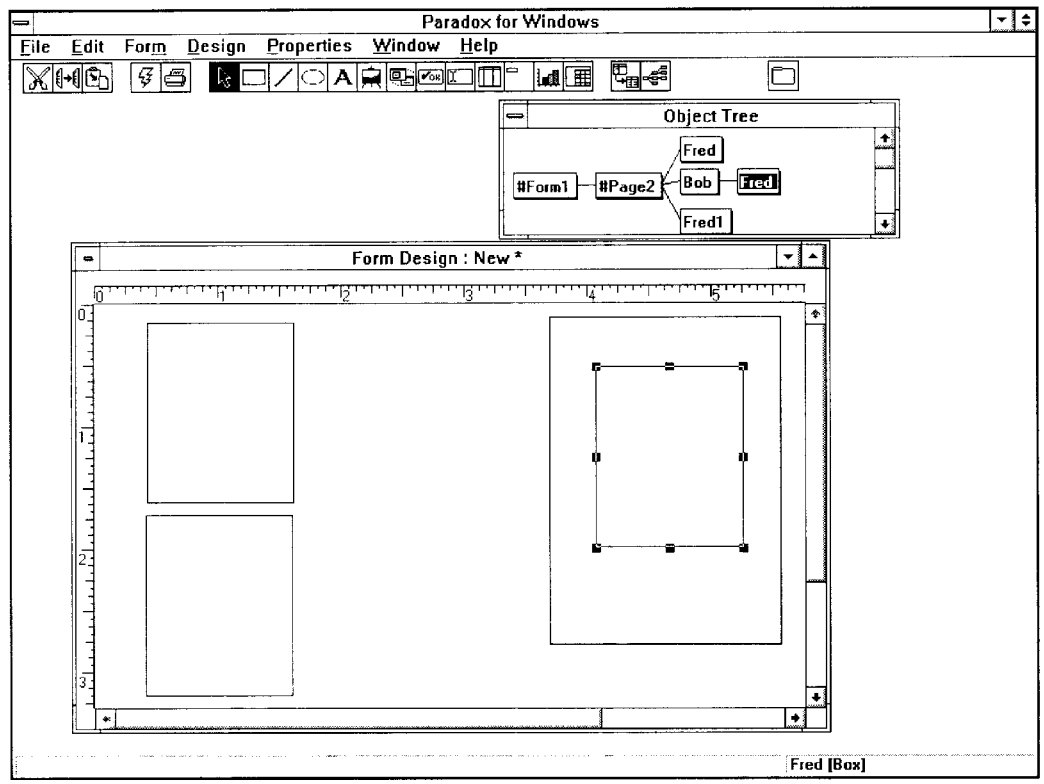

Since objects are referred to by name, names at a given level (containership scope) should remain unique. The system of the present invention automatically adjusts names to retain this uniqueness. As shown in FIG. 7B, when the Fred box is copied and pasted to a new location on the page (#Page2), then its name is automatically adjusted to a new, unique name (e.g., Fred1). Notice, however, that when a copy of Fred is pasted into Bob, Fred need not have its name adjusted since it may be uniquely addressed (by virtue of its containership within Bob). This is illustrated by FIG. 7C. Specifically, the original Fred has a full address of #Form1::#Page2::Fred. The Fred box contained within Bob, on the other hand, has a full address of #Form1::#Page2::Bob::Fred. Accordingly, each is uniquely identified.

The consequence of this name space is as follows. When an object refers to another object by name, the system resolves the reference by examining the containership relation between objects. If the Joe button in FIG. 7D, for instance, refers to a Fred object, that reference will be resolved to the Fred object which is within the same containership scope. Therefore, the name space itself is also context sensitive.

Figure 7D:
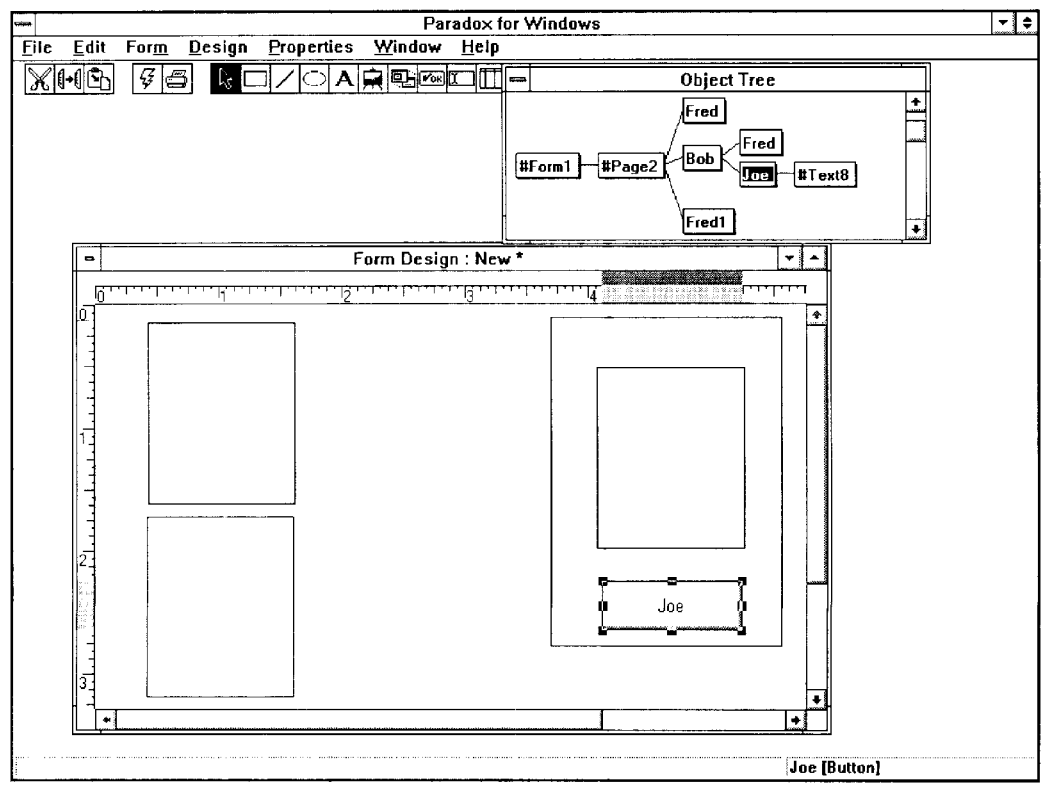

Another aspect of the name space is the notion of "noise names." As shown in FIG. 7D, for instance, the full address of the Joe button is: #Form1::#Page2::Bob::Joe. For the convenience of the programmer, the system allows "noise" names, such as #Form1, to be omitted without consequence. Thus, the Bob box may be simply referred to as "Bob" without having to specify its immediate containers. Similarly, a reference to MyForm.#Box5.MyButton can be shortened to MyForm.MyButton without ambiguity. The #Box5 object is part of the containership hierarchy for custom code and variables, but the object's name is optional. Because #Box5 is the object's default name, it is not required in the containership path. This feature is convenient when objects need to be placed in a form for purely cosmetic reasons, without worrying about naming them and addressing them to get to the objects that do the real work.

The name space employed by the system also leads to enhanced system performance. For instance, whenever it is necessary for the system to notify all objects of a container (e.g., to redraw themselves), the system need only traverse the nodes of the Object Tree which are contained within that container. Accordingly, the visual containership hierarchy allows the system to rapidly process events which occur in the system. In a system with a flat space (i.e., no containership), in contrast, an event, such as a mouse click, would require that all objects be processed to determine whether the event affects them.

Alternative Embodiment: Object Explorer

A. General Introduction

In an alternative embodiment, the object inspector and object tree hierarchy are collapsed into a single UI (user interface) element—an "Object Explorer" of the present invention. In the previously described embodiment, both the object inspector and object tree existed, but in separate places. The disadvantage of such an approach is that the user is required to switch back and forth between these two user interface elements. Additionally, the prior approach of presenting these individually consumes an excessive amount of screen "real estate" (i.e., surface area).

B. Object Explorer

Figure 8A:
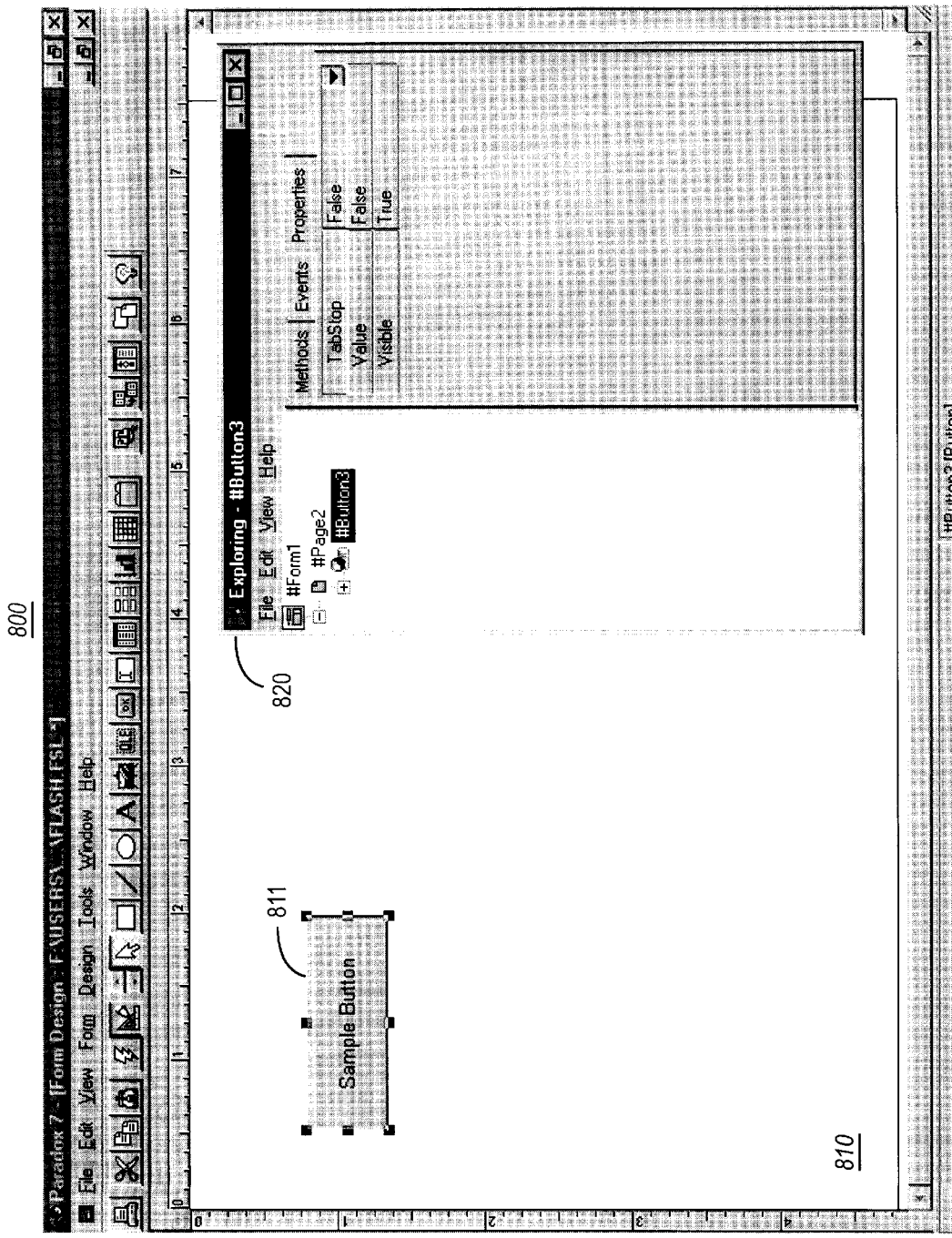
FIGS. 8A–D are bitmap screenshots illustrating an Object Explorer interface of the present.

FIG. 8A illustrates a form designer 800 in which the user has undertaken form-based creation of an application by placing a screen button 811 on screen form 810. In conjunction with this step, the user has invoked Object Explorer 820, for example by "inspecting" (e.g., right clicking) on the sample button 811. In a preferred embodiment, display of the Object Explorer can be made persistent upon the user selecting a corresponding preference setting. Alternatively, the explorer can be invoked upon inspection of an object, in the manner previously described.

Figure 8B:
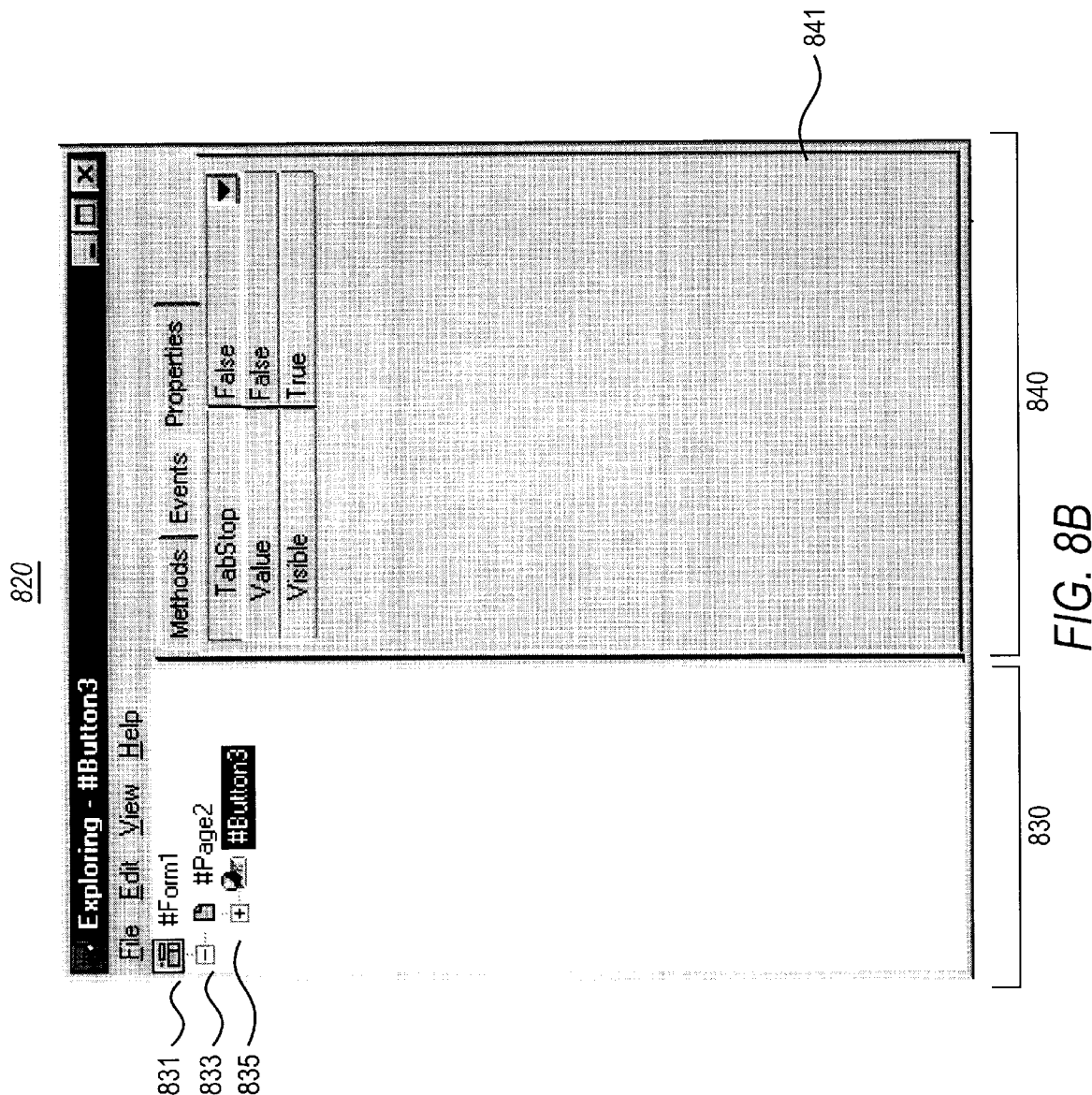

An enlarged view of the Object Explorer 820 is shown in FIG. 8B. The left hand view 830 of the Object Explorer comprises a hierarchical outline view of the objects on the form. As shown, the view has "drilled down" to the currently selected object, the sample screen button which was shown selected in FIG. 8A. The right hand view 840 of the Explorer comprises a tabbed property inspector. The property inspector shows the properties, methods, and events for the currently-selected object (here, the sample button).

C. Outline view of containership relations

The outline view 830 presents a schematic representation or view of the containership of objects within the program under development. As shown, for instance, the highest-level object is the form, which is represented by outline node 831. The form is itself an object, with properties, methods, and events. On the particular form shown in the example of FIG. 8A, a single page is present. This page object is represented in the outline by node 833. The page includes a button, sample button 811. This is represented in the outline as button node 835.

The right-hand view 840 of the Explorer comprises Properties, Events, and Methods Property Sheets. As shown in FIG. 8B, for instance, a set of properties sheet 841 is shown, for the currently selected object—the button object (as indicated by node 835). Here, the user can modify the button to customize its appearance and functionality. Objects within the system include a collection of self-contained properties that define the object. Properties include, for instance, color, numeric format, text style, or the like. Complex objects, such as database tables, can have additional properties. A table, for instance, has properties for each column and each heading in the table.

Figure 8C:
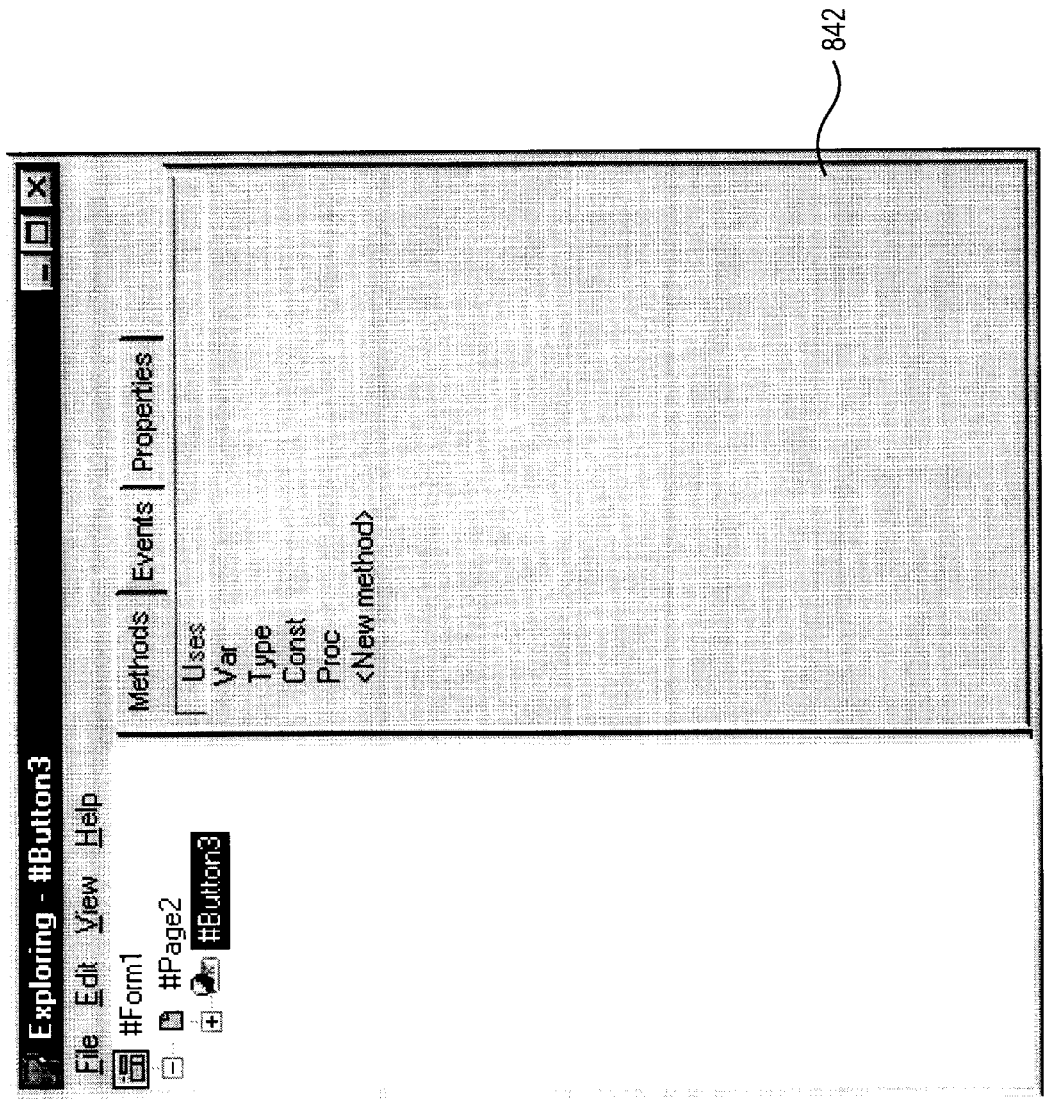

The user can easily invoke the "Methods" Property Sheet (e.g., by clicking on the "Methods" tab), as illustrated in FIG. 8C. Methods comprise data declarations (e.g., variables or "VAR") and functions which the user has created and attached to an object. The Methods Property Sheet 842, therefore, serves to list the methods defined for a selected object. To edit contents of a particular method, the use can select the method (e.g., by clicking on it) from this list.

Figure 8D:
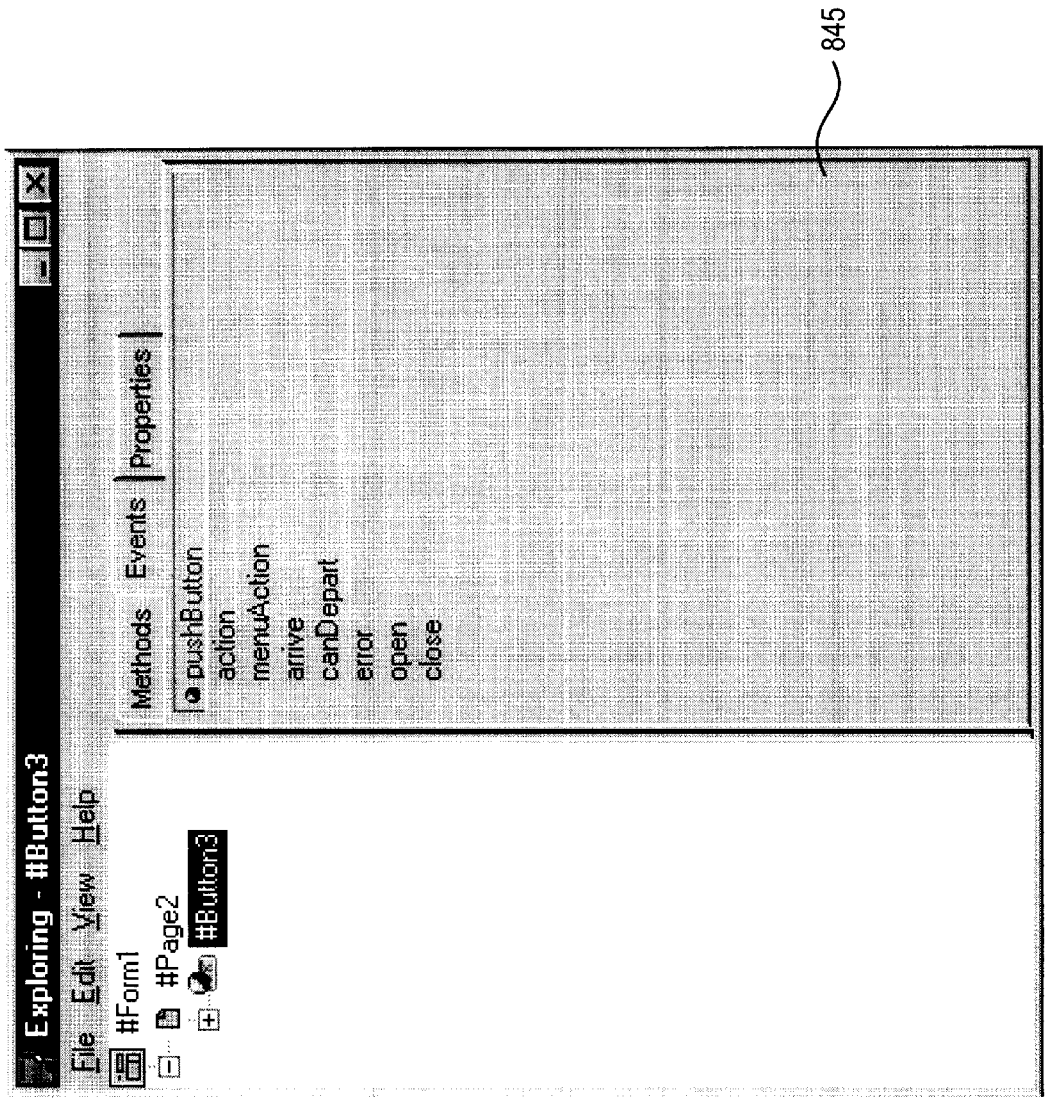

To list the events for a selected object, the user selects the "Events" tab. As shown in FIG. 8D, an "Events" Property Sheet 844 includes a list of events defined for a selected object. An event is an action that triggers a built-in method of the system. For instance, the action or event of pushing a button triggers a built-in "pushButton" method. The method itself can include user-specified functionality (in addition to default behavior). As another example, the action of clicking a mouse on an object invokes an "onClick" method.

The system includes an editor for editing events and methods, so that the user can add new functionality to an object. In this manner, the user can assign functionality to a screen button by editing its "onClick" event.

D. Selection of objects

The design objects in the system remain synchronized with the corresponding outline view such that user's selection of a particular object causes the corresponding node in the Object Explorer to also receive corresponding focus. By the same token, user's selection of a particular node in the outline causes the corresponding object on the design surface to receive focus. This facilitates user selection of a particular object (or objects). During creation of a complex form—that is, one containing numerous objects—the user might find it easier to locate a particular object by navigating the outline hierarchy. Here, the user can gain instant access to a particular object despite the fact that it might be nested or otherwise obscured by multiple objects on the form being designed.

Figure 9A:
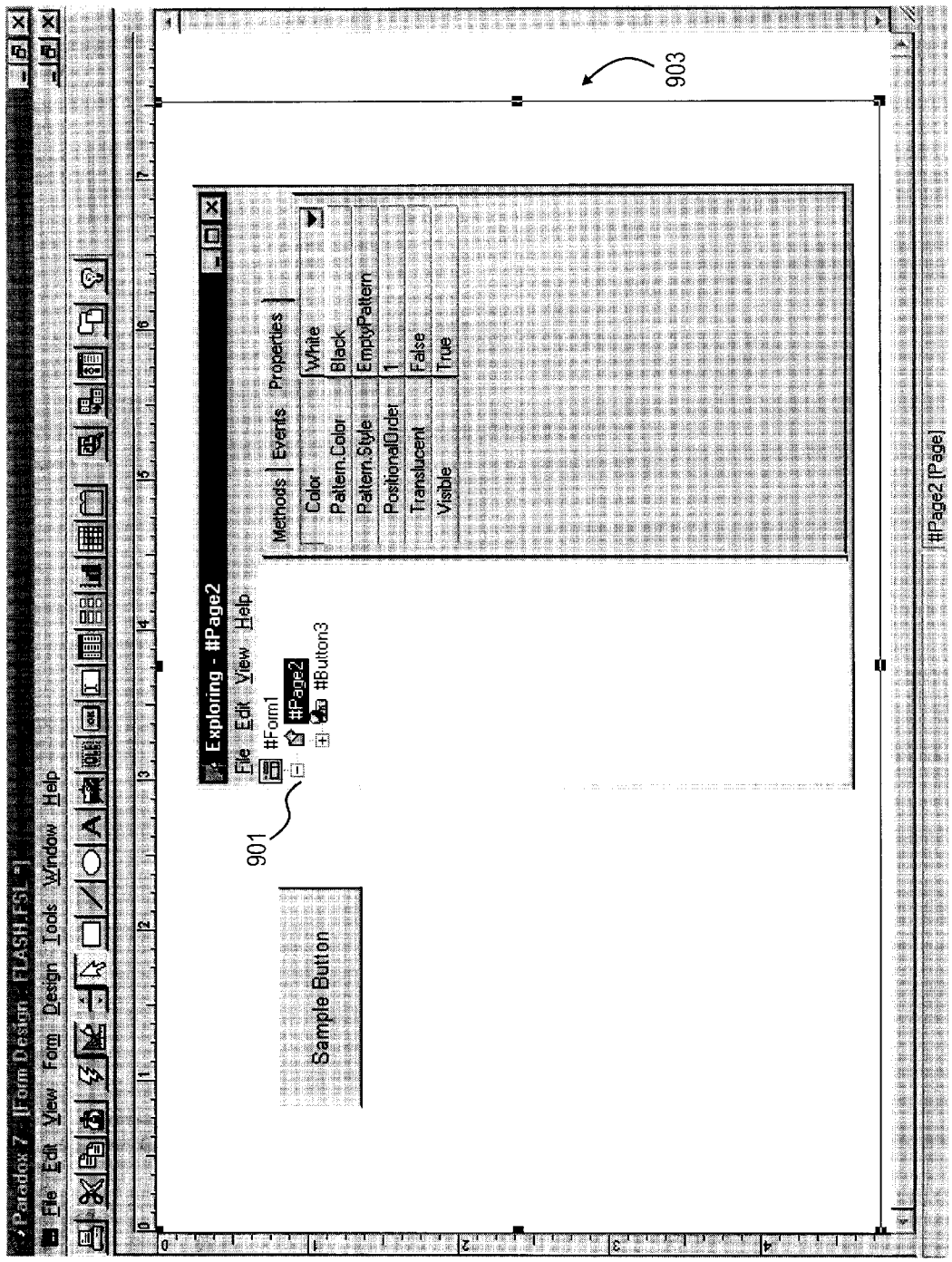
FIGS. 9A–B are bitmap screenshots illustrating use of the Object Explorer interface for indicating containership relations among objects.
Figure 9B:
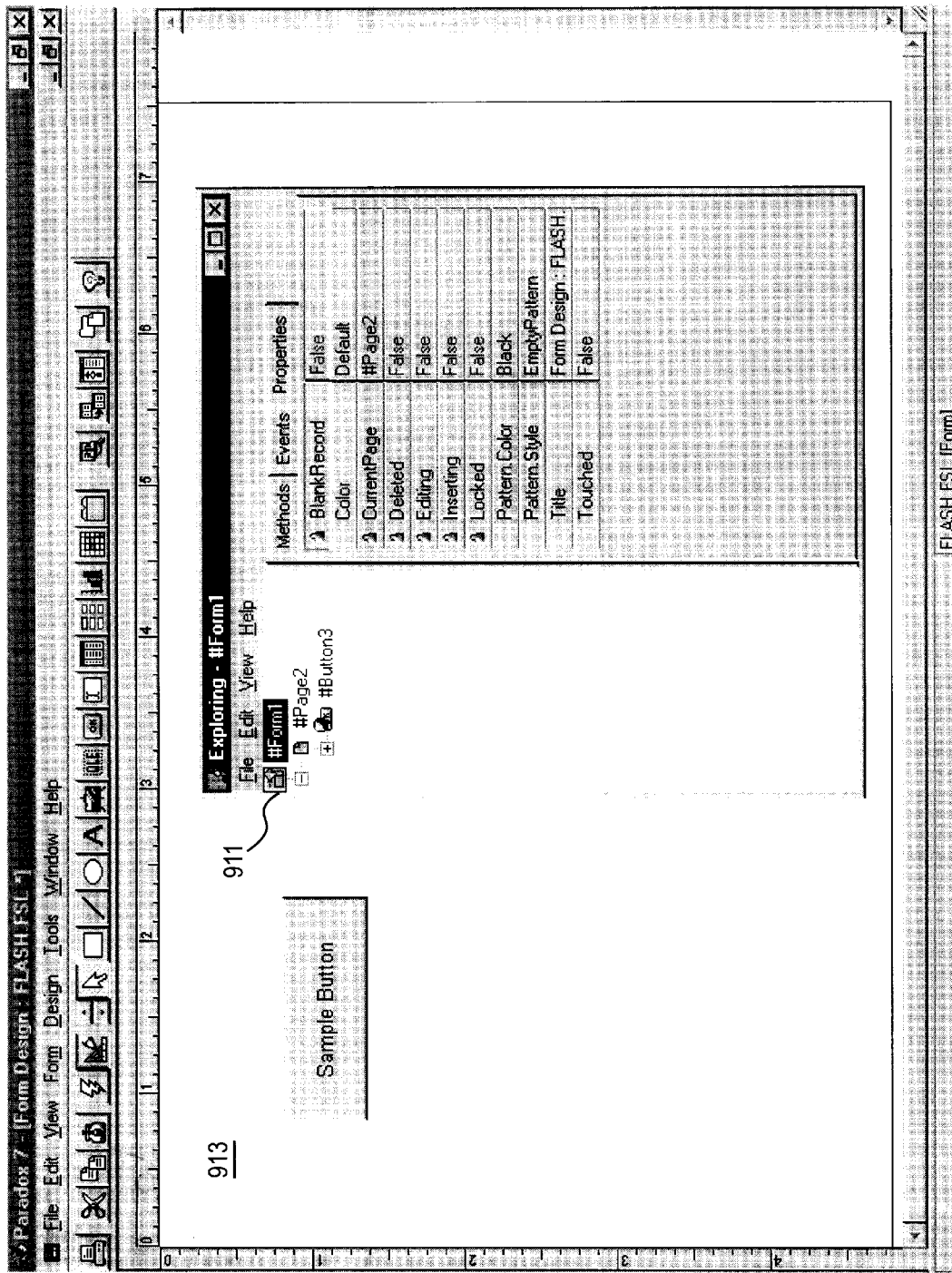

Even though the example of FIGS. 8A–D illustrate use of the Object Explorer with the simple example of a screen button, the button itself is actually contained within a page (i.e., page object) which, in turn, is contained within a form (i.e., form object.) This "nesting" of objects within other objects can occur to an arbitrary level. Each of these has its own set of methods, events, and properties. This is illustrated by FIGS. 9A–B. In FIG. 9A, selection of the page 903 (or selection of the corresponding page node 901) displays the methods, events, and properties for the page object. As shown at this point, the page contains the button and, in turn, is contained by the form. Selection of the form 913 (or its corresponding form node 911), on the other hand, causes the Explorer to display the methods, events, and properties for the form object.

The Explorer also provides visual cues to assist the user. The nodes in the outline, for instance, include glyphs displaying an icon for a corresponding object type. For instance, a form node includes, in addition to its name, an icon representing a form object. A node for a button object, on the other hand, includes an icon illustrating a button object. Display of the properties also includes visual clues. Read only properties (i.e., those which cannot be changed by the user), for instance, are displayed in the color red (or other desired color scheme). In this fashion, the user can discern at a glance whether a property can be altered by the user.

E. Demonstration of user operation of the Object Explorer

Use of the Object Explorer of the present invention is perhaps best demonstrated by way of example. Accordingly, the following will repeat the previously-illustrated "flash" method containership example of FIGS. 6A–M, but this time using the Object Explorer as now illustrated by FIGS. 10A–H.

Figure 10A:
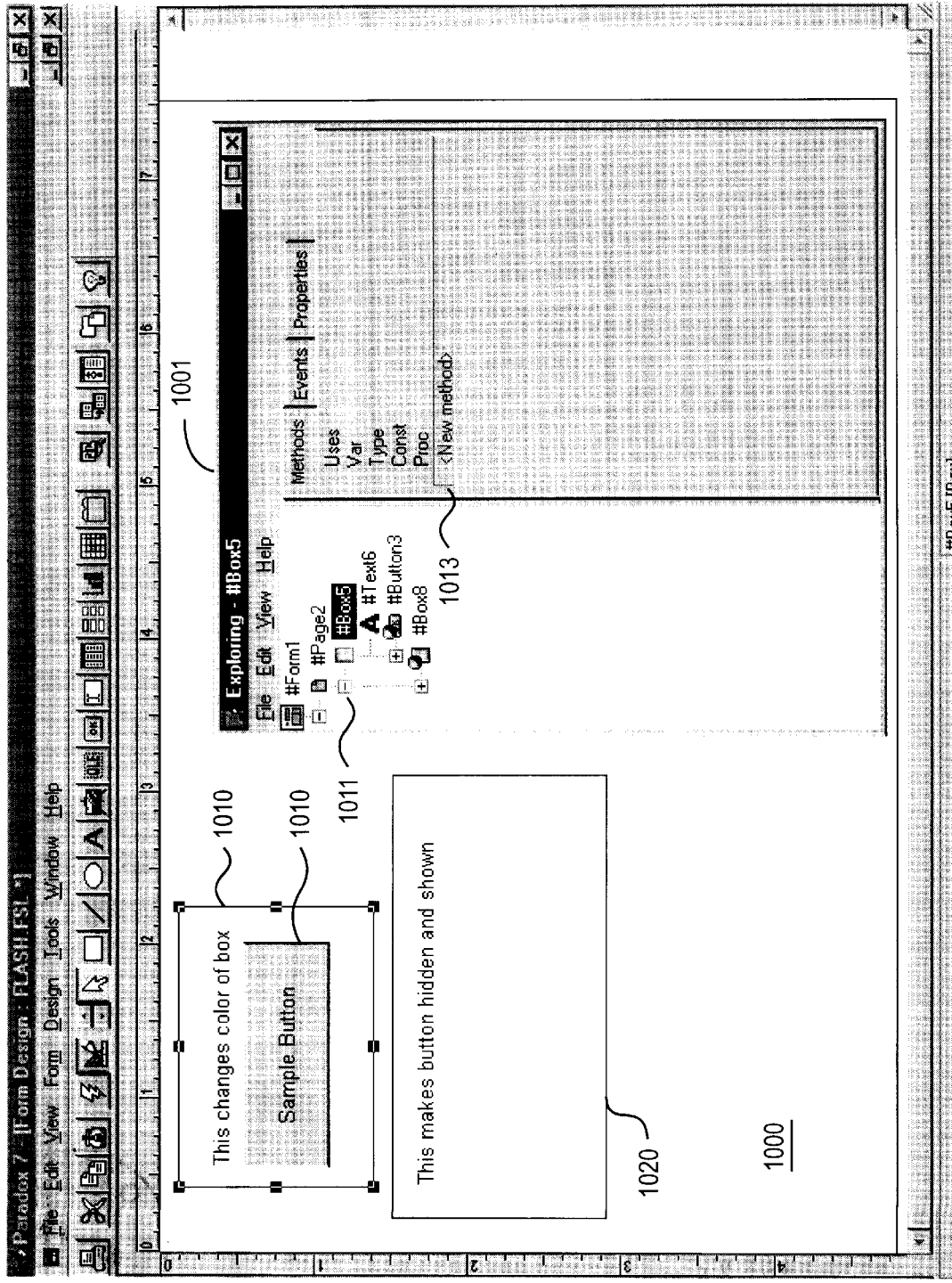
FIGS. 10A–H are bitmap screenshots illustrating use of the Object Explorer for modifying properties and behaviors of objects of an application being created.
Figure 10B:
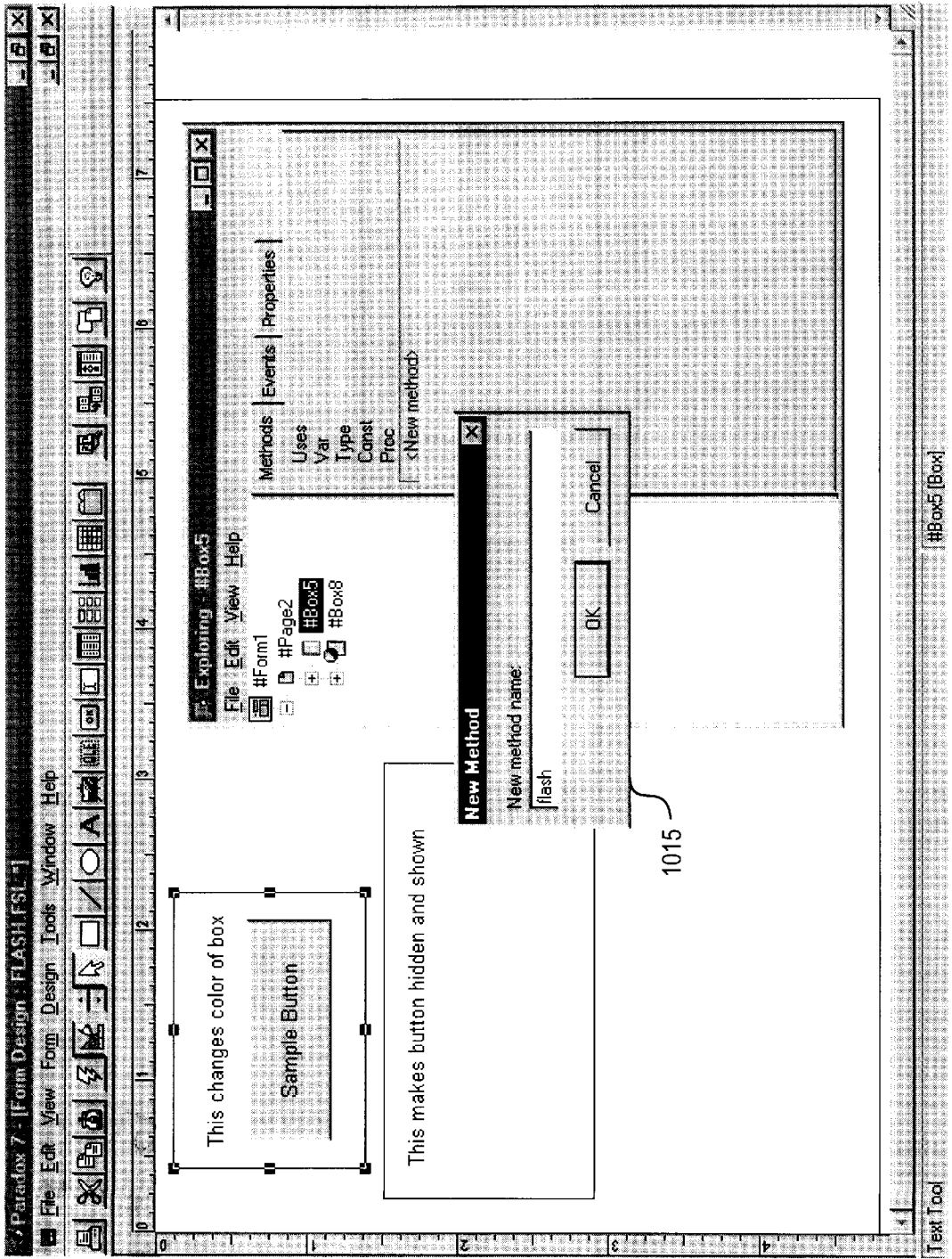
Figure 10C:
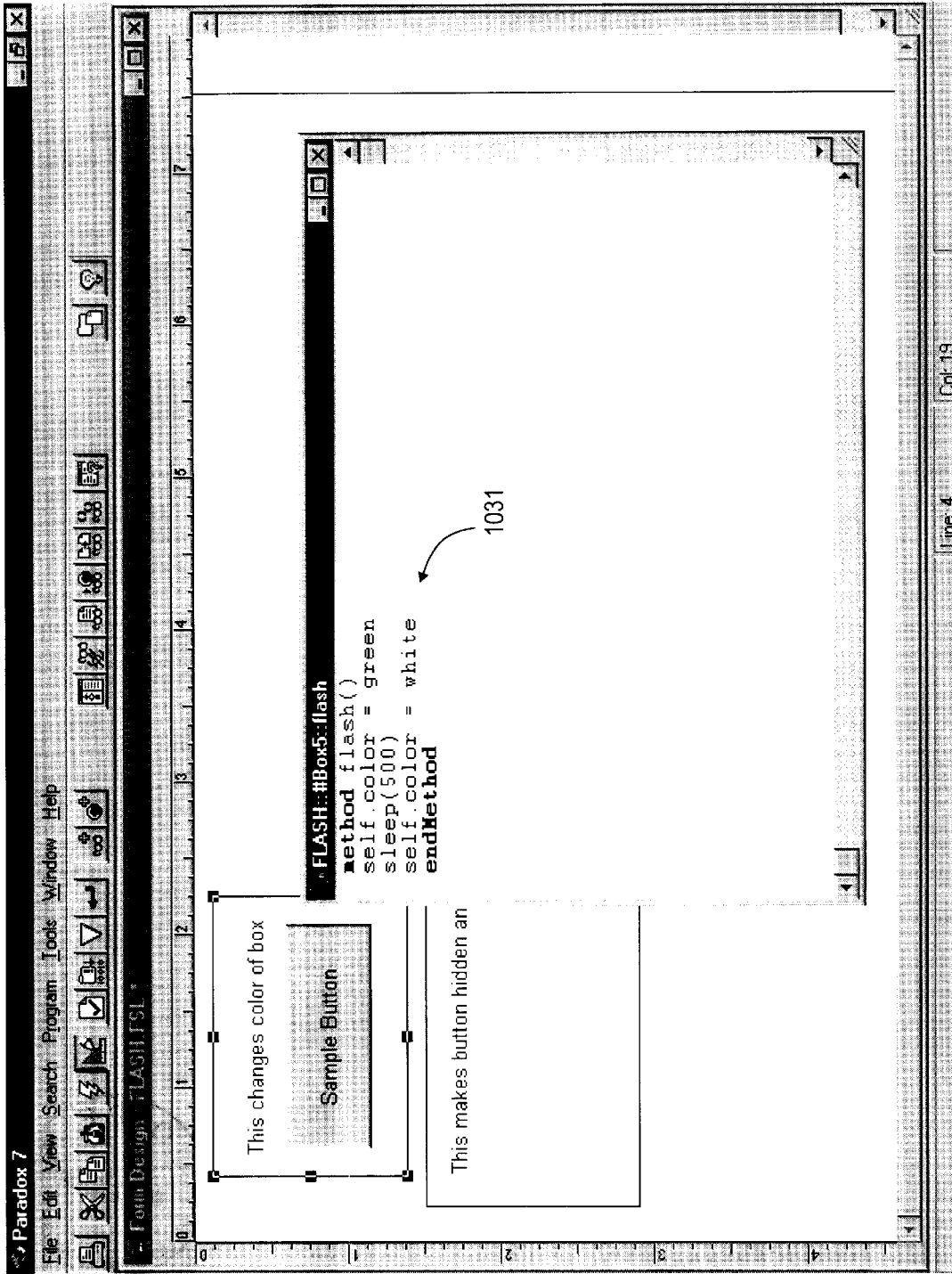

FIG. 10A illustrates a simple form 1000, in design mode. Using the Object Explorer, shown at 1001, one sees that the form 1000 includes a box 1010, a box 1020, a sample button 1005, as well as other elements (e.g., form object, page object, and text objects). In FIG. 10A, the box 1010 has focus—it is the currently-selected object on the form. Accordingly, corresponding box node 1011 is highlighted in the Object Explorer 1001. Now, programming code is to be attached to the box by selecting "New Method" choice from the "Methods" Page, as shown at 1013. The system responds with a "New Method" Dialog 1015, shown in FIG. 10B, whereupon the user enters a name for the new method being created.

For the example at hand, the new method is called "flash" and includes method steps instructing the box (here, the "self" member) to change its color first to green and then to white. Actual entry of the script for defining these steps is shown at 1031, in FIG. 10C. This method is somewhat similar to the "flash" method created for the box object 620 previously shown in FIG. 6K, except here the action is to affect the container (box), not the sender (button).

Figure 10D:
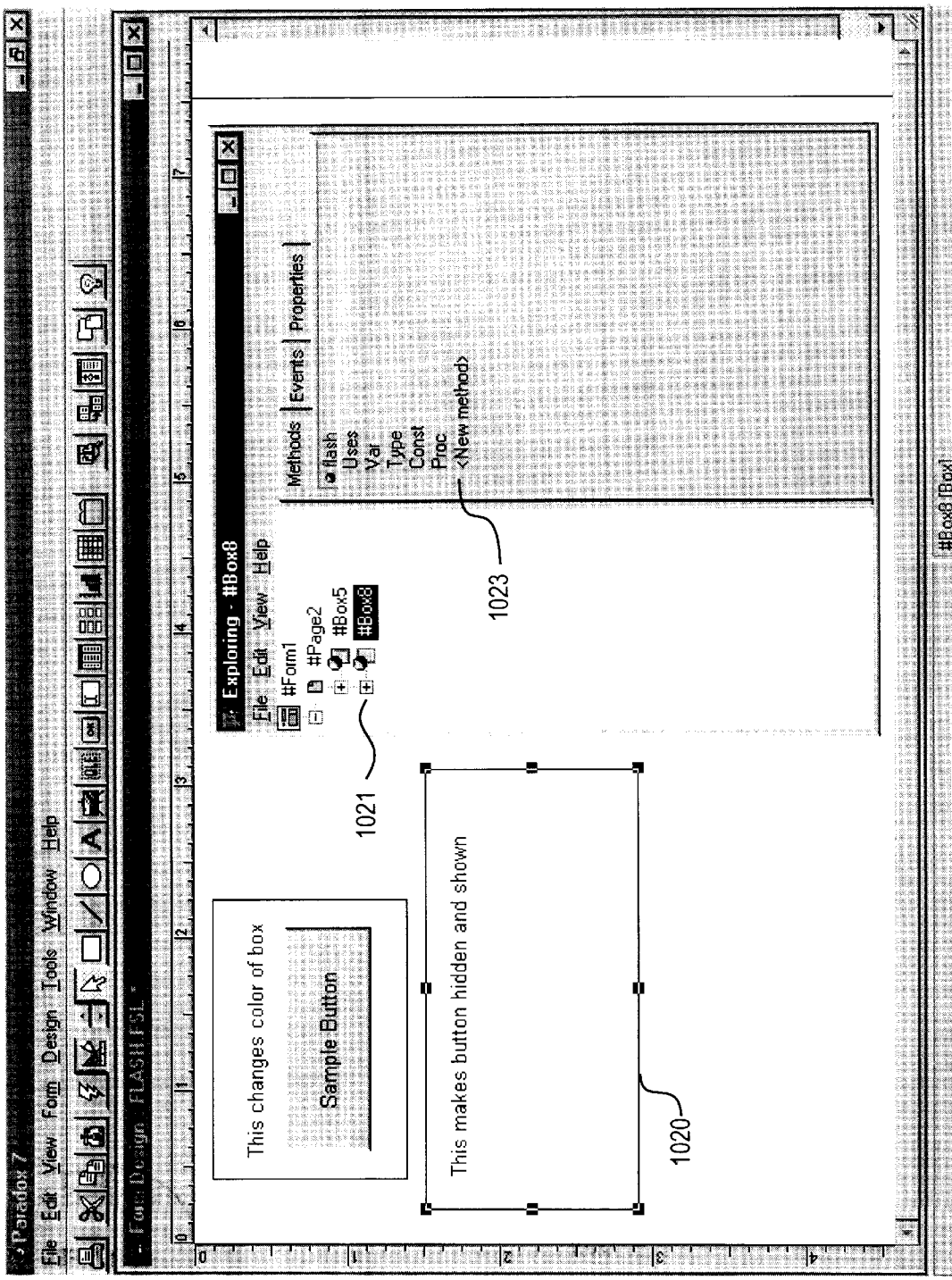
Figure 10E:
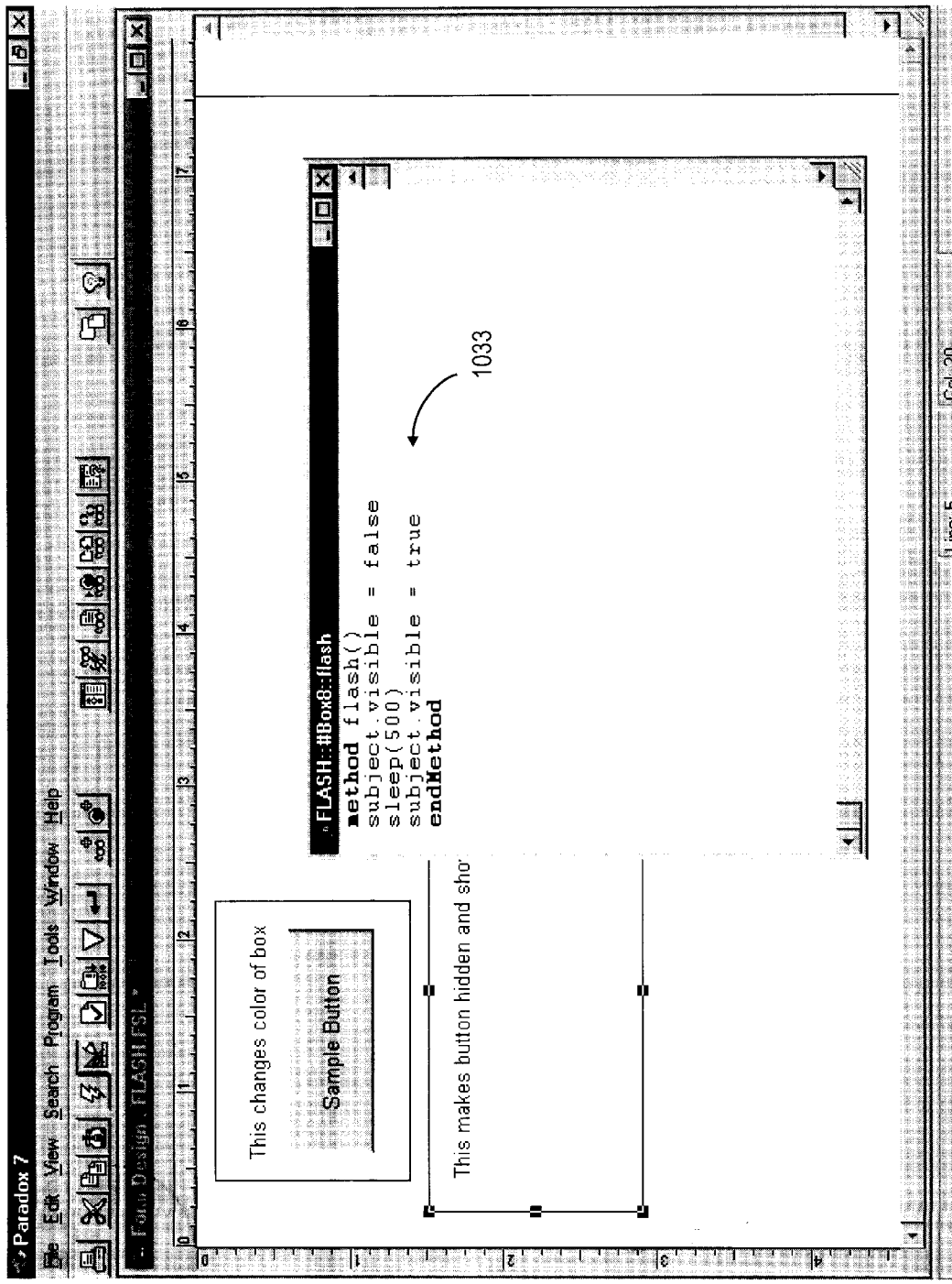
Figure 10F:
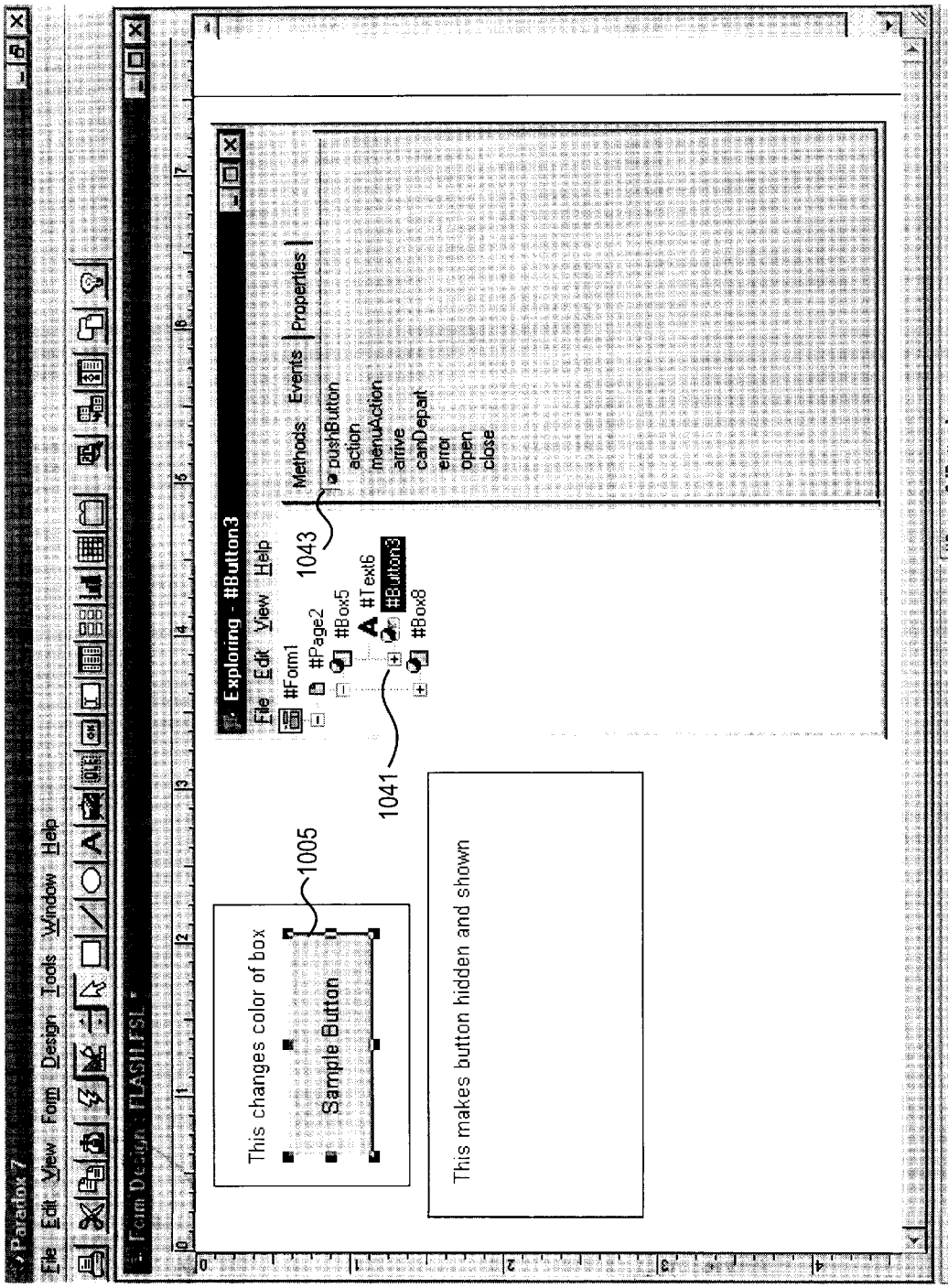
Figure 10G:
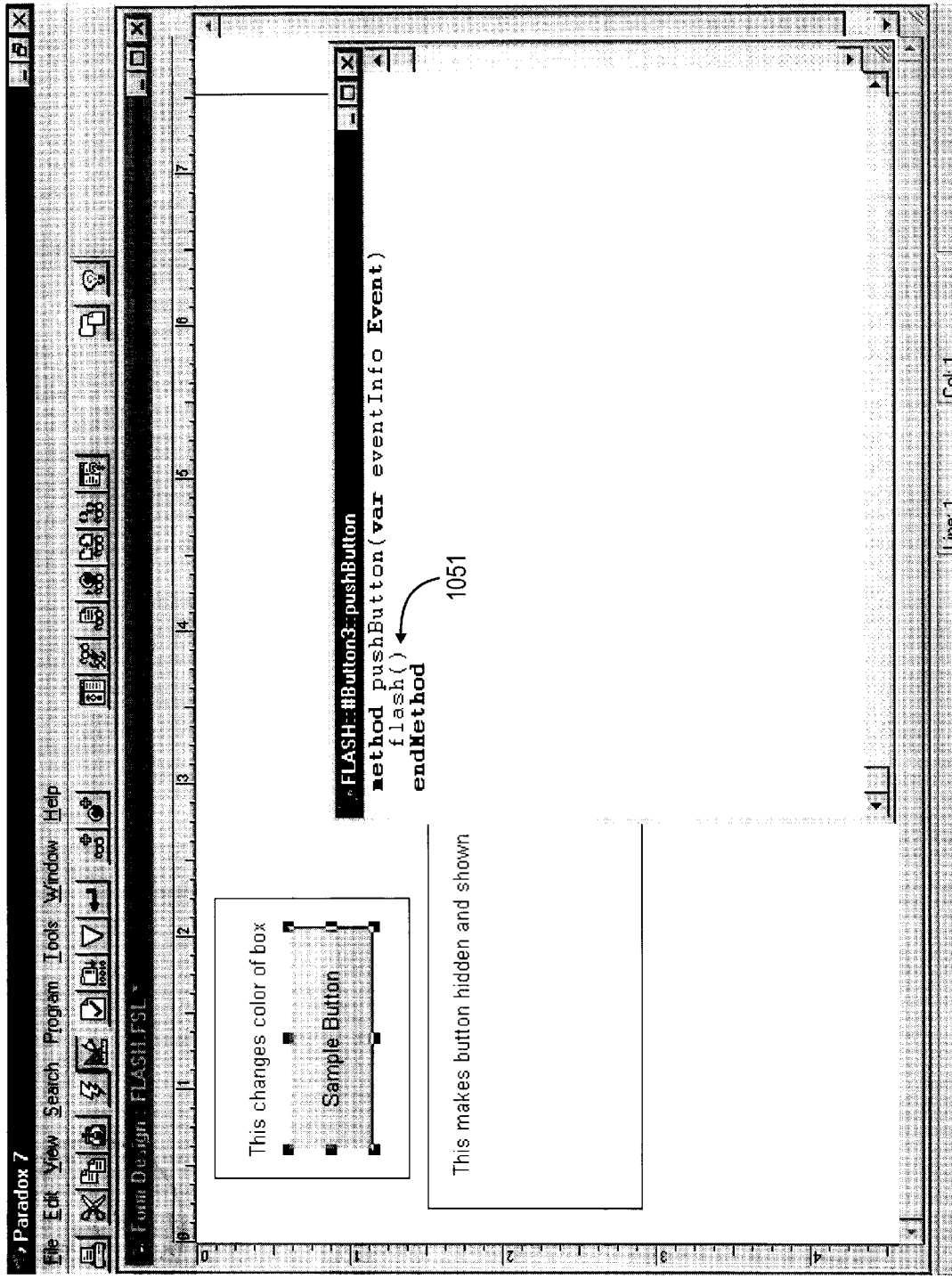

FIGS. 10D–E illustrate comparable steps for defining a second "flash" method, this time for the box 1020. First, as shown in FIG. 10D, the box 1020 is selected r (e.g. by clicking on it), or the corresponding box node 1021 is selected. Either action causes the box 1020 to receive focus on the form and, at the same time, the box node 1021 to be selected in the outline. Additionally, the methods, events, and properties for this object—box 1020—are now currently displayed by the Object Explorer. For the second "flash," method steps are entered for making the sender object ("subject") flash on and off, by setting its "visible" property first to false and then to true. The script for defining the steps is shown at 1033, in FIG. 10E.

As previously illustrated by FIG. 6K for the field object 615, the user may now drastically change the behavior of an object by simply dragging it from one container (in the present example, box 1010) to another container (box 1020). Recall that the methods and properties attached to an object remain with that object throughout cutting, pasting, moving, and the like. Thus, the pushButton event handler or method (which includes a call to a "flash" method) remains with the button object 1005, despite having been moved from one container to another.

Figure 10H:
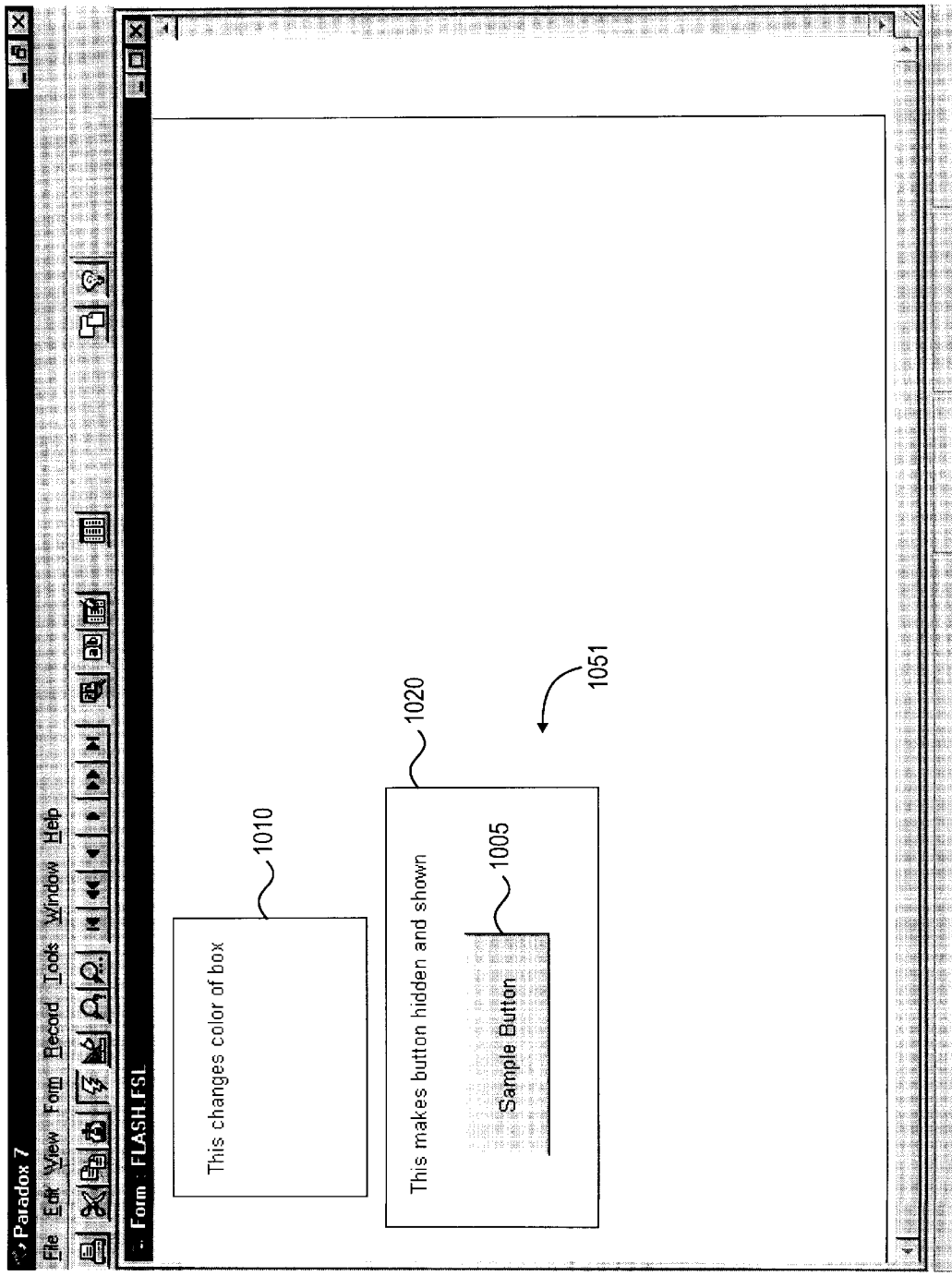

Which "flash" method actually gets executed at runtime when pressing the button 1005 depends upon the "context" of the button—where (i.e., what container, if any) it is currently located. In FIG. 10H, for instance, placement of the button 1005 within the box (container) 1020, as indicated t 1051, causes the button to flash on and off (i.e., toggle its "visible" property from false to true), since it inherits by context the "flash" method of its container, box 1020. In a corresponding manner, moving the button 1005 to the box 1020 severs this inherited behavior (of flashing on and off). Instead, the button 1005 triggers the "flash" method of the box 1020, thereby causing the box (i.e., the "self" target) to flash colors (not shown).

F. Dynamic updating of outline

Figure 11A:
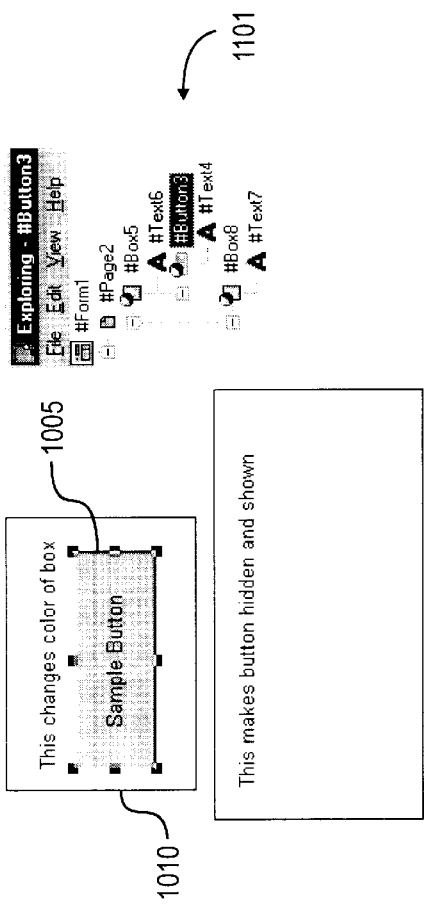
FIGS. 11A–B are bitmap screenshots illustrating dynamic updating of the outline view representing containership relations among objects, which occurs upon operations which affect an object (e.g., cutting, pasting, copying, moving, and the like).
Figure 11B:
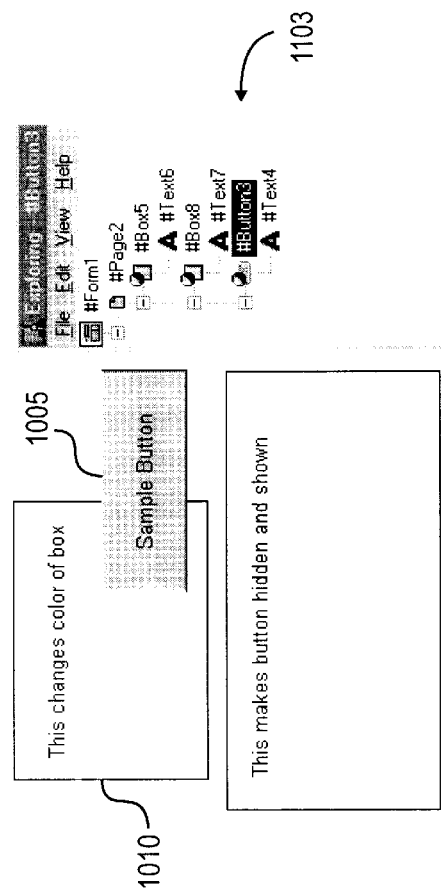

All operations which affect the containership relationship between objects are immediately reflected in the Object Explorer. For instance, as soon as the button 1005 is moved from the box 1010, the outline is updated to reflect the new containership relationship. In FIG. 11A, for instance, while the button 1005 resides within the box 1010, the outline appears as shown at 1101: the button is shown as being contained by the box 1010. Upon movement of the button 1005 outside of the box 1010, on the other hand, the outline dynamically and immediately changes as shown at 1103 in FIG. 11B. Here, the button is no longer contained within the box; therefore, its corresponding node is not shown as being a descendent or a child of the box. Additionally, a desired object (with or without its own containees) may be moved to a particular target container by dragging its corresponding outline node to the node of that container (or pasting the node to that container node). If the container can accept the object (as described above), the object will be pasted or moved into that container while, at the same time, the outline view updates to reflect the new relation(s).

Thus, FIGS. 10A–H have illustrated inheritance by context (as previously illustrated in FIGS. 6A–M) for the purpose of illustrating use and effectiveness of the Object Explorer of the present invention, which affords quick access to methods, events, and properties of objects which exist in a hierarchical relationship.

G. Internal operation of Object Explorer

Figure 12A:
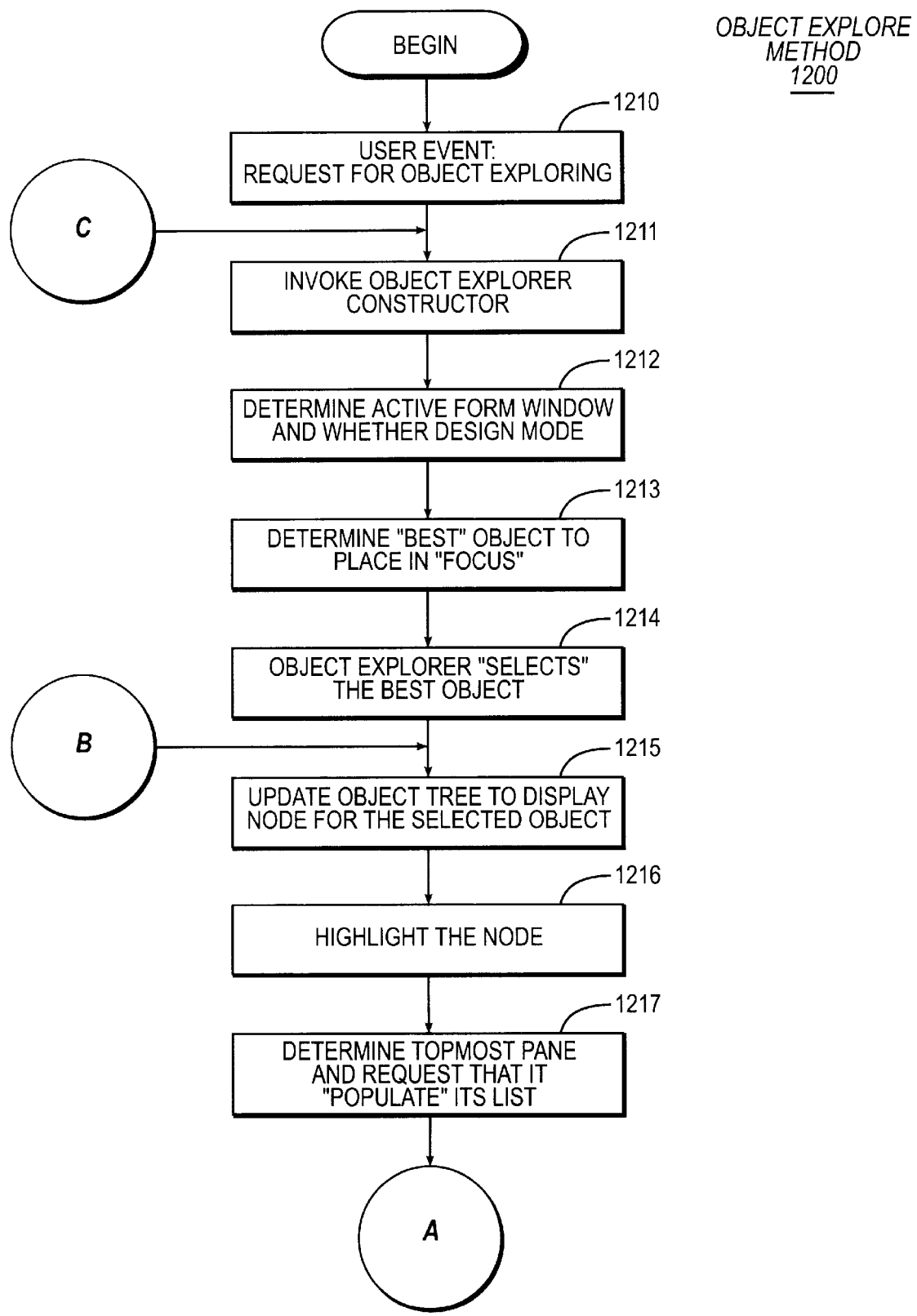
FIGS. 12A–B are flowcharts illustrating an Object Explorer method 1200 of the present invention.
Figure 12B:
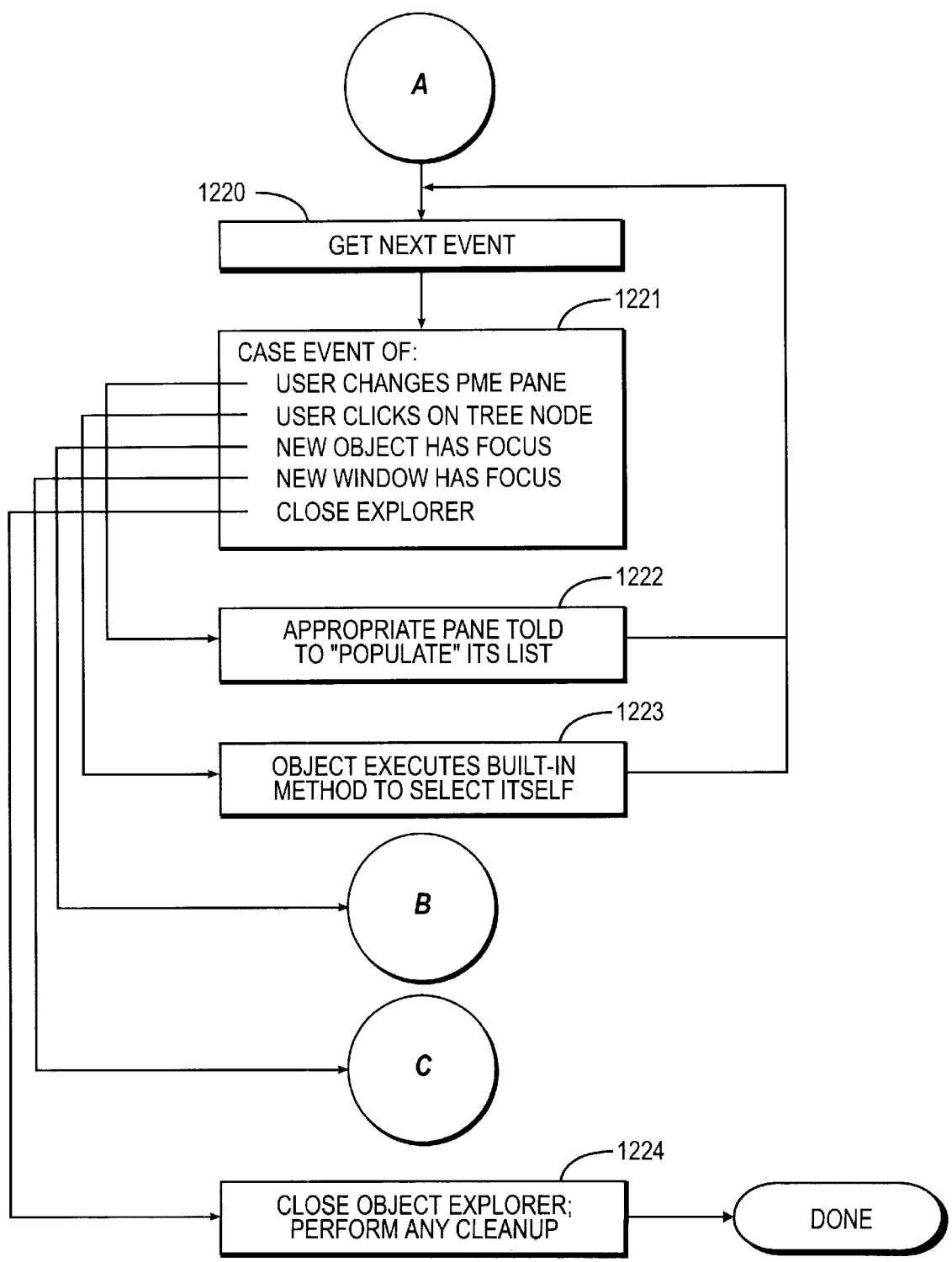

FIGS. 12A–B illustrate an Object Explorer method 1200 of the present invention. At step 1210, a user event is received requesting object exploring. This may occur as a result of the user requesting the Object Explorer as a menu item (or toolbar button equivalent), or requesting it from a pop-up menu (i.e., by right clicking on an object). Any one of these events generates a message which is posted to the desktop which ultimately leads to invocation of the Object Explorer. Specifically, at step 1211, the constructor (e.g., C++ (or C with objects) Class Constructor) for the Object Explorer is invoked.

The constructor itself performs many chores. At the outset, it creates the necessary windows and data structures for supporting the Object Explorer. It also loads the latest set of preferences set by the user. Then, at step 1212, the constructor determines the active form window (i.e., the form being used by the user) and whether the form window is in design mode. Then, at step 1213, it determines the "best" object to call—that is, the object which is given focus. The constructor makes this determination generally of "best object" among one of the following:

(1) the "active" object (an internally-maintained member of the form);

(2) the object last receiving a mouse click (i.e., user selection);

(3) the currently selected object (if there is only one); and (4) the form itself (if nothing is selected). From these, the Object Explorer "selects" the best object, as indicated at step 1214.

Having selected an object, the Object Explorer now updates the object tree to display a corresponding node for the selected object, as shown at step 1215. Here, the Object Explorer makes sure that the object tree has scrolled the object (glyph and node) into view on the tree. At step 1216, the Object Explorer highlights the node in the object tree which corresponds to this selected object. Now, the topmost pane is determined and is requested to "populate" its list. Each of the PME panes corresponds to an object which knows best how to populate its window with appropriate information and how to best handle user input. Each PME pane itself can be implemented in a conventional manner as a "list" control; special glyphs and icons can be created as "owner drawn" controls.

At this point, the Object Explorer displays the hierarchical object tree with the appropriately selected node; a PME pane relevant to that node is displayed with a list populated with information relevant to the selected object. At step 1220, the method gets the next event which occurs in the system. Exemplary event processing is indicated at step 1221. In the event that the user requests a change to another PME pane, the appropriate pane is told to "populate" its list, as indicated at step 1222. If the user clicks on a tree node, the corresponding object executes a built-in method to select itself, as indicated by step 1223.

If, instead, a new object has focused (e.g., the user has selected a new object with the mouse device), the method loops back to step 1215 to update the object tree to display the appropriate node for the newly-selected object. If, on the other hand, a new window has focused (e.g., the user has opened a new form), then the method loops back to step 1211 to invoke the Object Explorer's constructor, thereby creating a new Object Explorer instance for the new form window. Finally, if the user selects to close the Object Explorer, at step 1221, then the Object Explorer closes at step 1224, performing any cleanup needed (e.g., deallocating memory and resources).

Source listings, presented in the C programming language (with objects), are appended herewith as Appendix A, for providing further description of an exemplary implementation of the Object Explorer of the present invention. A suitable development system for compiling and linking such listings is available from several vendors, including Borland International of Scotts Valley, Calif., and Microsoft Corporation of Redmond, Wash. Further description of the system and methods of the present can be found in user and programmer guides and additional reference materials providing additional description for the present invention, as implemented in a commercial embodiment marketed under the tradename of Paradox® 7 for Windows, available from Borland International.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

42

APPENDIX A

Copyright © 1995, Borland International, Inc.

```
//$$$ (1) The Object Explorer "class" implemented as a C struct

// Main desktop window management structure
        typedef struct
        {
                int     mode;           // startup mode: see 'Startup Modes' defines
                int     numWindows;     // number of windows
                int     iSplitPos;
                int     iTab;
                BOOL    bMenu;          // If TRUE the menu is up
                BOOL    bObjTree;       // If TRUE starts out split, does not save
pos
                BOOL    bTabStacked;    // If TRUE tabs are stacked
                BOOL    bOCXParams;     // If TRUE then show OCX params on
event+methd HWND    hwndBrowser;    // Main 3DI window: contains Object, Split,
Tab
                HWND    hwndObject;     // Object browser window
                HWND    hwndSplit;      // Splitbar window
                HWND    hwndTab;        // Tab window: Contains Method, Event,
Property
                HWND    hwndMethod;     // Methods window
                HWND    hwndEvent;      // Event list window
                HWND    hwndProperty;   // Properties window
                HWND    hwndList;       // Temporary list window used during
construction void*   pClass;         // pointer to CBrowserWnd
                void*   pTab;           // pointer to CTabWnd
                void*   pSplit;         // pointer to CSplitWnd
                void*   pObject;        // pointer to CObjectWnd
                void*   pBrowseMgr;     // pointer to BrowseTreeParamsTV (tree list)
                void*   pMethod;        // pointer to CMethodWnd
                void*   pEvent;         // pointer to CEventWnd
                void*   pProperty;      // pointer to CPropertyWnd
                void*   pList;          // temporary pointer to CListWnd used in
construction
                FormMgr* pFM;           // pointer to the form manager class
                HCURSOR hCursor;        // current cursor, to avoid flicker
                LPCTRLTAB lpCtrlTab;    // control-tab handler
                LPSELLIST  pInitMethodList;    // selection list for method tab
                LPSELLIST  pInitEventList;     // selection list for event tab
                LPSELLIST  pInitPropertyList;  // selection list for property tab int     initMethodVPos;    // initial V Pos for method tab
                int     initMethodHPos;    // initial H Pos for method tab
                int     initEventVPos;     // initial V Pos for event tab
                int     initEventHPos;     // initial H Pos for event tab
                int     initPropertyVPos;  // initial V Pos for property tab
                int     initPropertyHPos;  // initial H Pos for property tab
```

```
    int   tempUserLevel;     // Same as user level but temporary -
viewall
 } BRC, FAR *LPBRC;
```

44

//$$$ (2) The constructor for the Object Explorer

```
        // Constructor will update apInfo->br.brt
        pBRC = (BRC *)malloc(sizeof(BRC));
        memset((LPSTR)pBRC,0,sizeof(BRC));
        apInfo->br.brc = pBRC;

// Allocate memory for the selection list work
        if (!pBRC->pInitMethodList)
            pBRC->pInitMethodList = (LPSELLIST)fmalloc(sizeof(SELLIST));
        if (!pBRC->pInitEventList)
            pBRC->pInitEventList = (LPSELLIST)fmalloc(sizeof(SELLIST));

if (!pBRC->pInitPropertyList)
            pBRC->pInitPropertyList =
(LPSELLIST)fmalloc(sizeof(SELLIST));

// Initially load the BRC
        pBRC->pFM = pFM;
        pBRC->mode = START_TABANDTREE;    // default // Construct browse window handling class
    if (!pClass)
    {
        pClass = CPNEW (CBrowseWnd(apInfo, pBRC, (BRTwindowStyle)
uData), CBrowseWnd);
        if (!pClass)
        {
            return MEMERR;
        }
    }
    else // resume from semi-dormant state
    {
        pClass->Resume( pFM );
    }

// Disable the desktop window for modal effects
    if (uData == BRT_MODAL)
        EnableWindow(apInfo->hDeskTop, FALSE);

// Return value
    if (pData)
        *((HWND*)pData) = pBRC->hwndBrowser;
```

45

```
//$$$ (3) The class definition for the Object Explorer window
//$$$ The handling class (BRC is the Object Explorer per se. CBrowseWnd, is
//$$$ the window handling part of it.  The CPNEW above shows CBrowseWnd
//$$$ being constructed.

///////////////////////////////////////////////////////////////////////
//
// Class designed to handle the browse window
//
class CBrowseWnd : public CChildWnd
{
public:
    CBrowseWnd( APInfo* apInfo, BRC* pBRC, BRTwindowStyle style );
    CBrowseWnd( void );
    ~CBrowseWnd();

// Key interface functions
    UIObject* GetCurSelUIO(FormMgr* pFM);
       ERR    notify(BRnotification notify, UINT uData, void* pData);
    WINPROC MessageHandler( WINDOWS_PARAMS );
    BOOL    Resume( FormMgr* pFM );
    BOOL    HandleCtrlTabHit();
    BOOL    HandleHelpHit();
    BOOL    HandleMenuHelpHit();
    void    LoadStartupOptions();

// Subwindow Handlers
    BOOL    InstantiateSplitWnd( BRC* pBRC );
    BOOL    InstantiateObjectWnd( BRC* pBRC );
    BOOL    InstantiateTabWnd( BRC* pBRC );
    void    EnableChildRepaint( BOOL bEnable );
    void    BeginDrag(int xPos);
    void    EndDrag(RECT rect);
    void    SetViewMenuState();

// Message handling functions
    LONG    LButtonDown( WPARAM wParam, LPARAM lParam );
    LONG    LButtonDblClk( WPARAM wParam, LPARAM lParam );
    LONG    RButtonDown( WPARAM wParam, LPARAM lParam );
    LONG    LButtonUp( WPARAM wParam, LPARAM lParam );
    LONG    RButtonUp( WPARAM wParam, LPARAM lParam );
    LONG    MouseMove( WPARAM wParam, LPARAM lParam );
    LONG    Size( WPARAM wParam, LPARAM lParam );
    LONG    Move( WPARAM wParam, LPARAM lParam );
    LONG    CommandProc( WPARAM wParam, LPARAM lParam );

// Child-Message handling functions
        virtual LONG   LButtonDownChild( CChildWnd* pChild, WPARAM wParam,
    LPARAM lParam );
        virtual LONG   LButtonDblClkChild( CChildWnd* pChild, WPARAM wParam,
    LPARAM lParam );
        virtual LONG   RButtonDownChild( CChildWnd* pChild, WPARAM wParam,
    LPARAM lParam );
        virtual LONG   LButtonUpChild( CChildWnd* pChild, WPARAM wParam, LPARAM
    lParam );
        virtual LONG   RButtonUpChild( CChildWnd* pChild, WPARAM wParam, LPARAM
    lParam );
```

46

```
            virtual LONG    MouseMoveChild( CChildWnd* pChild, WPARAM wParam, LPARAM
        lParam );
            virtual LONG    SizeChild( CChildWnd* pChild, WPARAM wParam, LPARAM
        lParam );
  5         virtual LONG    MoveChild( CChildWnd* pChild, WPARAM wParam, LPARAM
        lParam );
            void SetThreeD( BOOL b3D );
            BOOL GetThreeD();
            BOOL HandleTabHit();
 10         BOOL HandleControlTabHit();
            BOOL SetStartupOptions( int iSplit, int iTab );
            BOOL SelectSpecificTab( eTabType eNewTab );

// Utility functions
 15         FormMgr*    GetFormMgr();
            APInfo*     GetApInfo();
            BOOL        SetPositions( RECT rect, BOOL bMove );
            BOOL        SelectTab( int iTab );
            BOOL        ChildEnable();
 20         BOOL        ChildDisable();
            eTabType    GetCurTab() { return _eCurTabSelected; };
            BOOL        InitMenu();
            void        SetCurTab( eTabType iTab );
            void        ExternalSetFocus();
 25
        private:
            HDC         _pDragDC;
            RECT        _rDragRect;
            int         _iHelpMenuID;
 30
        public:
            APInfo*     _apInfo;
            FormMgr*    _pFM;
            UIObject*   _pUIOSelect;       // JOAL: this overrides the selected
 35     object on the current form
            BOOL        _keepPinned;

// Directly managed by the browse window
            CObjectWnd* _pObjectWnd;
 40         CSplitWnd*  _pSplitWnd;
            CTabWnd*    _pTabWnd;

int         _pSplitPos;
            eTabType    _eCurTabSelected;
 45         BOOL        _bDragging;
            BOOL        _bSubsumed;
            BOOL        _bDelayedStart;
        };

50
```

47

```
//$$$ (4) The constructor for the CBrowseWnd class

////////////////////////////////////////////////////////////////////////
 5      ///
        // Constructor
        // Note:  Uses apInfo for BRC structure tracking
        CBrowseWnd::CBrowseWnd( APInfo* apInfo, BRC* pBRC, BRTwindowStyle style )
        {
10         u32   exWinStyle, winStyle;
           HWND hwnd = NULL;
           char title[255];
        //    ClsIdePrefs* pPrefs;

15         NEWASSERT( pBRC, "Pointer to Browse Structure NULL" );

// Initialize member variables
           _iHelpMenuID = 0;
           _eCurTabSelected = EVENTS;
20         _pDragDC = NULL;
           SetRectEmpty( &_rDragRect );
           _pBRC = pBRC;
           _pFM = NULL;
           _pTabWnd = NULL;
25         _pSplitWnd = NULL;
           _pObjectWnd = NULL;
           _pSplitPos = 50;
           _bDragging = FALSE;
           _apInfo   = apInfo;
30         if (pBRC)
           {
              pBRC->pClass = (LPVOID)this;
              _pFM = pBRC->pFM;
           }
35
           // Set the window styles
           // NOTE: winStyle starts with WS_POPUP
           if (style == BRT_NORMAL)
           {
40            exWinStyle = WS_EX_CONTROLPARENT | WS_EX_WINDOWEDGE; // |
        WS_EX_TOOLWINDOW;
              winStyle = WS_POPUP | WS_CAPTION | WS_SYSMENU | WS_THICKFRAME |
                  WS_MINIMIZEBOX | WS_MAXIMIZEBOX;
           }
45         else
           {
              exWinStyle = WS_EX_DLGMODALFRAME | WS_EX_CONTROLPARENT |
                  WS_EX_WINDOWEDGE; //  | WS_EX_TOOLWINDOW;
              winStyle = WS_POPUP | WS_CAPTION | WS_SYSMENU | WS_THICKFRAME |
50      WS_BORDER;
           }

// Handle the startup conditions
           if (pBRC)
55         {
              CLASSID clsType = UIOBJECT_CLASS;

if (pBRC->pFM)
```

48

```
        clsType = (CLASSID)UIO_classType(pBRC->pFM);

switch( pBRC->mode )
     {
        case START_TABANDTREE:
        case START_DONTCARE:
        case START_TABANDTREE_PROP:
           _pSplitPos = 50;
           break;

case START_OBJTREE:
           _pSplitPos = 100;
           break;

case START_TABWND:
        case START_TABWND_METHOD:
        case START_TABWND_EVENT:
        case START_TABWND_PROP:
           _pSplitPos = 0;
           break;
     }

// Handle special startup cases
     // No object tree on scripts or libraries
     if (clsType == FORMLIBRARY_CLASS || clsType == FORMSCRIPT_CLASS)
     {
        _pSplitPos = 0;
     }
  }

// Set startup options
  if (!pBRC->bObjTree)
  {
     LoadStartupOptions();
  }

// INITIALIZE the CONTROL_TAB MESSAGE HANDLING FUNCTION PTR
  pBRC->lpCtrlTab = CtrlTabHandler;

// Create the main BRC window
  LoadString(hDLLModule, IDS_STR_BROWSER, title, MAX_ITEMLEN - 1);
  hwnd = CreateWindowEx( exWinStyle,
                 QueryClassName( BRCCLASS ),
                 title,
                 winStyle,
                 0, 0, 0, 0, // Pos/size set later by loadProperties.
                 apInfo->hDeskTop,
                 LoadMenu(_hInstance, ID(BRCMENU)),
                 _hInstance,
                 (PVOID) pBRC);   // Pass through struct ptr.
  ShowWindow( _hWnd, SW_HIDE );

// Save the window handle
  _hWnd = hwnd;
  if (pBRC)
  {
```

```
        pBRC->hwndBrowser = hwnd;
    }
}
```

50

```
//$$$ (5) The routine called from the desktop to invoke the Object Explorer
//$$$ Here, the routine is called when the desktop sees the
//$$$ Object Explorer menu item selected or the toolbar button pressed.
//$$$ It invokes the constructor via our own CPNEW below.
//
//---------------------------------------------------------------------------
// Function:  MakeMethodsDialog
//
//---------------------------------------------------------------------------
#pragma argsused
extern "C"
u32 EXPENTRY MakeMethodsDialog(HWND hWndParent, UIObject* pUIO, BOOL bObjTree,
      BOOL bTriggeredByHand )
{
    HWND            hWnd;
    FormMgr*        pFM = pUIO ? UIO_mgrOf(pUIO) : NULLP;
    BRC*            pBRC = NULL;
    CBrowseWnd*     pClass = NULL;
    MethodsData_t   mData;
    APInfo*         pAI = HWNDtoAPInfo(hWndParent);
    ClsIdePrefs*    pPrefs = NULL;
    UINT            bPinState;

// Make sure that we have focused on a page rather than an empty form
    // This will make the property sheets work
    pPrefs = GetIDEPrefs(pAI);
    if (!pUIO || pUIO == (UIObject*)-1L)
    {
        HWND hwndMDIclt;
        HWND hwndActiveForm;
        HWND hChild;

// Retrieve MDI client window, (Parent of pop-up is always the top level)
        SendMessage(pAI->hDeskTop, WM_GETDESKINFO, CLIENTHANDLE,
    (LPARAM)&hwndMDIclt );

// For now whatever it's a form or not we send the message
        hwndActiveForm = (HWND) SendMessage(hwndMDIclt, WM_MDIGETACTIVE, 0,
 0L);
        ASSERT(IsWindow(hwndActiveForm), "IDEMETHD - Invalid form window
 handle");

// Determine the scurrent form manager
        pFM = APgetForm( hwndActiveForm );

// Get the currently selected item in the form
        if (pFM)
        {
            pUIO = (UIObject*)((pFM->uim.status & UIMS_FIELDVIEW)
                                    ? pFM->pActive : pFM->pClickIn
                                    // No selection mean manager
                                    ? pFM->pClickIn: pFM->pLastSelect
                                    ? pFM->pLastSelect : (FormObj*)pFM);
        }
```

51

```
              // Perhaps it is not a form; therefore, get the object description
          }

// JOAL: Make sure the palMethod pointer is created:
  5       IDEgetWindow(pAI, IDM_PE_VIEWMETHODS, TRUE);

PalMethod* pMethod = pAI->debug.pMethod;
          if (!pMethod)
          {
 10           return 0L;
          } mData.pO             = pUIO;
          mData.bRunning       = pFM ? !(pFM->status & FMS_DESIGNMODE) : FALSE;
 15       if (((hWnd = pAI->debug.pMethod->getHwnd()) != HNULL) && IsWindow(hWnd))
          {
              // JOAL : If WM_CLOSE in queue: remove it!
              MSG msgStruct;
              PeekMessage(&msgStruct, hWnd, WM_CLOSE, WM_CLOSE, PM_NOYIELD |
 20    PM_REMOVE);

// DSB 19425 At this point we've got to see if the methods dialog
              // is going on our pUIO.  If not, we've got to resume it to get it
              // to update.
 25           if (IsIconic(hWnd))
                  ShowWindow(hWnd,SW_SHOWNORMAL);
              else
                  APactivateWindow(hWnd);
              ResumeMethodsDialog( pAI->hDeskTop, pUIO, bTriggeredByHand);
 30           return MAX_PROPERTIES;    // set to "ignore"
          } if (pFM)
          {
 35           FMclearUndoStack(pFM);
          }

// Locate the pointer to the browse object
          if (pAI)
 40       {
              pBRC   = (BRC *)(pAI->br.brc);
              pClass = ( pBRC ? (CBrowseWnd*)pBRC->pClass : NULL );
          }
          else
 45           return GENERICERR;

// Allocate the memory for the browser
          if (!pBRC)
          {
 50           // Constructor will update pAI->br.brc
              pBRC = (BRC *)malloc(sizeof(BRC));
              memset((LPSTR)pBRC,0,sizeof(BRC));

// Allocate memory for the selection list work
 55           if (!pBRC->pInitMethodList)
                  pBRC->pInitMethodList = (LPSELLIST)fmalloc(sizeof(SELLIST));
              if (!pBRC->pInitEventList)
                  pBRC->pInitEventList = (LPSELLIST)fmalloc(sizeof(SELLIST));
```

52

```
         if (!pBRC->pInitPropertyList)
             pBRC->pInitPropertyList = (LPSELLIST)fmalloc(sizeof(SELLIST));

// Initially load the BRC
         pAI->br.brc = pBRC;
         //if (pAI->debug.mode & DBGM_ACTCHANGE)
             pBRC->pFM = pFM;
         pBRC->mode = START_TABANDTREE;     // default // Handle the object tree special case override
         if (bObjTree)
         {
             pBRC->mode = START_TABANDTREE_PROP; // both, with properties tab
             pBRC->bObjTree = TRUE;
         }
     }

// Set preload properties
     pBRC->bMenu = pPrefs->m_option.size.y;
     pBRC->bTabStacked = pPrefs->bTabStacked;
     pBRC->tempUserLevel = pAI->system.userLevel;
     pBRC->bOCXParams = pPrefs->dispOCXParams;

// Instantiate the oibject if necessaary
     if (!pClass)
     {
         pClass = CPNEW( CBrowseWnd(pAI, pBRC, (BRTwindowStyle)BRT_NORMAL),
     CBrowseWnd);
         if (!pClass)
             return MEMERR;
     }

// Launch the browser
     if( pAI->br.lpfnNotifyBR )
         (pAI->br.lpfnNotifyBR)( pAI, BRN_LAUNCH, BRT_NORMAL, &hWnd );

// Restore the window information
     bPinState = (UINT)((pPrefs->methods.option & STOP_AFTERUSE) ? 0 :
 PIN_ISPIN);
     SETPINSTATE(hWnd, bPinState);
     pBRC->iSplitPos = pPrefs->m_option.pos.x;
     pBRC->iTab = pPrefs->m_option.pos.y;
     EnableWindow(hWnd,TRUE);

pAI->debug.pMethod->setHwnd(hWnd);
     pAI->debug.pMethod->showAtSize(!bPinState);
     IdeCtrlCreated(pFM);          // joal: set hwndSelf ASSERT(hWnd, "Fail Creating methods dialog");

ifdef OLDMETHOD
     InitiateMethodsDialog(hWnd, pUIO);
#endif
     if (pFM)
     {
         // (joal) Mark as interested in IDE notifications from now on:
         palDesignInfo* pDI = (palDesignInfo *)pFM->palDI;
```

53

```
          pDI->comp.controls |= IN_IDENOTIFY;
      }

// Set the focus if necessary
      // Note: THIS IS RARE, you normally do not set focus on ObjExp
5     if (bTriggeredByHand)
      {
         if (pClass)
            pClass->ExternalSetFocus();
10    } return MAX_PROPERTIES;   // set to "ignore"
  }
```

```
//$$$ (6) The method called whenever a new object is selected.
//$$$ This is the routine called whenever the Object Explorer
//$$$ receives notification that the user has selected a new object,
//$$$ REGARDLESS how that selection was done.

//================================================================
// FUNCTION:   ObjectNotifySelectObj
// SYNOPSIS:   callback to handle object selection notification from desktop
//================================================================
extern "C"
void EXPENTRY ObjectNotifySelectObj( const APNotifyInfo* pAPNI, HWND hWndNotify )
{
    HWND hWnd = hWndNotify;
    BRC* pBRC = (BRC*)GetWindowLong(hWnd, GWL_BRCPTR );
    CObjectWnd* pObject = (CObjectWnd*)pBRC->pObject;
    RECT rect;
    CLASSID clsType = UIOBJECT_CLASS;

if (pObject->WaitingForReload())   // PW47549
        return;                        // JOAL: We dont want to fix anything if we already know that we
                                       //       are going to reload the whole tree in a few milli seconds..
    #ifdef DEBUG_TREE
    char msg[255];
    if (pAPNI)
    {
        wsprintf( msg, "ObjectNotifySelectObj: pO = %x Reason %d\n",
(long)(LPSTR)pAPNI->object,
             (int)pAPNI->reason );
        OutputDebugString( msg );
    }
    #endif if (!ObjectNotifyFilterFunc( pAPNI, hWndNotify ))
        return;

// Block internal infinite loop updates
    if (!pObject->_bInternalSel)
    {
        int i;
        BOOL bOn;
        BrowseItemTV* pBI;
        BrowseTreeParamsTV* pParam = NULL;
        CBrowseWnd*   pBrowse;
        if (pBRC)
        {
           pParam = ( BrowseTreeParamsTV *) pBRC->pBrowseMgr;
           pBrowse = (CBrowseWnd*)pBRC->pClass;
        } if (pBrowse)
        {
#ifdef PW48010
```

```
            // PW48010 - This appears to break GetCurSelUIO() when we try to
        bring up the
            // OE from an editor window.  NR_SPECIALSELECT appears to be just
        an
            // optimization for GetCurSelUIO().  <rbr>
            if (pAPNI->reason == NR_SPECIALSELECT)
                pBrowse->_pUIOSelect = (UIObject*)pAPNI->object;
            else
        #endif
                pBrowse->_pUIOSelect = NULL;
            } for ( i = 0, pBI = pParam->List; i < pParam->nObjects; i++, pBI++)
            {
                if (pAPNI->reason == NR_SPECIALSELECT)
                {
                    bOn = (pAPNI->object == pBI->pO);
                }
                else
                {
                    if (pBI->pO->status & UIOS_MANAGER)
                    {
                        if (FO_FormMgr(pBI->pO)->nSelected == 0 &&
                            (pParam->curSel == i ||
                                pAPNI->object == pBI->pO ||
        pObject->SelectableObj(pParam->List[pParam->curSel].pO)))
                        {
                            bOn = TRUE;
                            pParam->curSel = i;
                        }
                        else
                            bOn = FALSE;
                    }
                    else
                    {
                        if (pObject->SelectableObj(pBI->pO))
                        {
                            bOn = ((FormObj *)pBI->pO)->mode & FOM_SELECT);
                        }
                        else
                        {
                            if (pAPNI->object == pBI->pO)
                                bOn = (BOOL) (pAPNI->reason == NR_TRUE);
                            else if (pAPNI->reason == NR_TRUE)
                                bOn = FALSE;
                            else
                                bOn = (pBI->status & BI_SELECTED);
                        }
                    }
                } if ((bOn && !(pBI->status & BI_SELECTED)) ||
                        (!bOn && (pBI->status & BI_SELECTED)))
                {
                    if (bOn)
                        pBI->status |= BI_SELECTED;
```

56

```
              else
                  pBI->status &= ~BI_SELECTED;

// execute selection: use paint if visible, else call direct
              pObject->GetRect( &rect );
              clsType = (CLASSID)UIO_classType(pBI->pO);
              if (rect.right != rect.left && clsType != REPORTBAND_CLASS)
              {
                  TreeView_GetItemRect(pObject->GetTreeWnd(), pBI->hItem,
      &rect, FALSE);
                  InvalidateRect(pObject->GetTreeWnd(), &rect, FALSE);
                  InvalidateRect(pObject->_hWnd, &rect, FALSE);
              }
              else // object window hidden, trigger shift automatically
              {
                  SynchronizeTabs( pObject, pBRC );
              }

// Always update the caption
              pObject->UpdateCaption();
          }
          if (pBI->pO && FO_FormMgr(pBI->pO) &&
              pBI->pO == (UIObject *)FO_FormMgr(pBI->pO)->pLastSelect)
          {
              pParam->curSel = i;
          }
      }
  }
}
```

57

```
//$$$ (7) A sample (the Method Pane) pane's code for filling the list.
//$$$ This is a sample (in this case for the Methods pane) of how
//$$$ a particular pane fills its list each time selection changes.

5       ////////////////////////////////////////////////////////////////////
        // Procedure:  MsgPopulateList
        // Purpose: Populate the list before window exists
        //
        void
10      CMethodWnd::MsgPopulateList( WPARAM wParam, LPARAM lParam )
        {
            UIObject* pUIO;
            CTabWnd* pParent;
            BOOL bRefill = (BOOL)lParam;
15
            NOTUSED( wParam );

// Empty the old list, if there is any
            SendMessage( _hWnd, WM_SETREDRAW, FALSE, 0L );
20          EmptyList();

// Get the browse parent
            pParent = (CTabWnd*)GetParent();
            if (!pParent)
25          {
                SendMessage( _hWnd, WM_SETREDRAW, TRUE, 0L );
                return;
            }

30          // Determine the currently selected UI Object
            pUIO = pParent->GetUIObject();
            if (pUIO)
            {
                SetUIObject( pUIO );
35              if (!bRefill)
                    CreateList();
                FillList(bRefill);

// Sort the new list
40              ListView_SortItems( _hwndList, (PFNLVCOMPARE)MethodCompareFunc,
                    (LPARAM)(LPSTR) pMethodList );
            }
            SendMessage( _hWnd, WM_SETREDRAW, TRUE, 0L );
            InvalidateRect( _hWnd, NULL, FALSE );
45
            return;
        }

//$$$ This is the workhorse function for filling the Methods pane
50      //$$$ called by the function above // Procedure:  FillList(
        // Purpose: Fill the TreeList chicago control window
55      //
        BOOL CMethodWnd::FillList( BOOL bRefill )
        {
            MethodList* pMethodList;
```

```
            UIObject*    pUIO = _pO;
            LV_COLUMN    lvC;
            LV_ITEM      lvI;
            int          index = 0;
            RECT          rect;
            char         szColumn[MAX_ITEMLEN];
            HDC          hDC;
            int          iMaxWidth;
            int          RetVal;
            int          iWidthAdjust;
            int          iCharFit;
            SIZE         pt;
            APInfo*      pAI;
            ClsIdePrefs* pPrefs;
//          char *       pStr;

// set the background color
            if (ISWINDOWS95)
            {
                ListView_SetBkColor( _hwndList, GetSysColor(COLOR_3DFACE) );
                ListView_SetTextBkColor( _hwndList, GetSysColor(COLOR_3DFACE) );
            }
            else
            {
                ListView_SetBkColor( _hwndList, GetSysColor(COLOR_BTNFACE) );
                ListView_SetTextBkColor( _hwndList, GetSysColor(COLOR_BTNFACE) );
            }

// Create the list of methods and fill it
            GetRect( &rect );
            pMethodList = CPNEW(MethodList, MethodList);

// Get the sort option
            pAI = HWNDtoAPInfo(_hWnd);
            pPrefs = GetIDEPrefs(pAI);
            pMethodList->_sort = pPrefs->m_option.size.x;
            _dwOcxColor = pPrefs->dwOCX;
            _dwNormalColor = pPrefs->dwNormal;
            _dwReadOnlyColor = pPrefs->dwReadOnly;

// Start the list build process
            pMethodList->init (pUIO);

// Build the list
            if (_pFM)
                pMethodList->build(_hWnd, !(_pFM->status & FMS_DESIGNMODE));

// Succesful completion
            if (_pMethodList)
            {
                CPDELETE(_pMethodList, ~MethodList());
                _pMethodList = NULL;
            }
            _pMethodList = pMethodList;

// Populate the list view:

// A. Insert the appropriate column entries
```

59

```
        lvC.mask = LVCF_FMT | LVCF_WIDTH | LVCF_TEXT;
        lvC.fmt = LVCFMT_LEFT;
        lvC.cx = (rect.right - rect.left) / NUM_METHOD_COLUMNS;  // allow for N
    distinct columns
5       lvC.pszText = szColumn;
        lvC.cchTextMax = 0;

// Add the column headings themselves
        iWidthAdjust = 0;
10  #if __BORLANDC__ >= __BC5MC__
        if (pMethodList->_count > ListView_GetCountPerPage(_hwndList))
    #else
        if (pMethodList->_count > ListView_GetCountPerPage(_hwndList,NULL))
    #endif
15          iWidthAdjust = GetSystemMetrics( SM_CXVSCROLL );
        hDC = GetDC( _hwndList );
        iMaxWidth = (rect.right - rect.left) - iWidthAdjust;
        if (iMaxWidth < 0) iMaxWidth = 0;

20      // Get the column heading
        UIOgetName( _pO, szColumn );
        lvC.cchTextMax = strlen(szColumn);

// Fit the column to the width of text
25      // Adjust on the fly to remaining column space
        lvC.cx = iMaxWidth;

// Forcefit it to the limitations of the column
        GetTextExtentExPoint( hDC, szColumn,strlen(szColumn),lvC.cx,
30              &iCharFit, NULL, &pt );
        if (iCharFit < lvC.cchTextMax)
        {
            szColumn[iCharFit] = '\0';
            lvC.cchTextMax = strlen(szColumn);
35      }

// Insert the column
        if (!bRefill)
            RetVal = ListView_InsertColumn( _hwndList, index, &lvC );
40      else
            RetVal = ListView_SetColumn( _hwndList, index, &lvC );
        if (RetVal == -1)
        {
            //delete pMethodList;
45          //ReleaseDC( _hwndList, hDC );
            //return FALSE;
        }

// Set the column width
50      RetVal = ListView_SetColumnWidth( _hwndList, index, lvC.cx );
        if (RetVal == -1)
        {
            //delete pMethodList;
            //ReleaseDC( _hwndList, hDC );
55          //return FALSE;
        }
        ReleaseDC( _hwndList, hDC );
```

60

```
        // B.  Add the methods to this column-oriented list view
        lvI.mask = LVIF_TEXT | LVIF_PARAM | LVIF_STATE;
        lvI.state = 0;
        lvI.stateMask = LVIS_STATEIMAGEMASK;
 5
        // add the individual methods
        for (index = 0; index < pMethodList->_count; ++index)
        {
            lvI.iItem = index;
10          lvI.iSubItem = 0;

// The parent window is responsible for storing the text
            lvI.pszText = LPSTR_TEXTCALLBACK;
            lvI.cchTextMax = MAX_ITEMLEN;
15          if (_pMethodList->_bHasMethod[index])
                lvI.state = INDEXTOSTATEIMAGEMASK(_iCode);
            else
                lvI.state = INDEXTOSTATEIMAGEMASK(_iNoCode);
            lvI.iImage = 0;
20          lvI.lParam = (LPARAM)index;
            if (ListView_InsertItem( _hwndList, &lvI ) == -1)
            {
                //CPDELETE(pMethodList,~MethodList ());
                //return FALSE;
25          }
        }

// Restore scroll position
        PostMessage( _hwndList, WM_IDE_SETVSCROLL, 0, (LPARAM)_iVScrollPos );
30      PostMessage( _hwndList, WM_IDE_SETHSCROLL, 0, (LPARAM)_iHScrollPos );

// Handle the deferred focus request from parent
        if (_bDeferFocus && _hwndList)
        {
35          SetFocus( _hwndList );
            _bDeferFocus = FALSE;
        }

_bDirty = FALSE;
40      return TRUE;
    }
```

What is claimed is:

1. In a computer system, a method for assisting a user with creating an application program, the method comprising:
   (a) providing a set of screen objects, each object having a set of properties and methods, said set of objects including some objects which may be contained within other objects of the set;
   (b) displaying a form for placement of objects;
   (c) placing desired ones of said objects at desired locations on the form;
   (d) if at least one object is placed within visual boundaries of another object, establishing an object hierarchy specifying a container relationship between the objects, said container relationship specifying which objects may access methods and properties of other objects;
   (e) displaying an outline view comprising nodes representing container relationships existing among objects; and
   (f) in response to user selection of a particular one of said objects,
      (i) highlighting a node of the outline view corresponding to the particular user-selected object, and
      (ii) responsive to said highlighting step, displaying a sheet listing properties and methods corresponding to the particular user-selected object.

2. The method of claim 1, wherein said objects include user interface objects selected from screen buttons, box objects, and text objects.

3. The method of claim 1, further comprising:
   moving an object from within the boundaries of a first object to within the boundaries of a second object; and
   responsive to said moving step, destroying the container relationship between the moved object and the first object and establishing a new container relationship between the moved object and the second object and updating said outline view to illustrate the new container relationship.

4. The method of claim 1, further comprising:
   selecting a first node representing a first object which is contained within a second object, said first node being represented in the outline view as a node which depends from a second node which represents said second object, said first and second nodes indicating a container relationship between the first and second objects;
   receiving a request for moving the first node to a node position in the outline view which depends from a third node which represents a third object; and
   responsive to said request, destroying the container relationship between said first and second objects and establishing a new container relationship between said first and third objects.

5. The method of claim 1, further comprising:
   receiving input for selecting different nodes in the outline view; and
   as each different node is selected, indicating to the user each object on the form which is associated with the selected node.

6. The method of claim 1, further comprising:
   receiving input for selecting different objects; and
   as each different object is selected, highlighting in the outline view each node which is associated with the selected object.

7. The method of claim 1, wherein the boundaries of each object comprises visual boundaries manifested by each object displayed on screen.

8. The method of claim 1, wherein said form comprises a window object displayed on a screen device.

9. The method of claim 1, wherein step (c) includes:
   displaying a set of objects which can be placed on the form;
   receiving first input for selecting one object from the set;
   receiving second input for selecting a position on a screen device, said position specifying a particular location on the form; and
   in response to said first and second inputs, placing the selected object on the form at the particular location.

10. The method of claim 9, further comprising:
    determining whether the particular location is positioned within the boundaries of an existing object; and
    if the particular location lies within an existing object which can contain the selected object, establishing a container relationship between the objects upon placement of the selected object on the form at the particular location.

11. The method of claim 10, further comprising:
    updating the outline view to indicate that the existing object now contains the selected object which has been placed.

12. The method of claim 1, wherein step (d) further comprises:
    for each at least one object placed within boundaries of another object, testing whether the object is compatible with the other object; and
    establishing a container relationship between the objects only when they are compatible.

13. The method of claim 1, further comprising:
    (g) for each at least one object placed within boundaries of another object, testing whether the object is too large for the other object; and
    (h) automatically resizing the other object so that said each at least one object can be contained within the boundaries of the other object.

14. The method of claim 1, wherein said properties include selected ones of size, position, and color.

15. The method of claim 1, wherein said container relationship specifies that an object can access the methods and properties of objects it is contained within.

16. A visual development system for creating an application program, the system comprising:
    a computer system having a processor and a memory;
    means for displaying a set of screen objects, each object having a set of properties and methods responsive to events, said set of objects including some objects which may be contained within other objects of the set;
    means for displaying a form for placement of objects;
    input means for placing desired ones of said objects at desired locations on the form;
    means for establishing an object hierarchy specifying a containership relation between the objects if at least one object is placed within visual boundaries of another object, said containership relation specifying which objects may access methods and properties of other objects; and
    means for displaying an outline view comprising nodes representing said containership relation between the objects as a hierarchical set of nodes, each node corresponding to a particular object, said outline view remaining synchronized such that user selection of a given object causes highlighting of a corresponding node for that object.

17. The system of claim 16, wherein said objects include selected ones of screen buttons, box objects, and text objects.

18. The system of claim 16, wherein said events comprise user input events.

19. The system of claim 18, wherein said user input events include selected ones of keyboard input events and pointing device input events.

20. The system of claim 16, wherein said input means includes:
   means for displaying a menu of objects;
   means for receiving first input for selecting one object from said menu of objects;
   means for receiving second input for selecting a position on a screen device, said position specifying a particular location on the form; and
   means, responsive to said first and second inputs, for placing the selected object on the form at the particular location.

21. The system of claim 16, wherein said establishing means comprises:
   means for testing, for each at least one object place within boundaries of another object, whether the object is compatible with the other object; and
   means for establishing a containership relation between the objects only when they are compatible.

22. The system of claim 16, wherein said objects include user-supplied names, and wherein objects contained within the boundaries of the same object at an equivalent containership level have unique names.

23. The system of claim 16, wherein said outline view represents a first object contained within a second object as first and second nodes, respectively, wherein the containership relation between the objects is indicated by displaying the first node as a dependent node of the second node.

24. The system of claim 16, further comprising:
   means for altering containership relations between objects by modifying nodes in the outline view.

25. The system of claim 24, wherein said means for altering containership relations includes:
   means for cutting and pasting each node from one location to another in the outline view.

26. The system of claim 24, wherein said means for altering containership relations includes:
   means for dragging each node from one location in the outline view and dropping the node in another location in the outline view.

27. The system of claim 16, further comprising:
   input means for selecting different nodes in the outline view; and
   means for indicating which object on the form is associated with the selected node, as each different node is selected.

28. The system of claim 16, further comprising:
   input means for selecting objects; and
   means for highlighting in the outline view each node which is associated with a selected object, as each different object is selected.

29. The system of claim 16, wherein said input means for placing desired ones of said objects at desired locations on the form includes:
   means for determining whether a particular desired location is positioned within boundaries of an existing object; and
   means for establishing a container relationship between the objects upon placement of a selected object on the form at the particular location, if the particular location lies within an existing object which can contain the selected object.

30. The system of claim 29, further comprising:
   means for updating the outline view to indicate that the existing object now contains the selected object which has just been placed.

31. In a visual development system, a method for aiding a user with creating an application, the method comprising:
   providing a set of screen objects for creating the application, each object having a set of properties and methods, said set of objects including some objects which may be contained within other objects of the set;
   displaying a form for placement of objects, said form comprising a main window of the application;
   displaying an object outline comprising a hierarchical representation of the application being created, wherein a first object which is contained visually within a second object is represented in the object outline as respective first and second nodes, wherein the first node is a child node of the second node;
   placing desired ones of said objects at desired locations on the form; and
   as each object is placed on the form, updating the object outline for illustrating to the user which objects are contained within other objects, said object outline indicating a currently-selected object by highlighting a corresponding node for that object.

32. The method of claim 31, wherein objects in the system can be contained within other objects to an arbitrary level of nesting.

33. The method of claim 31, wherein an object in the system can be contained by another object which is, in turn, contained by yet another object.

34. The method of claim 31, further comprising:
   receiving input for selecting different nodes in the object outline; and
   as each different node is selected, indicating which object on the form is associated with the selected node.

35. The method of claim 31, further comprising:
   receiving input for selecting objects on the form; and
   as each different object is selected on the form, highlighting in the object outline each node which is associated with the selected object.

36. The method of claim 31, further comprising:
   collapsing a selected node on the object outline by temporarily ceasing display of any children nodes which depend from the selected node.

37. The method of claim 36, further comprising:
   expanding the selected node on the object outline by again displaying any children nodes which depend from the selected node.

38. The method of claim 36, further comprising:
   displaying user feedback for indicating that the selected node contains one or more children nodes which are temporarily hidden from display.

39. The method of claim 38, wherein said user feedback comprises a "+" sign displayed with the selected node for indicating that the selected node contains one or more children nodes which are temporarily hidden from display.

40. The method of claim 39, wherein said expanding step includes:
   receiving user input for selecting the "+" sign, whereupon the system expands the selected node on the object outline by again displaying any children nodes which depend from the selected node.

41. The method of claim 31, further comprising:

displaying user feedback for indicating that a given node contains one or more children nodes which are presently displayed on screen.

42. The method of claim 41, wherein said user feedback comprises a "–" sign displayed with the given node for indicating that the node contains one or more children nodes which are presently displayed on screen.

43. The method of claim 31, further comprising:

modifying which objects a particular object is contained within by cutting and pasting the node associated with the particular object from one location to another in the object outline.

44. The method of claim 43, further comprising:

testing whether the particular object is compatible with other objects as its associated node is pasted to a new location in the object outline.

45. The method of claim 44, further comprising:

if the particular object is not compatible with other objects at the new location, preventing pasting of the associated node at that new location.

* * * * *